Dec. 12, 1961  J. SOBISCH ET AL  3,012,717
PROGRAMMING SYSTEM FOR ACCOUNTING MACHINE
Filed Nov. 26, 1956  24 Sheets-Sheet 11
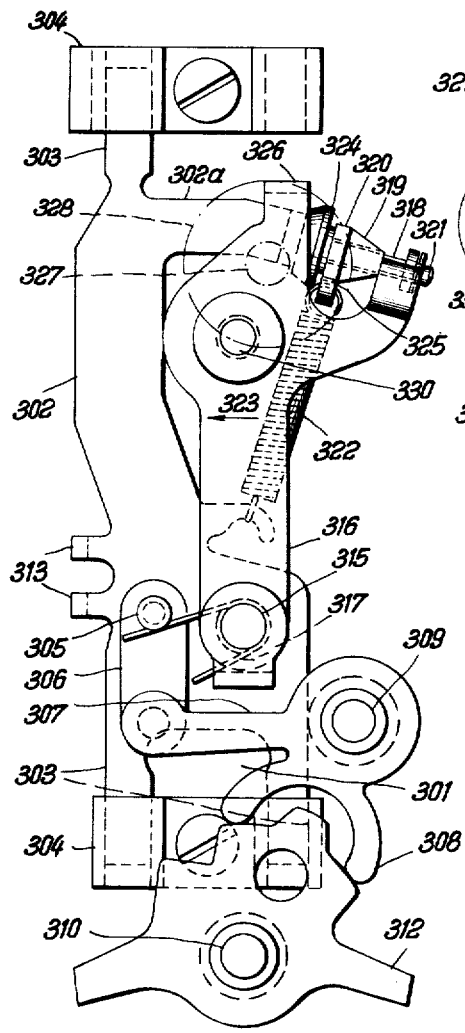
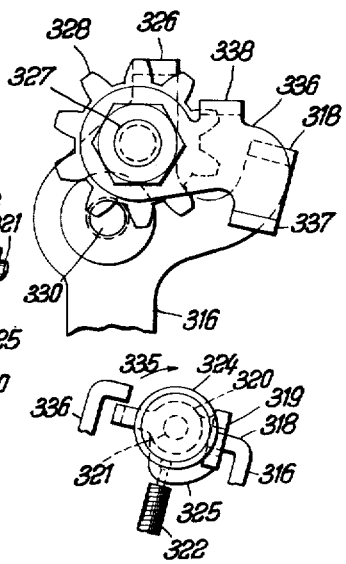

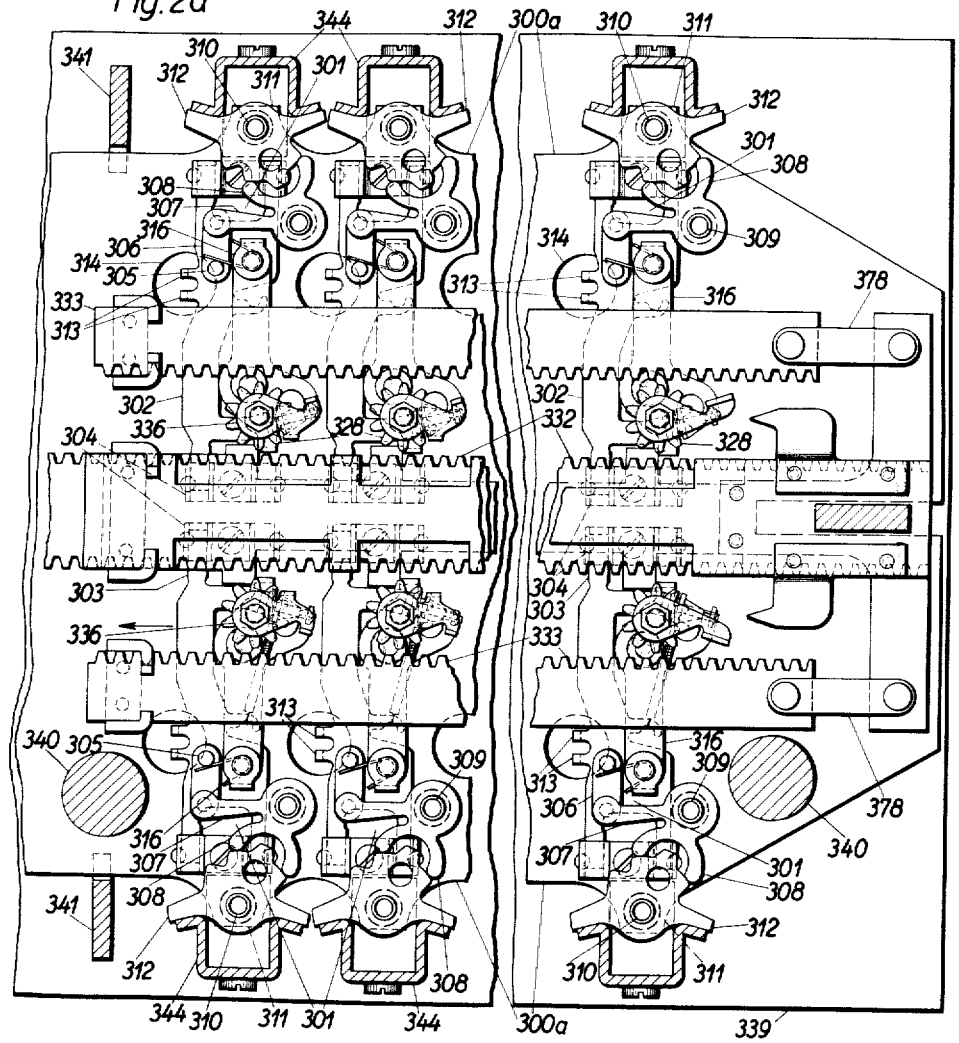

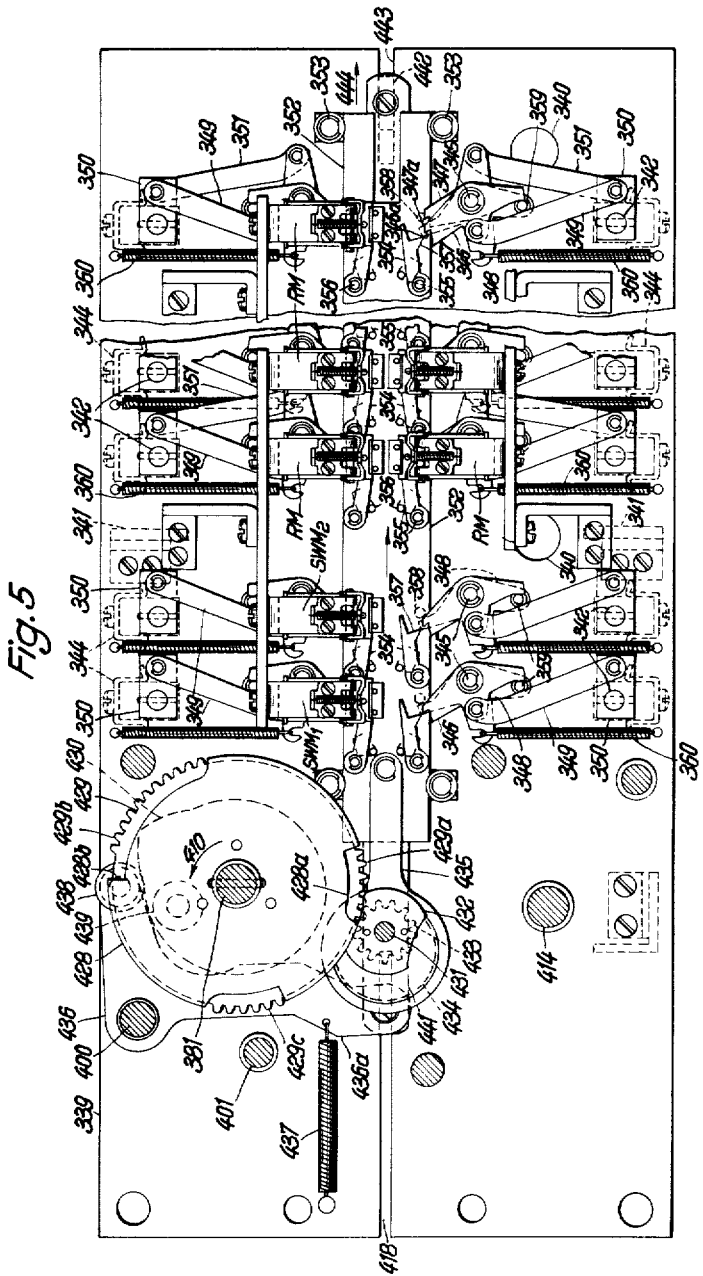

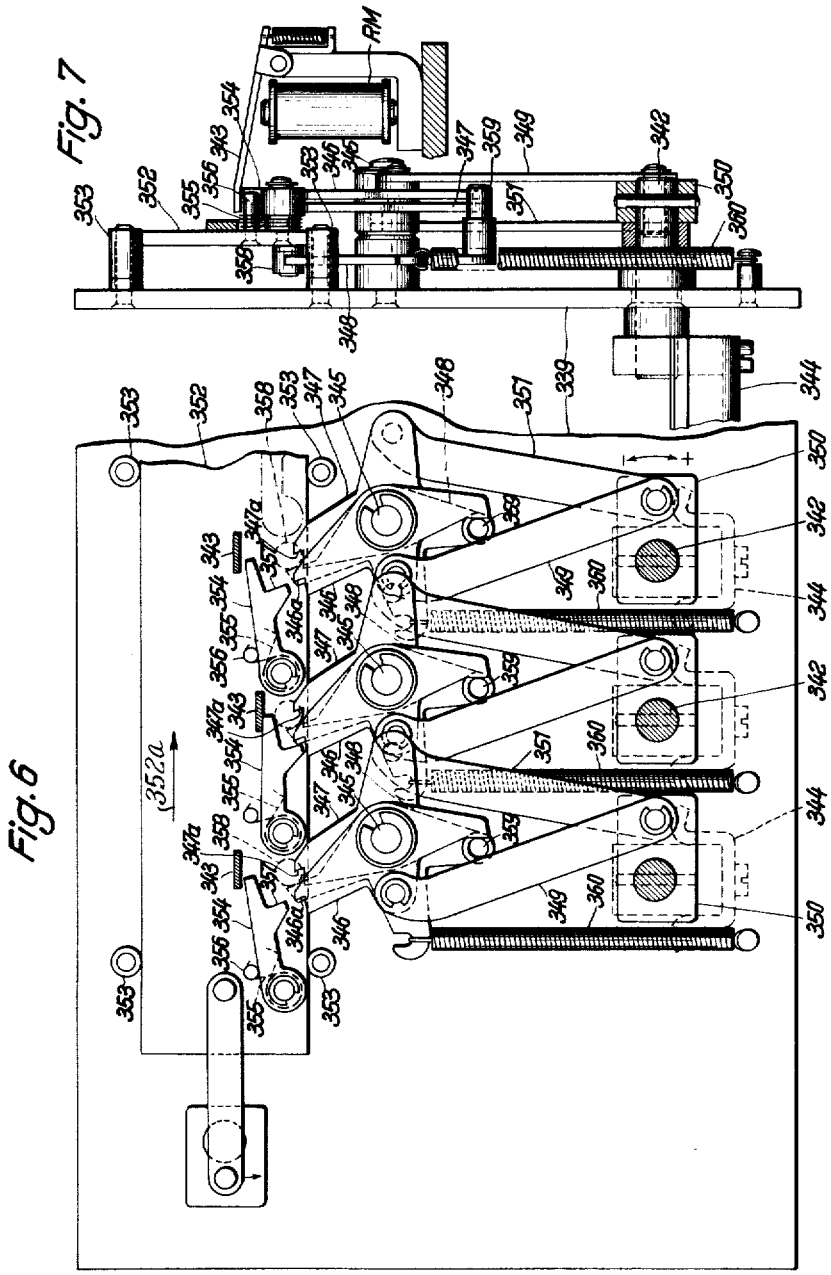

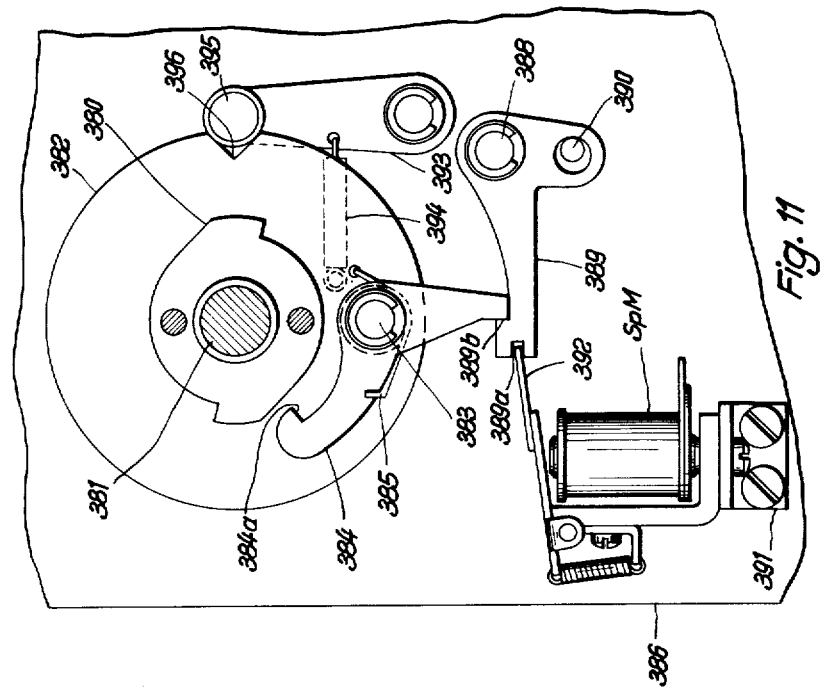
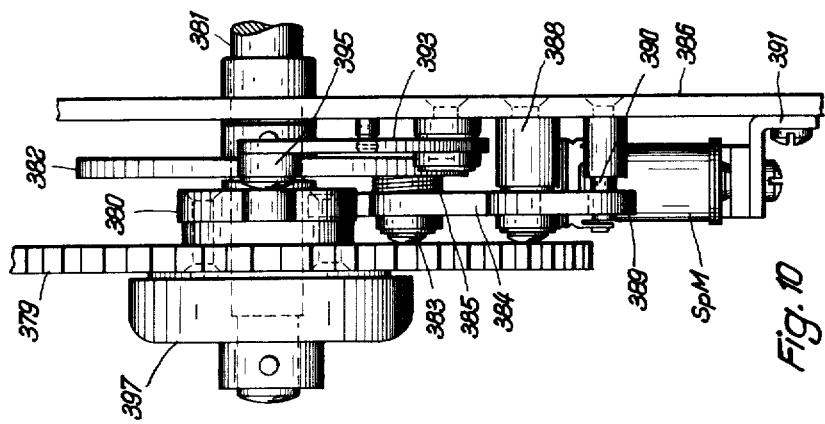

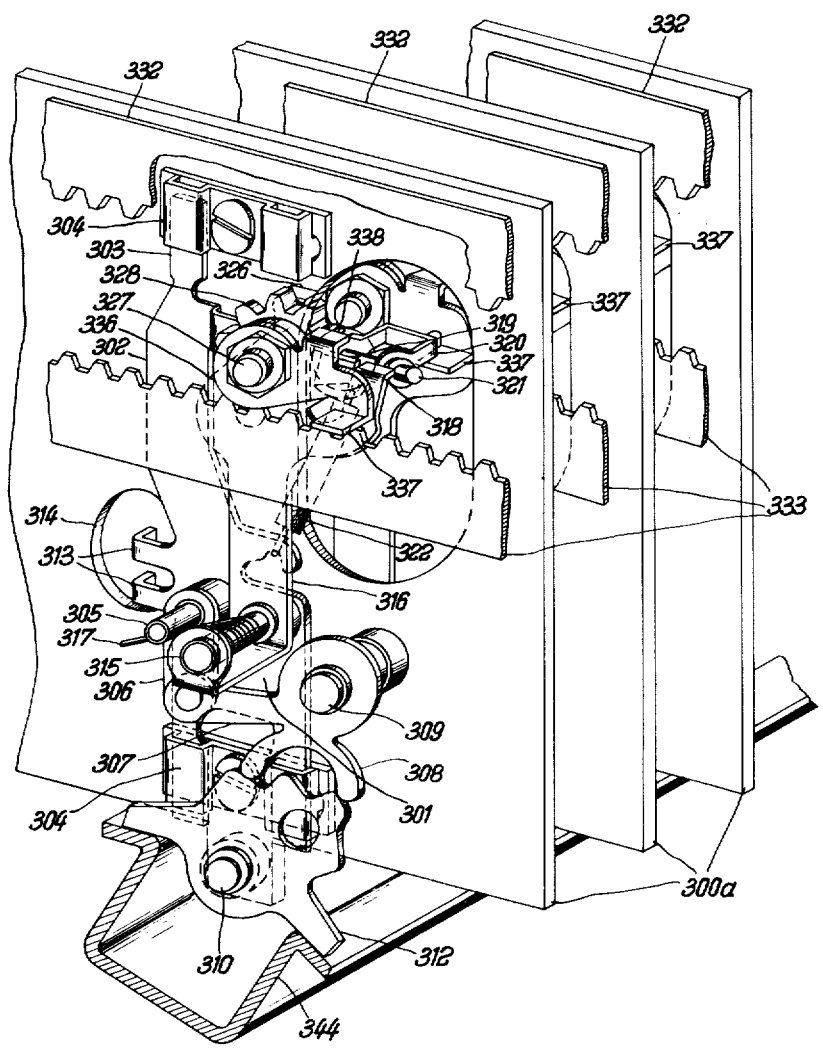

Fig. 22a

Dec. 12, 1961    J. SOBISCH ET AL    3,012,717
PROGRAMMING SYSTEM FOR ACCOUNTING MACHINE
Filed Nov. 26, 1956    24 Sheets-Sheet 20

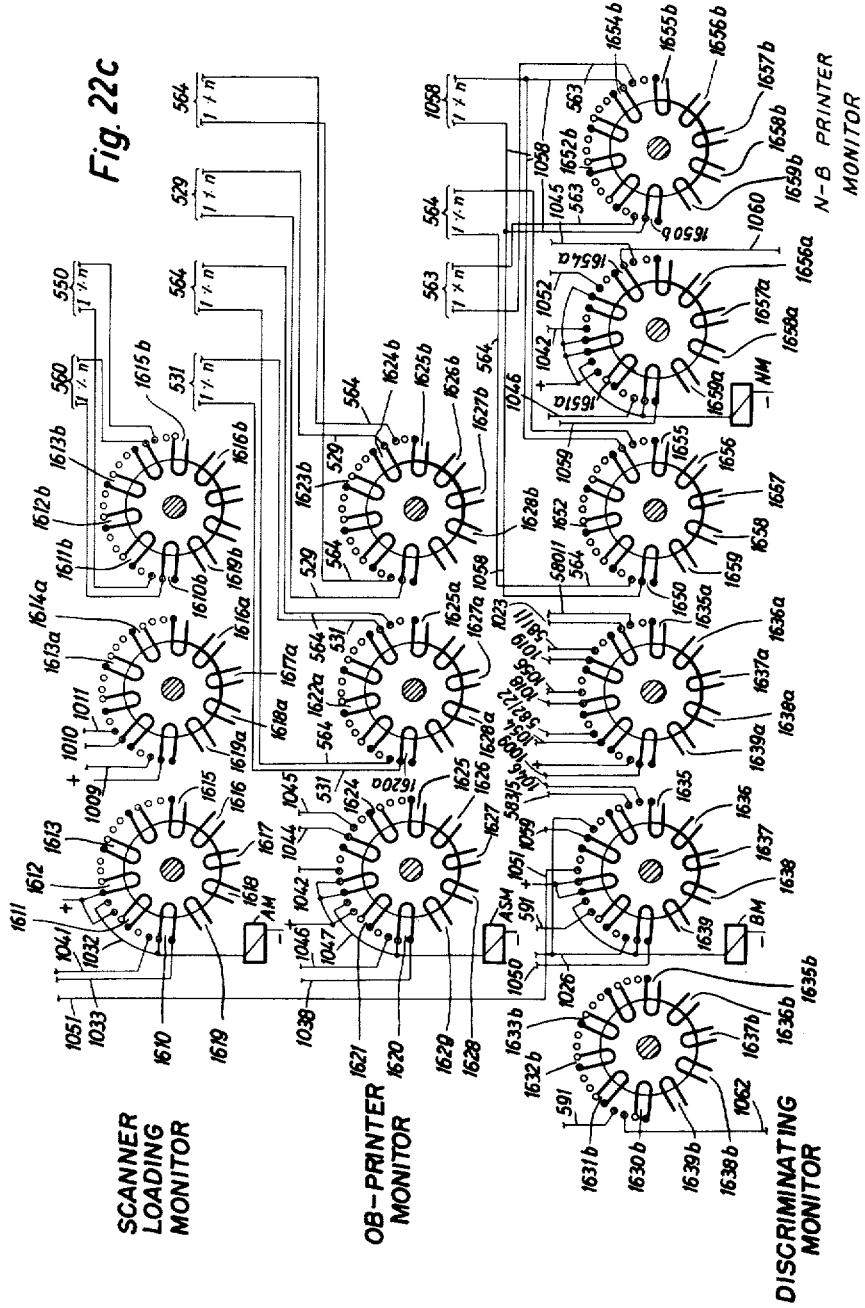

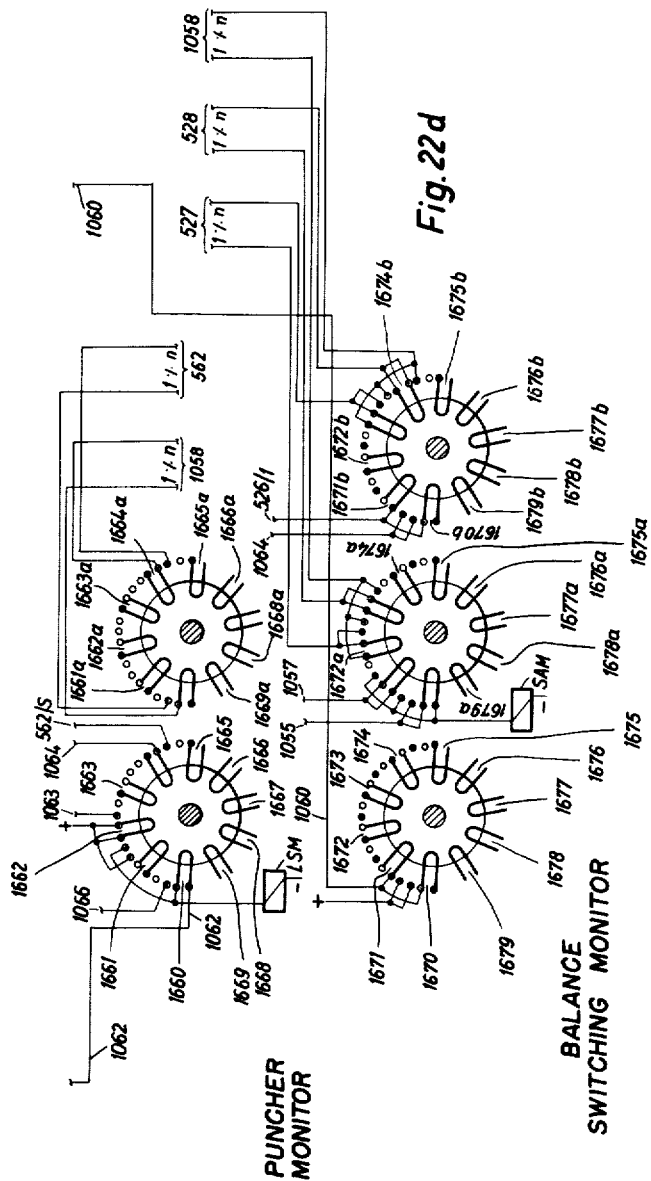

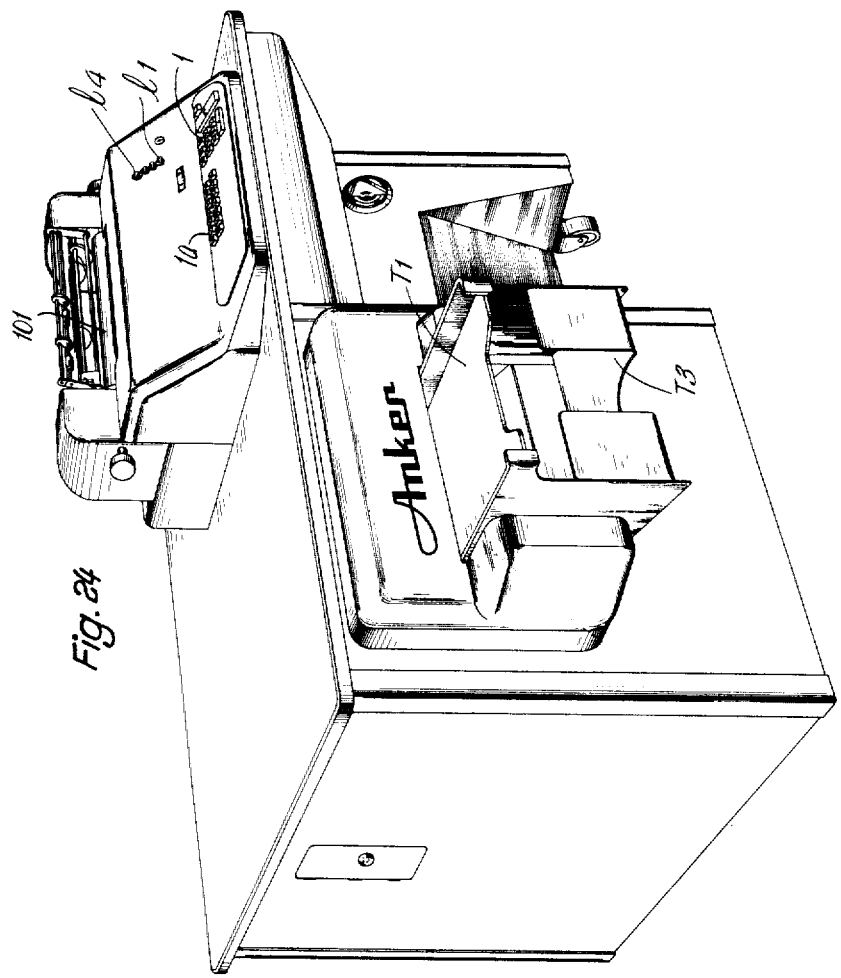

3,012,717
PROGRAMMING SYSTEM FOR
ACCOUNTING MACHINE
Johannes Sobisch, Hans-Ulrich Lauschke, and Heinz
  Puschmann, Bielefeld, and August Kruger, Lockhausen,
  Germany, assignors to Anker-Werke A.G., Bielefeld,
  Germany, a corporation of Germany
Filed Nov. 26, 1956, Ser. No. 624,241
Claims priority, application Germany Dec. 3, 1955
23 Claims. (Cl. 235—61.6)

Our invention relates to accounting machines for operation with data-carrying account cards which, in contrast to single-transaction cards of known bookkeeping systems, exhibit a line-for-line succession of consecutive transactions of an account whose changes are always legible from a simultaneously printed entry and whose last entry always exhibits the latest balance of the account by scannable code marks as well as in print.

Such machines comprise (1) a value posting device in the form of a manually operable keyboard, (2) a sensing apparatus for scanning the marks that denote values and control intelligence on the cards and for transferring the sensed-off information into the machine, (3) computing devices for calculating results from the posted and scanned values, (4) marking and printing devices which record the accounting data upon the account card by scannable and by printed entries and which also serve for the production of journals, statements of account and the like legible records of successive bookkeeping transactions.

The machines are further equipped with control or programming apparatus for controlling and properly co-ordinating the desired functioning of the aforementioned sub-systems. The control apparatus in this type of accounting machine "calls," or "occupies," the various co-active sub-systems in the desired sequence by means of electric impulses and supervises the correct system performance, thus automating the accounting operation and preventing the occurrence of transferring errors. The automatic control of the machine thus not only combines and correlates the basic operation of the individual sub-systems to secure the desired overall machine performance, but it also suppresses certain partial functions of the sub-systems in dependence upon computed results, or enters other, normally not effective, partial performances into the "called" machine operation, thus enforcing an accurate temporal coordination, particularly at great accounting speeds, of the various partial system operations occurring during an accounting run. Since the use of page-type account cards is intended to avoid or minimize the costly and time-consuming sorting required for single-transaction cards, the posted or scanned value notations must be horizontally tabulated into vertical columns; and this requires a multiplicity of computing mechanisms for processing the vertical columns, thus achieving the proper sorting of the entered values. The large number of computing mechanisms and the fact that sensing, marking, printing and computing devices are all combined in the accounting machine, require, for automatic performance of varied kinds of accounting jobs, not only an exact time coordination of the occurring partial functions of the respective sub-systems but also the provision of rapid and reliable means for making the computed results accessible to, and effective in, all other sub-systems that may have to participate in a data-processing run of the machine.

It is an object of our invention to devise an accounting machine of the above-mentioned type, preferably for operation with punched cards, that affords a rapid automatic operation and correlation, including the mentioned transfer of computed results, at greater operating speed and improved fluency and reliability than heretofore available.

Another object is to relieve the operating person of much of the attention and strain heretofore often required for operating such high-speed accounting machines.

To achieve these objects, and in accordance with a feature of the invention, the accounting machine is equipped with a centralized data-storing or memory device, and with selective control means which correlate the storing device simultaneously, or in any desired sequence determined by the controlling program of the machine, to the sensing, value-entering, marking, printing, and computing devices.

According to a more specific feature of the invention the central data-storing device comprises any desired multiplicity of electric contact members in cross-manifold arrangement which selectively establish electric circuit connections that represent respective accounting values and are set up simultaneously and synchronously with the setting of a desired number of computing mechanisms. According to another specific feature, the cross-path data-storing device and the computing devices are supplied with data-denoting intelligence from one and the same data entering or transferring means.

By virtue of the above-mentioned features, a machine according to the invention can be given a relatively simple and readily supervisable design which eliminates the need for additional intermediate data-accumulating devices and affords a surprisingly great speed of accounting operation. Thus, for instance, a transaction posted on the keyboard or an old balance scanned off the account card, when being entered into the computer system, is simultaneously stored in the data-storing device which thereafter is supplied with the computed new balance while the new balance is simultaneously translated into electric circuit connections, so that the values accumulated in the data-storing device can be recorded on journal and account cards in any desired sequence, individually or all data simultaneously, during a single machine run. Any desired data, namely numerical accounting values, account-identifying numbers and control or monitoring symbols, can thus be stored for any desired length of time and can be supplied, during each machine run or during any desired individual run, to the computing sub-system and/or the printing or marking sub-system, such data being entered into the storing device from the keyboard or from the sensing device or the computing mechanisms.

Consequently, the attention of the person operating the machine need be directed essentially only to correctly posting the amounts, columnar positions of the values, and the account-identifying numbers. By virtue of the central data-storing device, the automatic control of the machine can be so set that during the machine run the attendant may take care of exchanging records and may already post new data so that a fluent and continuous work is secured. The excessive physiological strain and fatigue which poses a serious problem adverse to the use of high-speed accounting machines of known designs, is obviated.

According to another feature of the invention, the data-storing device—selectively adjustable by operation of the keyboard or the mark-sensing scanner or the computing mechanisms and correlated to one or more arrays or banks of type-printing mechanisms—has its individual data-storing members so interconnected by electrical wiring that the printing of a cipher "0" at the left of a numerical value is prevented regardless of which particular type-carrier groups are selectively placed in printing position, particularly by operation of the automatic control means. By not assigning to the cipher any punched hole combination, this being the case in the illustrated embodiment described below, one and the same component storing member of the data-storing device may be correlated to the type-printing devices that produce a legible record, as well as to the punching devices that produce seamable holes on the account cards.

According to still another feature of the invention, the data-storing device, aside from memorizing the posted or computed values, symbols or other data, has its individual data-storing members electrically so inter-wired as to also provide a controlling effect, for instance, as regards the selection of the computing mechanisms required for totalizing operations. This obviates the use of special manual keys for the selection of the computers, so that one and the same keyboard unit permits posting into the machine all values, account-identifying numbers, explanatory accounting data, and control or monitoring commands. Of course, the control commands to be entered into the storing device by means of the keyboard, must be coded into numerical data so that these data, due to corresponding electric wiring of the data-storing members, can effect the desired control action upon the course of machine operation.

This greatly simplifies the required attendance work and also reduces the cost of the machine because of the above-mentioned elimination of special keys and intermediate data-accumulating devices. Hence, the keyboard system of the machine can be given a more compact and more readily supervisable and operable design and arrangement, thus obviating the operator fatigue often encountered by persons attending the more extensive keyboard and the greater multiplicity of different keys in known accounting machines of otherwise comparable accounting performance.

Data-storing devices in accounting machines controlled by record carriers are known as such. They have been used for the storing of factors or divisors, for memorizing sensed-off values, for storing legends or other data to be printed, or for accumulating a series of sensed-off columnal data for the purpose of transferring them simultaneously into a computing mechanism. It is also known to temporarily use data-translating devices as a data-storer which may simultaneously be correlated to printing or hole-punching mechanisms. However, since in the known machines the data-storing means can be made to cooperate in a limited manner with certain record-producing or computing mechanisms only, they do not meet the above-mentioned problems and advantages of the present invention which requires the data-storing device to selectively operate in combination with any one or any selected number of all sub-systems of the machine, including the key-board, mark-sensing, computing, and type-printing or mark-producing sub-assemblies.

The above-mentioned and further objects, advantages and features of the invention will be apparent from, and will be mentioned in, the following description with reference to the embodiment of an accounting machine according to the invention illustrated by way of example on the accompanying drawings in which:

FIG. 1 is a perspective view of the entire accounting machine with parts of the enclosure removed.

FIG. 2 and FIG. 2a, to be placed together, show a part-sectional side view of the storer assembly and are hereinafter jointly referred to singly as "FIG. 2."

FIG. 5 is another side view of the storer assembly and particularly shows the means for the selection of the computer mechanisms.

FIG. 6 is a side view of the plus-minus switching means for the computer mechanisms, and FIG. 7 is a part-sectional front view of the switching means according to FIG. 6.

FIG. 10 is a side view of a single-turn clutch for controlling the operating cycle of the storer assembly, similar clutches being provided for the respective other sub-assemblies of the machine, and FIG. 11 is a front view of the single-turn clutch according to FIG. 10.

FIG. 12 is a perspective illustration of a group of computing mechanisms for adjacent digit values of a numerical magnitude.

FIG. 13 shows a side view of one of the computing mechanisms according to FIG. 12;

FIG. 14 shows a detail of FIG. 13.

FIG. 15 shows separately the tens-transfer means in the computer mechanisms of FIGS. 12 and 13.

Figure 21:
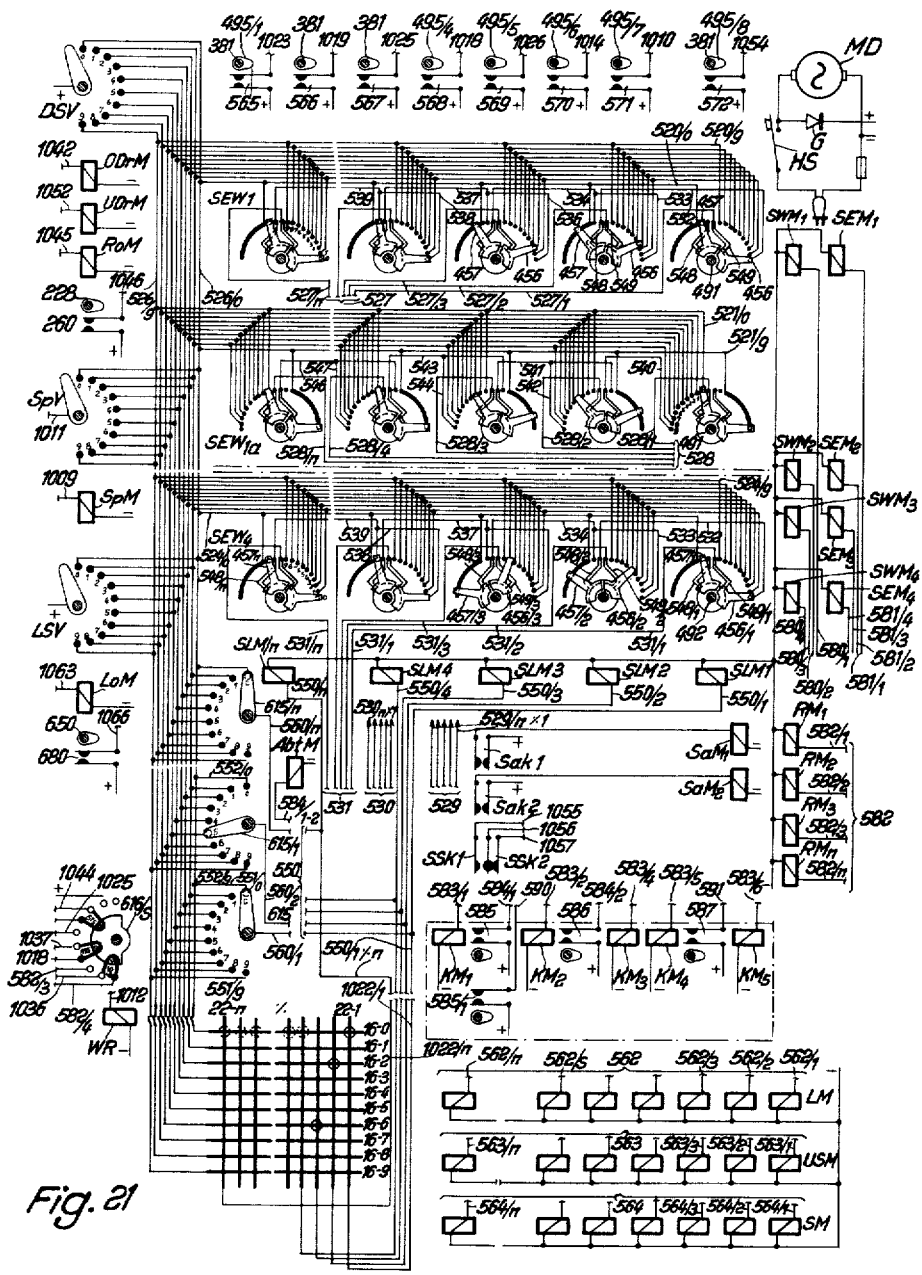
FIG. 21 is a schematic circuit diagram of the storer assembly and of various other sub-assemblies of the machine that are to selectively cooperate with the storer assembly.
Figure 22A:
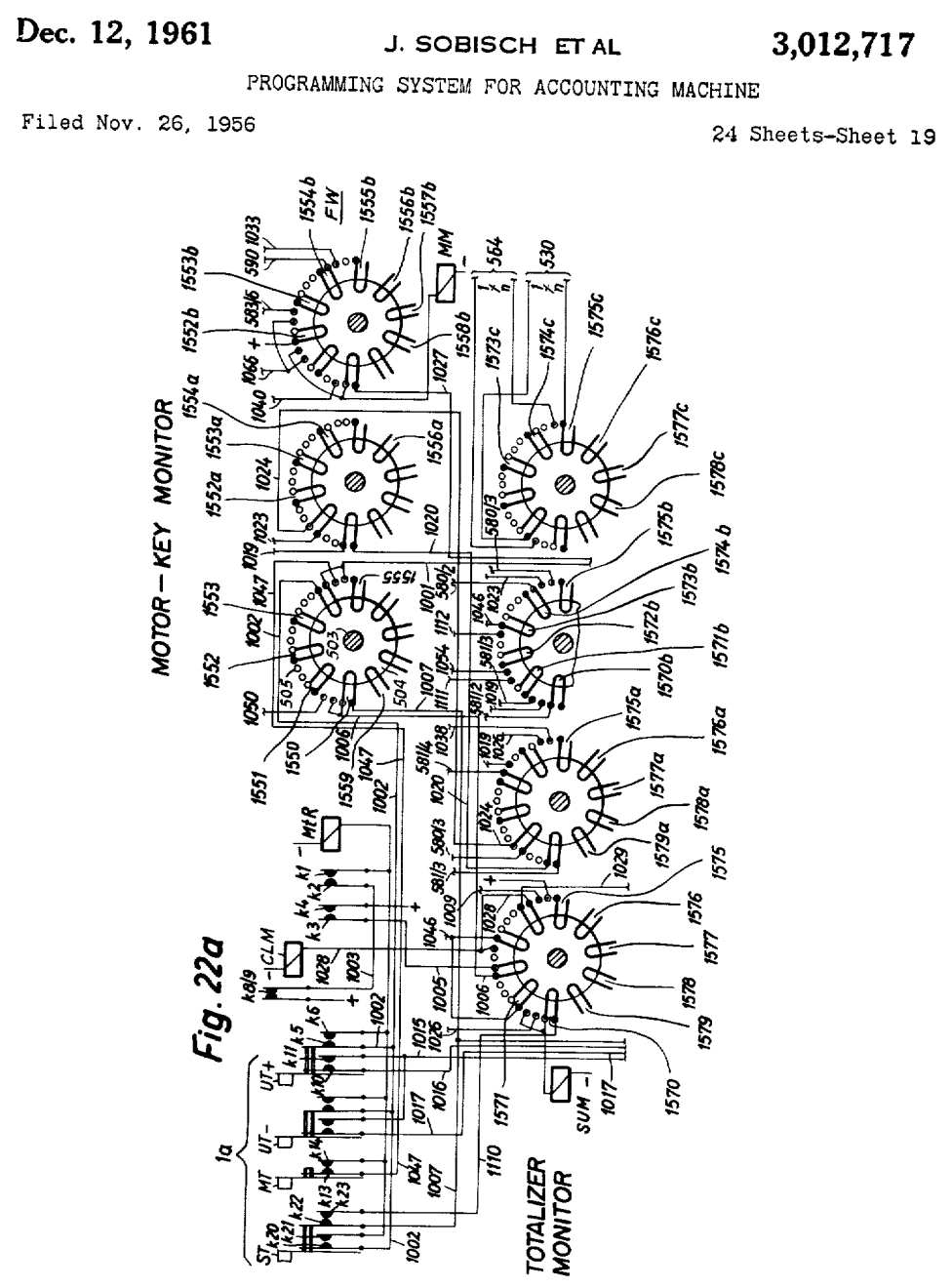
Figure 22B:
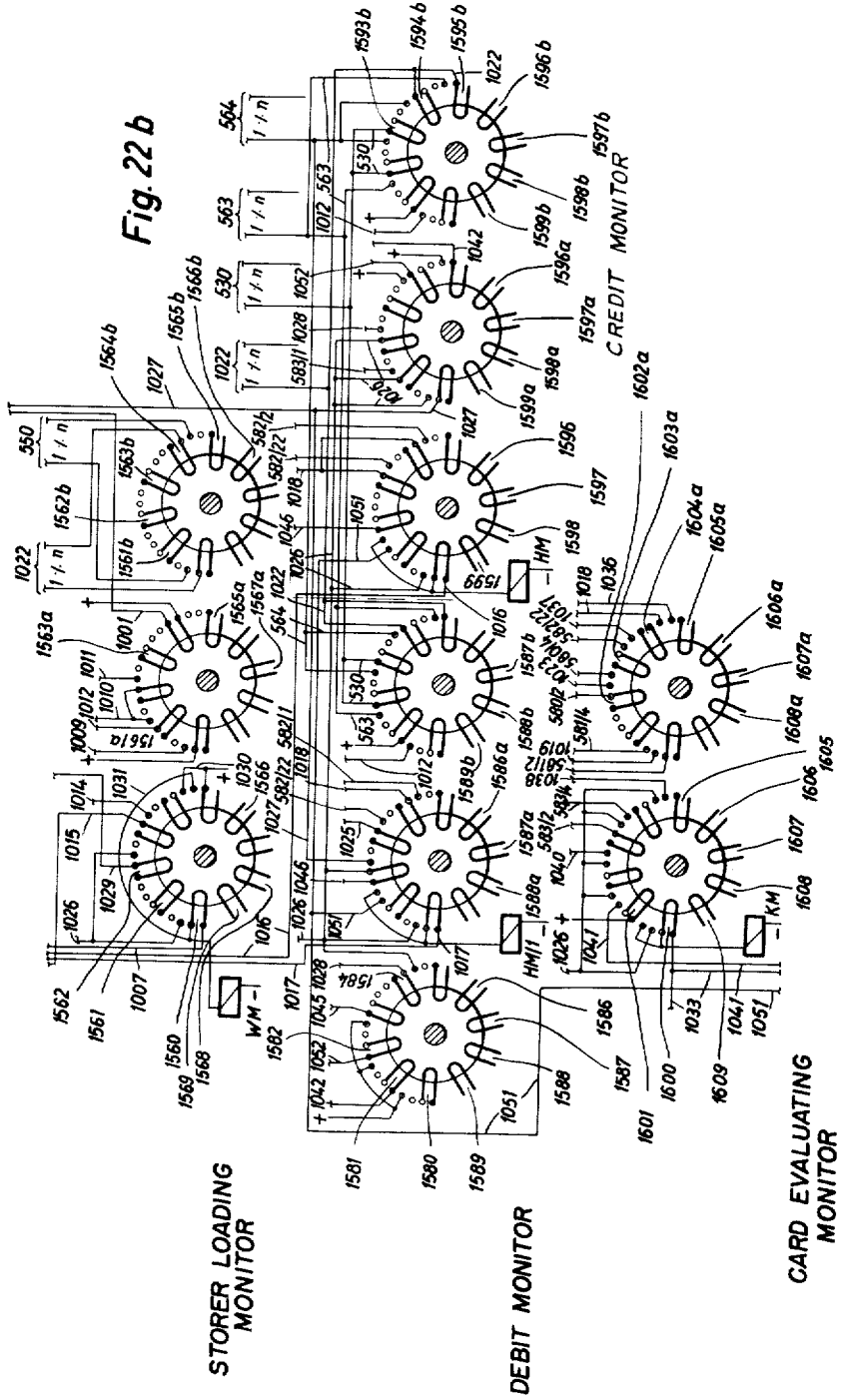

FIGS. 22a to 22d show together a schematic circuit diagram of the function switching devices in the programming assembly of the machine, each of FIGS. 22b, c, and d being a downward continuation of the next preceding figure. As will be described below, the circuits of FIGS. 22a to 22d are electrically interconnected with those of FIG. 21 to form together a single electric system. FIGS. 22a to 22d are hereinafter cumulatively referred to as "FIG. 22."

Figure 1:
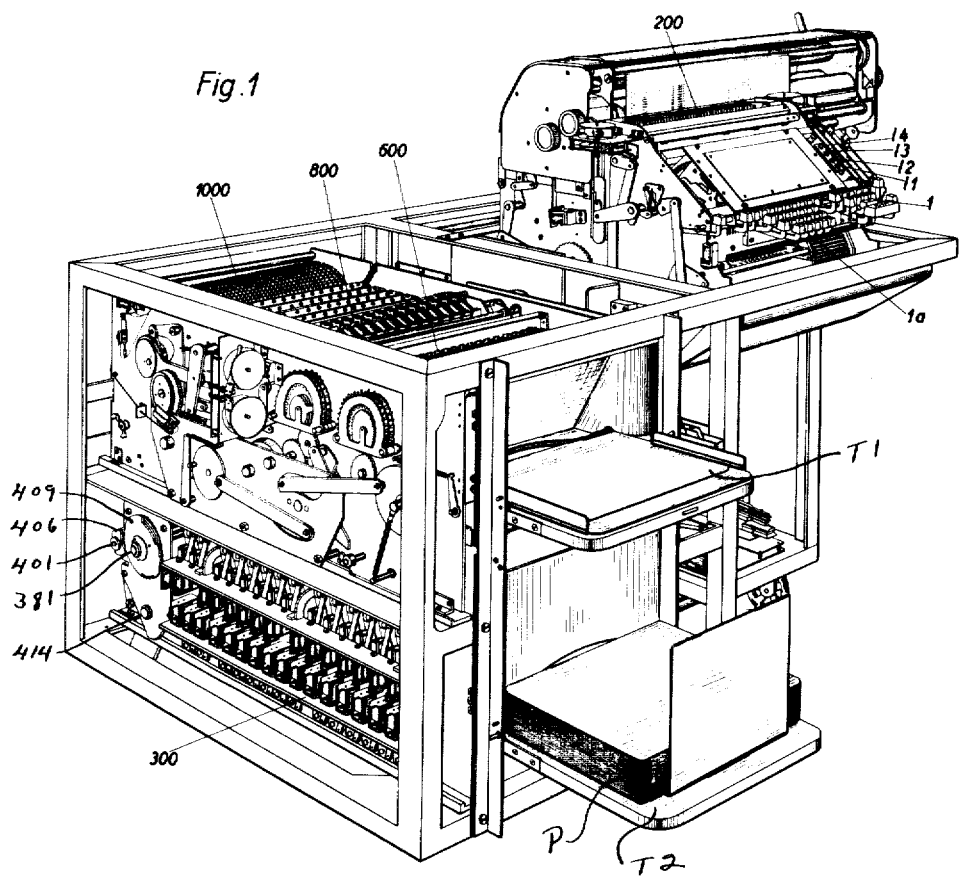
Figure 23:
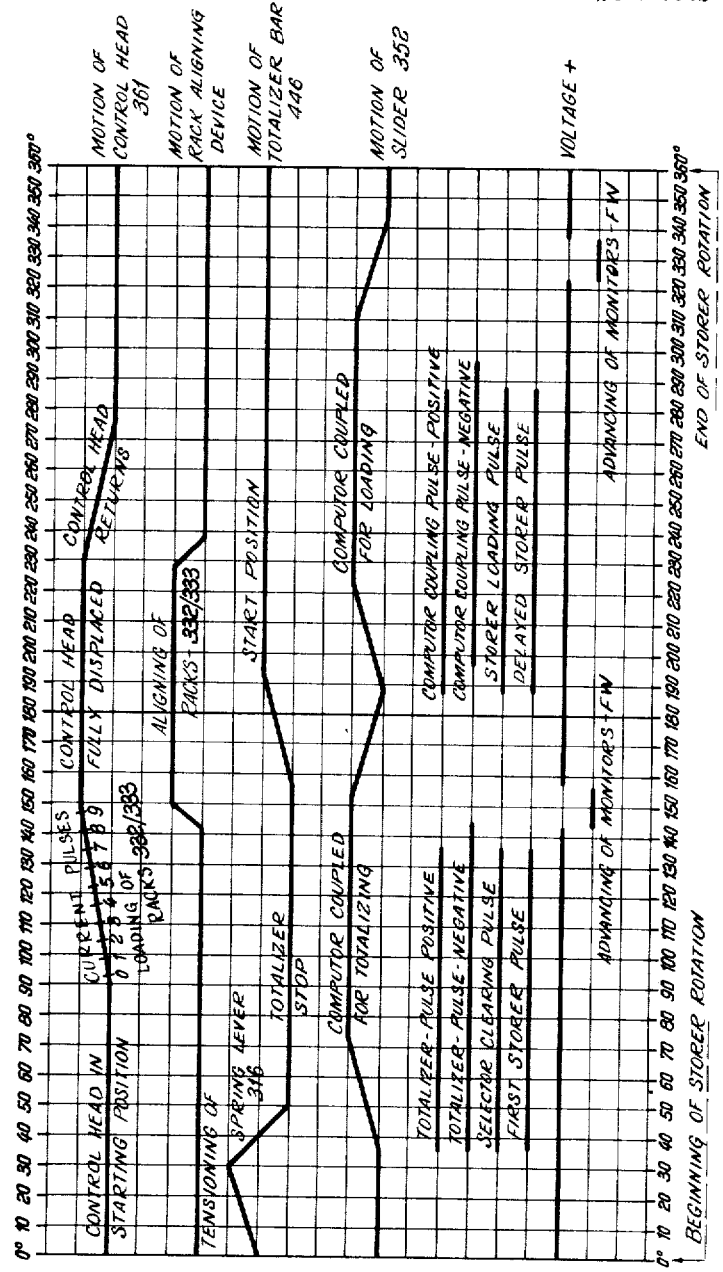

FIG. 23 is a time diagram explanatory of the operation of the storer assembly; and FIG. 24 is a perspective view of the machine in closed condition and slightly modified as compared with the design apparent from FIG. 1.

For convenient presentation, and in order to facilitate understanding, the following description of the illustrated machine is subdivided into chapters, and some of the chapter headings refer to the particular sub-assembly mainly described thereunder. It should be understood, however, that since the various sub-assemblies are inter-wired and cooperate with one another during an accounting run, a complete understanding of the central storer assembly and its coaction with the other sub-assemblies of the machine requires study of the description as a whole.

*Introductory description*

The embodiment of a central data-storing device hereinafter described is illustrated in FIG. 1 as one of the sub-assemblies of a punched-card accounting machine of known general type and, as here exemplified, possesses computing mechanisms of mechanical type. It will be understood, however, that the invention is not limited to such a mechanical design of the computing storer components but that the central storer and its electrical connections according to the invention may also be equipped analogously with computing devices of different kind, such as electric or electronic computers. In such cases, the mechanical switching members are to be substituted by appropriate electric components. Similarly, while the embodiments of the other sub-assemblies to cooperate with the storer, namely the printer assemblies and the mark-sensing and mark-producing devices, are represented by known mechanical designs, it should be understood that they can be substituted by electric or electronic means, such as magnetic or photo-electrical scanning or marking devices.

The punched-card accounting machine illustrated in FIG. 1 comprises the following main apparatus groups: (1) a centralized data-storing assembly 300, (2) a scanning and punching assembly 600 for scanning intelligence from the account cards and entering new coded data in form of punched holes upon the cards, (3) a card imprinting assembly ("lower printer") 800, (4) a journal printing assembly ("upper printer") 200, (5) a keyboard 1 designed as a ten-keyboard for the posting of computing values, (6) an alphabetical-numerical keyboard 1a generally similar to that of a typewriter (FIGS. 1, 22, 24) with keys for selectively "calling" the computer mechanisms and for the posting of monitoring symbols and the like, and (7) a programming assembly 1000 for selectively monitoring the cooperation of the above-mentioned other sub-assemblies. For facilitating service and supervision, the machine is provided with signal lamps $l_1$ to $l_4$ (FIGS. 1, 24) which indicate to the operating person whether the machine is ready for the next following accounting operation. The mechanisms of the sensing and punching assembly 600, the mechanics of the card- and journal-printing assemblies 200, 800 and of the keyboards 1 and 1a are largely conventional and, since their particular details are not essential to the invention, are illustrated and described only to the extent necessary for understanding the data-storer assembly and programming assembly and their connection and coaction with the other sub-assemblies of the machine.

Before describing the machine in detail, it will be helpful to briefly, and, at first superficially, consider an example of an accounting operation to be performed. Assume that a current business transaction is to be registered. The operator places the account card, showing the past history of the particular account in legible form as well as by scannable code marks, upon a card receiving table T1 (FIGS. 1, 24). The operator further posts into the machine, by means of the keyboards 1a and 1, the identifying number or symbols of this particular account as well as the data of the new transaction. When the machine is thus set up, the operator depresses a motor key of the keyboard assembly. This puts the machine into operation for the accounting run. Now, the card is automatically conveyed from table T1 into the interior of the machine where conveying means, such as a card carriage, successively transport the card to the different localities where the individual machine operations, namely scanning, printing and punching, are to be performed. The machine then computes the data of the new transaction together with the old balance data of the account and automatically enters the accounting result on the card in print and also by punching a new hole combination. Simultaneously, the machine prints a legible record of the accounting result into the proper columns of a journal sheet or other record in the upper printer assembly 200. Upon completion of the accounting operation, the card is ejected onto another table or support T2 (FIG. 1) where, after completion of a number of successive accounting operations, a pile of cards P is collected as shown in FIG. 1. The machine according to FIG. 24 is somewhat modified in that each ejected card is temporarily placed upon an intermediate support or table T3 where the card remains accessible for an interval of time sufficient for the operator to check the recorded accounting results, whereafter the card is discarded from support T3 into an ultimate collecting box not illustrated in FIG. 24. Details of the card feeding device are not further described in this specification because they are not essential to the present invention; if desired, however, reference may be had to our copending application Serial No. 624,395, filed November 26, 1956, now Patent 2,825,561, for details of a suitable card feeding and discarding device. Certain electric components of the interior conveying means of the machine will be described hereinafter to the extent necessary for explaining their cooperation with the central data-storing assembly and the other, selectively correlatable sub-assemblies of the machine.

The main power supply of the machine comprises an electric motor MD (FIG. 21, upper right), which is connected to a supply line by means of a plug connector C, and is controlled by a main switch HS. Switch HS is closed, and motor MD is kept running at constant speed as long as the machine is in condition of readiness. Thus, the main shaft 507 (FIG. 17) of the machine, driven by motor MD, revolves continuously. This main shaft supplies power to the main control shafts of the individual sub-assemblies under control by respective single-turn clutches described below.

The main power supply of the machine also comprises a source of electric control current, preferably direct current. This source is exemplified by a rectifier, schematically shown at G in FIG. 21, which is also connected to the connector C. The positive and negative output poles of the current source are denoted by + and —, respectively, and it is to be understood that these two poles are connected by buses (not illustrated) with all leads designated by + and —, respectively, in the circuit diagrams of FIGS. 21 and 22.

*Single-turn clutches*

As mentioned, the individual sub-assemblies of the machine are selectively driven from the main shaft under control by respective single-turn clutches. Each of these clutches, when put into action, imparts a single complete rotation to the main control shaft of the sub-assembly. Such a single cycle of rotation is initiated by a starting pulse which acts upon a switching magnet of the clutch; and each sub-assembly, when completing an individual run, issues a stop-signal pulse for initiating some other machine operation. The start pulses for the clutch switching magnets are issued by the program switching assembly 1000 (FIG. 1) in cooperation with selectively operable motor keys UT+, UT—, ST and MT of keyboard 1a (FIG. 22), and these pulses occur in a given sequence depending upon the selected control program.

Since the single-turn clutches of the various sub-assemblies are all of similar design and operation, the mechanical details of only one of them will now be described in detail with reference to FIGS. 10 and 11, showing the clutch of the central storer assembly 300.

The main shaft, continuously driven by motor MD, carries a spur gear (not illustrated) which is in meshing engagement with a spur gear 379 (FIG. 10) of the clutch. Hence, spur gear 379 and a cam 380 rigidly connected therewith rotate continuously about a control shaft 381 (FIGS. 1, 3, 10, 11) which forms the main shaft of the data-storing device 300 (FIG. 1). Mounted on, and rigidly pinned to, the storer shaft 381 is a disc 382 (FIGS. 10, 11). A pivot pin 383 riveted into disc 382 carries a pawl 384 which is biased toward cam 380 by means of a helical spring 385 surrounding the pivot pin 383. Another pivot pin 388 mounted on a side wall 386 carries a latch lever 389. The pivotal movement of latch lever 389 is limited by a stop pin 390 likewise mounted on side wall 386. The side wall 386 further carries an angular bracket 391 which firmly supports a storer control magnet SpM. The armature 392 of the magnet enters into a fork-shaped recess 389a of latching pawl 389.

As long as the armature 392 is dropped off, as shown in FIG. 11, a shoulder 389b of latch pawl 389 holds the pawl 384 out of the range of the continuously rotating cam 380, while a detent arm 393 pivoted on wall 386 keeps the disc 382 arrested by means of a roller 395 engaging a notch 396 of disc 382 under the force of a biasing spring 394. When magnet SpM is excited by a start pulse, its armature 392 moves the latch pawl 389 counterclockwise so that pawl 384 is released. The nose 384a of pawl 384 enters into the range of the next cam projection and is then entrained by the rotating cam 380. Now the disc 382 and the storer shaft 381 (FIGS. 1, 2, 3, 5, 8, 10, 11, 21 top) partake in the rotation of the cam 380 for one complete turn. Since now the magnet SpM is deenergized, the pawl 384, after completion of one rotation, can again place itself in front of the shoulder 389b of latch pawl 389.

Added to the single-turn clutch just described is an over-run clutch 397 (FIG. 10) of conventional design. Clutch 397 is interposed between the continuously rotating spur gear 379 and the storer main shaft 381 to prevent overrunning of shaft 381. Mounted on the storer main shaft 381 (FIG. 3) are a number of control cams (491/1 etc. in FIG. 3; FIG. 21, top) which actuate respective groups of electric control contacts described in a later place.

*Programming assembly*

The programming assembly 1000 (FIG. 1) which controls the starting and stop pulses for monitoring the other sub-assemblies is essentially composed of selector switches FW of the stepping-switch type (FIGS. 17, 22) hereinafter also called "monitors." These monitoring switches are likewise connectible with the machine main shaft by means of a switching magnet MM (FIG. 17) which is excited by a switching pulse and then causes the stepping mechanism of the monitor to progress step by step. A number of mutually insulated bank contacts 505 (FIG. 17) are mounted along the travel path of each monitoring selector switch. The central shaft 503 of the switch carries a rotatable disc 504 on which a number of contact spoons 1550 to 1557 (FIGS. 17, 22) are mounted and insulated from each other. Each individual contact spoon forms a conductive connection between two adjacent bank contacts 505. The insulating disc 504 is firmly connected with a ratchet 506 (FIG. 17) which serves to impart stepwise rotation to the disc and contact spoons. Due to the uniform distribution of the contact spoons over the periphery of the insulating disc, the selector switch reaches its original starting position after performing a given number of individual steps. The particular stepping switch shown in FIG. 17 thus returns to the starting position after performing five progressive switching steps.

The stepping switch is driven from the continuously revolving main drive shaft 507 of the machine. Shaft 507 carries an eccentric 507a which, by means of a linking rod 507b, imparts a continuous reciprocating movement to a swing beam 508 rotatably mounted on a shaft 509. Also mounted on shaft 509 is a pawl carrier 510 which is biased by a spring 511 into engagement with a stop pin 512. A latch pawl 513, pivoted on carrier 510 at 510a, has a lug 514 in engagement with the armature 514a of a magnet MM as long as the armature is in the dropped-off position shown in FIG. 17. The armature then keeps pawl 513 out of the oscillating range of swing beam 508.

When magnet MM is excited by a starting pulse, the armature 514a is withdrawn from lug 514, and a spring 513a turns the latch pawl 513 into the stroke range of swing beam 508 so that the pawl carrier 510 participates in the oscillatory motion of the swing beam. Now a driver pawl 515, pivoted at 515a to the pawl carrier 510, enters into the teeth of ratchet 506 and advances it one tooth division while a detent arm 516 of pawl carrier 510 simultaneously releases the ratchet 506. If the magnet MM, during the return stroke of the swing beam 508 is again deenergized, the lug 514 of latch pawl 513 places itself in front of the armature 514a, and the switching operation of the selector switch is terminated.

A switching mechanism of the type described may be provided with one or several rows of bank contacts in coaxial relation to each other. Furthermore, several such multi-row switching mechanisms may be placed side by side and their driving motion may be derived from a single swing arm, whereas the control of the individual switching mechanisms is effected by separate electromagnets. For instance, each individual horizontal row of the monitoring selector switches FW shown in FIG. 22 is preferably designed and operated in the manner just described.

*Computers*

The computer portion of the storer assembly in the illustrated accounting machine is composed of a number of individual computer units or stations 301 mounted on respective carrier plates 300a (FIGS. 2, 4, 12, 13, 16). All computer mechanisms assigned to the same decimal digit position are mounted on a common carrier plate. Each computer unit comprises a slider structure 302 with three slider portions 303 (FIGS. 12, 13) displaceable in sheet metal guides 304 fastened by screws to the carrier plate 300a. Hence, each individual computer mechanism can be displaced up and down by sliding movement. As apparent from FIG. 2, each carrier plate 300a supports a symmetrical arrangement of computer mechanisms relative to the horizontal center line of the plate. For that reason, when hereinafter referring to "lifting" of the slider structure or computer mechanism, a movement toward the horizontal center line is meant, whereas "lowering" of the slider structure or computer mechanism relates to movement away from the center line.

Figure 2:
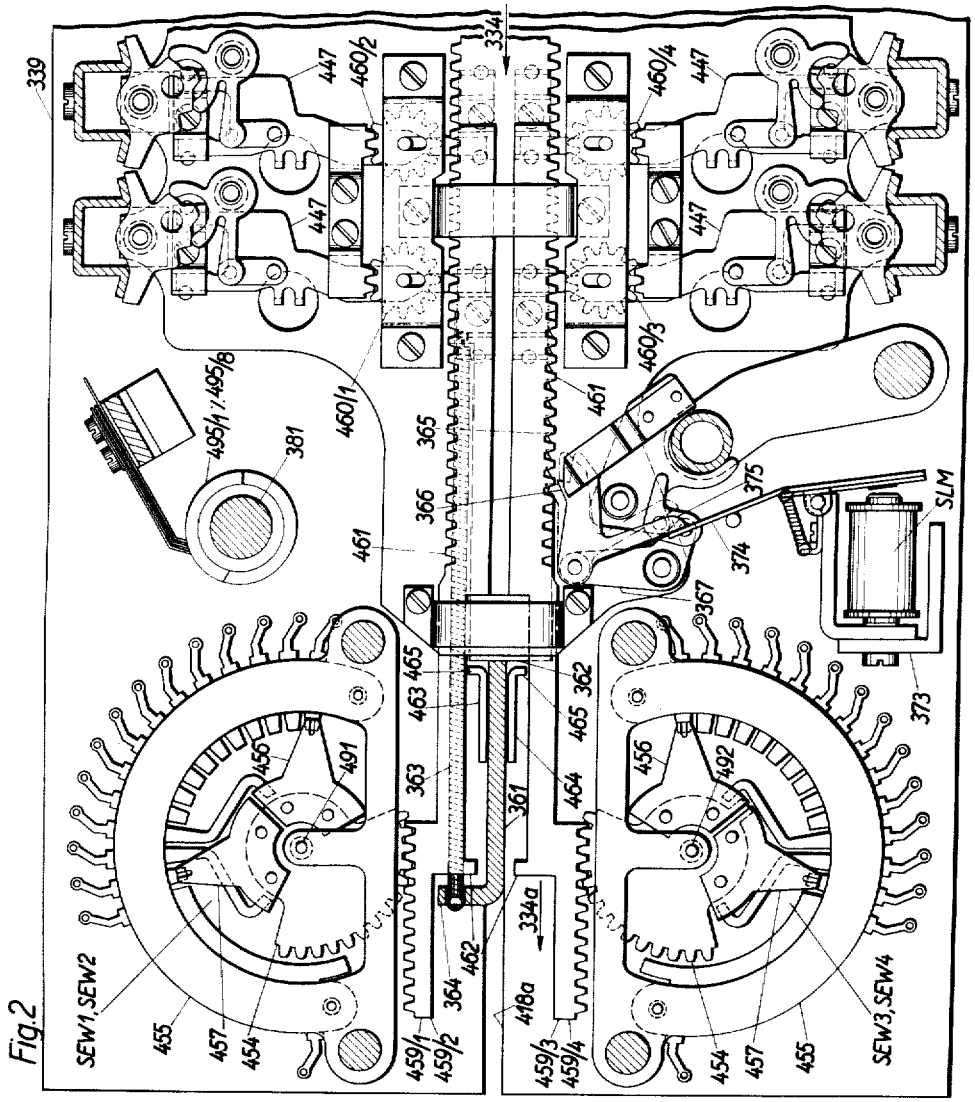

A pivot pin 305 (FIGS. 2, 12, 13) engages an end of a rotatable link 306. The other end of link 306 is pivoted to an arm 307 of a transfer lever 308 which is rotatable about a pivot pin 309 riveted to the plate 300a. Another pin 310 is similarly secured to an extension 311 of plate 300a. Rotatably mounted on pin 310 is a control cam 312 cooperating with the transfer lever 308. Turning the control cam 312 counter-clockwise has the effect of lifting the computer mechanism 301, whereas turning the cam in the clockwise direction causes lowering of the computer. Two angular lugs 313 of slider structure 302 then coact with an opening 314 in plate 300a to operate as stops for limiting the stroke travel of the computer. When the control cam 312 is in its normal position of rest as shown in FIG. 2, the computer mechanism occupies a given mid-position.

A pin 315 (FIGS. 12, 13) secured to the slider structure 302 carries a rotatable spring-biased lever 316. A helical spring 317 biases the spring lever 316 counter-clockwise so that a lateral lug 318 of lever 316 abuts against a bent-off lug 319 of a switching bracket 320 (FIGS. 12, 13, 14, 15). The switching bracket 320 is rotatable on a pivot pin 321 secured to an extension 302a of the slider structure 302. A spring 322 normally retains bracket 320 in normal position. When the switching bracket 320 is turned about its pivot, the spring lever 316, under the effect of spring 317, moves in the direction of the arrow 323 (FIGS. 2, 13). Such lateral movement is limited by stops. That is, when the bracket turns counter-clockwise, a disk-shaped shoulder 324 (FIG. 13) of the pin 321 carrying the switching bracket 320 acts as a stop; and when the switching bracket 320 turns clockwise, a stop face 325 of the bracket operates to limit the movement. Consequently, the angular displacement of the spring lever 316 has different magnitudes depending upon the direction of turning motion of the switching bracket 320. The switching bracket 320 carries a laterally bent lug 326 (FIGS. 12, 13, 14) whose purpose will be explained further below.

A pin fastened to the spring lever 316 carries a spur gear 328 which forms the counting member proper. In the mid-position of slider structure 312 a ball-type catch 330 (FIGS. 13, 14) of conventional design is effective to prevent inadvertent rotation of the counting gear 328.

When the slider structure 302 and thus the spring lever 316 are moved away from the central or zero position, the ball catch 330 becomes ineffective, and the counting gear 328 can be rotated.

Due to displacement of slider structure 302, the counting gear 328 enters into meshing engagement with one of two racks 332 and 333 (FIGS. 2, 12), depending upon whether an addition, subtraction or summation is to be effected. Prior to meshing with the counting gear 328, the racks are displaced in the direction of the arrow 334 (FIG. 2) an amount which is a measure of the value to be subsequently "entered" into the counting gear. After the counting gear is placed into meshing engagement, the racks are returned to their normal positions so that the counting gear 328 performs a constrained rotation. The value previously represented by the displacement of the racks is thus transferred to the counting gear 328, the direction of rotation of the counting gear being dependent upon whether it is in meshing engagement with the rack 332 or with rack 333. When, after rack 333 has entered into meshing engagement with the counting gear, the switching bracket 320 is moved in the direction of the arrow 335 (FIG. 15), then the spring lever 316, under the effect of its spring 317, turns in the direction of the arrow 323 (FIGS. 2, 13) to the extent required to have the lug 318 of the spring lever abut against the shoulder 324 of pin 321. During such displacement of the spring lever, the counting gear 328 rolls along the rack 333 and rotates one tooth division in counterclockwise direction.

When the counting gear is in mesh with rack 332 and the switching bracket 320 is moved in opposition to the direction indicated by the arrow 335 (FIG. 15), then the spring lever 316 moves in the direction of the arrow 323 until the lug 318 abuts against the stop face 325 of switching bracket 320. Hence the counting gear 320 now rolls along the rack 332 and moves likewise one tooth division but in clockwise direction. Due to the different leverages caused by coupling the counting gear with the rack 332 and the rack 333 respectively, the spring lever 316 will travel respectively different amounts when turning the bracket 320 in the direction of arrow 335 or opposed thereto, in order to obtain in both cases a rotation of the counting gear by only one tooth division.

The counting gear 328 is firmly connected with an arm 336 (FIGS. 2, 12, 13, 14) with two lateral lugs 337 and 338, so that the arm and the lugs participate in any rotating movement of gear 328. The lug 337 serves as a tens-transfer member by acting upon the switching bracket 320 thus rotating the bracket clockwise or counter-clockwise for permitting, as described, the spring lever 316, and hence the counting gear 328 to perform the necessary motion. The lug 338 serves as a totalizing stop whose purpose will be described below.

Figure 3:
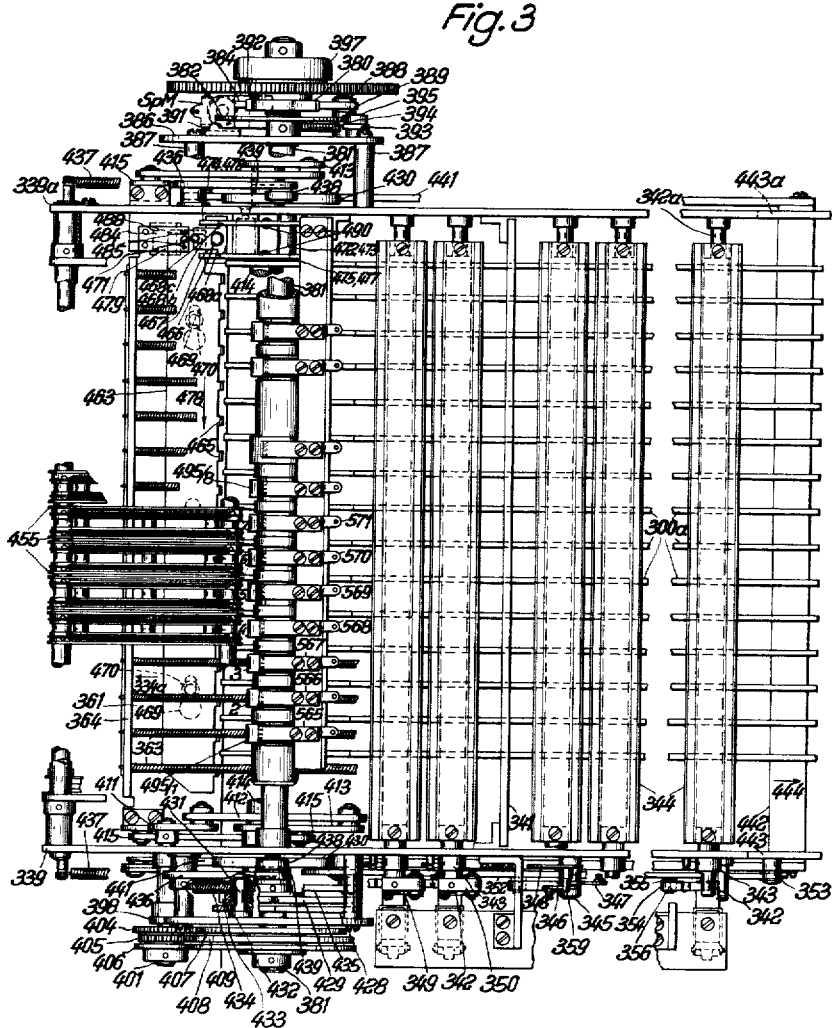
FIG. 3 is a part-sectional top view of the same storer assembly.
Figure 4:
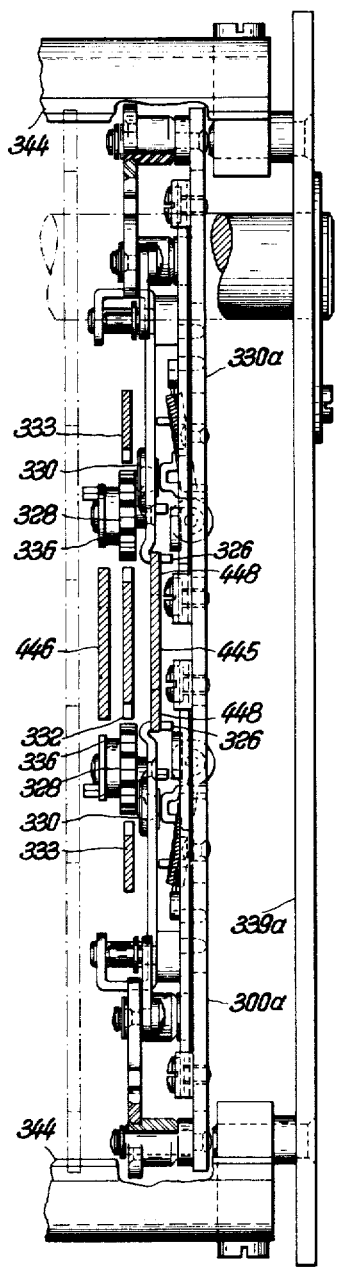
FIG. 4 is a part-sectional front view of a computing mechanism.

The carrier plates 300a of the digital computer units are mounted on a frame structure composed of side walls 339, 339a (FIGS. 2 to 9) and transverse rods 340 (FIGS. 2, 5; bottom right in both figures). Proper spacing between the plates 300a is secured by comb-shaped guide bars 341 (FIGS. 2, 3). Revolvably journaled in and between the side walls 339 and 339a are respective control shafts 342 (FIGS. 3, 5, 6, 7), one per computer unit. Each control shaft 342 is firmly connected with a channel rail 344 (FIGS. 2, 3, 5, 6, 7, 12) which can cooperate with the respective cam pieces 312 of all of the digital positions of those computer mechanisms that are disposed beside one another and hence appertain to one and the same plural-digit value. Consequently, a rotary movement of control shaft 342 (FIGS. 3, 5) causes rotation of all cam pieces 312 of the latter group of computer mechanisms whereby, depending upon the direction of rotation of shaft 342, the counting gears 328 of all these computer mechanisms are coupled either with the respective racks 332 or with the racks 333 (FIGS. 2, 4, 12). This coupling of a digital computer group is effected under control by the devices described presently.

For each computer group there are provided three levers 346, 347, 348 which are independently rotatable upon a common pivot pin 345 mounted on the side wall 339 (FIGS. 5, 6). Each of levers 346 (FIGS. 5, 6, 7) is pivotally joined by a link 349 with a crank arm 350 pinned to the control shaft 342. Each of levers 347 is linked to the same crank 350 of control shaft 342 by means of another link 351. Movement of lever 346 in the clockwise direction causes the control shaft 342 to turn counterclockwise whereby the counting gears 328 of the computer group are coupled with the respective racks 332 (FIG. 2). Clockwise movement of lever 347, acting through link 351 upon crank 350, causes rotation of control shaft 342 in the clockwise direction so that the counting gears 328 of the computer group are coupled with the respective racks 333. A slider 352 (FIGS. 3, 5, 7) common to all computer groups of the computer assembly is guided between rollers 353 on sidewall 339 for horizontal displacement and carries respective pawls 354, one for each computer group. Each pawl 354 is biased by a spring 355 toward engagement with a stop pin 356. Assigned to each pawl 354 is an electromagnet RM (FIGS. 5, 7, 21; in FIG. 21 the magnets are distinguished by subscripts: $RM_1$, $RM_2$ ... $RM_n$). When the magnet RM is excited, its armature 343 (FIGS. 6, 7) turns the pawl 354 clockwise (FIG. 6), and the pawl nose 357 is placed in front of a nose 346a of lever 346. When now the slider 352 is being displaced in the direction indicated by an arrow 352a (FIG. 6), the control shaft 342 of the computer group then made active by its magnet RM, is turned counterclockwise by operation of lever 346, link 349 and crank arm 350. The rotary movement of lever 346 then pushes the pawl nose 357 over and beyond a slanting nose 347a of the lever 347.

However, when the excitation pulse for magnet RM occurs at a later moment, namely after the nose 357 on pawl 354 has passed out of the range of nose 346a on lever 346 due to lateral displacement of the slider 352, then the nose 347a of lever 347 is entrained by the nose 357 of pawl 354 so that lever 347 is turned clockwise. As a result, the control shaft 342 is likewise turned clockwise.

The lever 348 serves for returning the control shaft 342 to its normal position of rest and to thereby effect uncoupling of the computing mechanism from the groups of racks 332, 333. Assigned to each lever 348 is a pin 358 (FIGS. 5, 6, 7) which is mounted on the slider 352. During return movement of slider 352 in opposition to the direction indicated by arrow 352a in FIG. 6, the pin 358 is pressed against the lever 348 which during movement of either one of levers 346 and 347 was previously turned clockwise by means of a pin 359 mounted on the lever 343. As a result, the lever 348, and by action of pin 359 also the previously rotated lever 346 or 347, is returned to the starting position, while the connecting links 349, 351 also return the control shaft 342 to the starting position. This resetting movement is aided by a biasing spring 360 (FIGS. 6, 7) attached between the lever 348 and a stationary pin on plate 339.

Figure 8:
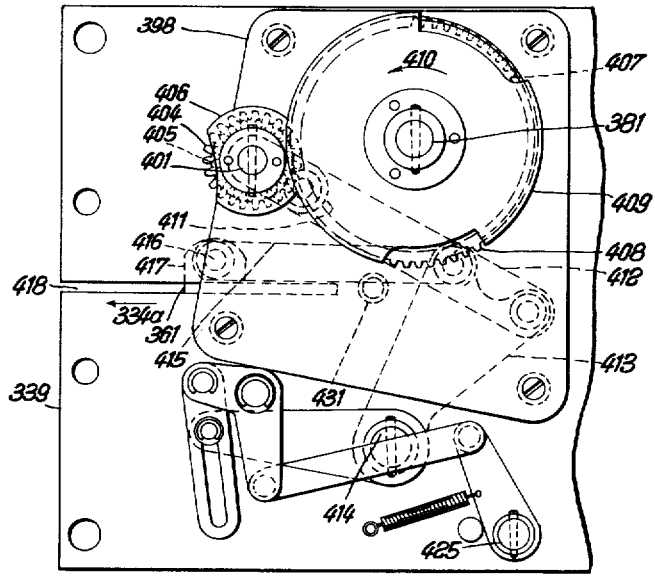
FIG. 8 is a side view of a driving device that forms part of the storer assembly.
Figure 9:
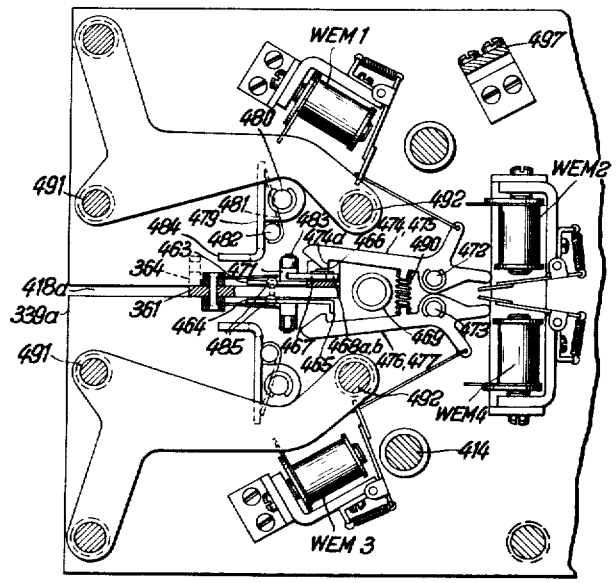
FIG. 9 is a side view of the storer clearing device.

The above-mentioned groups of racks 332 and 333 serve to introduce computing values into the computing mechanism in cooperation with set-up or posting devices which supply these values as will be described in a later place. For thus operating the racks, there is provided a control head 361 (FIGS. 2, 3, 8, 9) to which a movement in the direction of the arrow 334a (FIGS. 2, 8) can be imparted by means of a driving device. The edges 362 of the respective racks 332 (FIG. 2, left) abut against the rear edge of control head 361 under the biasing force of a spring 363 which is attached to a lateral flange portion 364 of the control head (FIGS. 2, 3, 9). The control head, acting through these springs, can also entrain the racks in the direction of the arrow 335a (FIGS. 2, 8). Each rack 332 carries a row of ratchet teeth 365 comprising ten tooth gaps corresponding to the values 0, 1, 2 . . . 9 of the decimal system, the ratchet teeth 365 being shown (by broken lines) covered by the respective racks 332 in FIG. 2. Each of the respective ratchet rows 365 is engageable with a pawl 366 pivoted on one of a corresponding number of levers 367, such ratchet engagement being controlled by an electromagnet SLM which receives excitation at the proper time.

The electromagnets SLM are mounted on an angle beam 373. Each magnet has an armature 374 which, when the magnet SLM is excited, abuts against an arm 375 of pawl 366 thus moving the pawl into the row of ratchet teeth 365 on rack 332. This has the effect of arresting this particular rack 332 which, from then on, can no longer follow the advancing movement of the control head 361 which merely continues to stress the appertaining spring 363. Depending upon the moments of excitation of the respective magnet SLM, a given numerical value is loaded into the racks 332. Each movement of the racks 332 is also imparted to the racks 333 through the links 378 (FIG. 2). All arrested racks can be aligned for the purpose of a totalizing operation described in a later place.

The motion of control head 361 is controlled from the machine main drive by means of the above-described single-turn clutch (FIGS. 10, 11) which imparts to the storer main shaft 381 a single stepwise rotation in response to excitation of the storer control magnet SpM (FIGS. 10, 11). The control head 361 is guided in slots 418, 418a of the side walls 339, 339a (FIGS. 2, 3, 4, 8, 9) and is pivotally connected by a link 415 with a reversing lever 413 (FIGS. 3, 8) pinned upon a shaft 414. The reversing lever 413 is connected by another link 412 with a crank 411 of a shaft 401 (FIGS. 1, 3, 5, 8) journaled between the side wall 339 and an intermediate bearing plate 398 (FIGS. 3, 8). Rigidly joined with shaft 401 is a set of spur gears 404 and 405 and a stop disc 406 which are riveted to one another (FIGS. 3, 8). The spur gears 404 and 405 are in engagement with two only partially teethed gears 407, 408 pinned to the storer main shaft 381. The stop disc 406 can cooperate with another stop disc 409 (FIGS. 1, 3, 8) pinned onto the storer main shaft 381. The arrangement of the recesses in the stopping discs 406, 409 and the positioning of the teeth on gears 407, 408 is such that when the storer main shaft 381 rotates in the direction of the arrow 410 (FIG. 8) the shaft 401 will turn in predetermined intervals of time. That is, at first the shaft 401 remains at rest; then it is turned by spur gear 407, whereafter it again remains at rest until it commences to follow the rotation of spur gear 408. Due to the different pitch-circle diameters of respective spur gear 407 and 408 and the correspondingly different spur gears 404 and 405, the shaft 401, during the foregoing operation, revolves at respectively different speeds, running slowly during the first portion but faster during the second portion of rotation. Due to the action of connecting links 412, 415, this motion of shaft 401 is imparted to the control head 361 so that, by virtue of the above-described different rotating speeds, the control head moves slowly out of the starting position in the direction of the arrow 334a, but is thereafter returned at greater speed back to the starting position. In its fully displaced position, the control head remains stationary for a certain interval of time before it commences the return stroke. During this temporary standstill, the above-mentioned aligning of the racks 332, 333 for totalizing operation takes place.

For securing parallel motion of the control head 361 during displacement, a second, identical set of the above-described parts 413, 415 for driving the control head 361 is mounted on the sidewall 339a (FIG. 3).

The storer main shaft 381 cooperates with further means which serve to drive the slider 352 (FIGS. 3, 5, 6, 7) for plus-minus switching as follows. A set of control members, composed of a spur gear 429 and a stopping disc 428, is fastened to the storer main shaft 381 between the sidewall 339 and the intermediate bearing plate 398 (FIGS. 3, 5). The operation of the group of control gears 428, 429 is similar to that of the above-described control group for driving the control heads. The gear 429 has only part of its periphery provided with rows of gear teeth, and these rows are located on three different places. The gears 428, 429 cooperate with an eccentric drive which is journaled on a pin 431 fastened on the inner side of the bearing plate 398. The eccentric drive comprises a locking disc 432, a pinion 433 and an eccentric 434. The gear set 428, 429, rotating together with the storer main shaft 381, causes the eccentric drive to perform two full rotations during a single complete rotation of the storer main shaft. However, the rotating motion of the eccentric mechanism is temporarily interrupted due to the particular arrangement of the tooth rows of gear 429. At first, the tooth portion 429a of gear 429 enters into meshing engagement with the pinion 433, while simultaneously the recess 428a of the locking disc 428 permits the eccentric drive to rotate 180°. Then the eccentric mechanism remains at rest until the tooth portion 429b effects rotation of the eccentric by 360°. After a short interval of standstill, the eccentric mechanism is turned another 180° by means of the tooth portion 429c of gear 429. The eccentric 434 is in engagement with a connecting rod 435 linked to the slider 352, so that during one rotation of the storer main shaft 381 the slider is moved twice forward and back.

Also mounted on, and pinned to, the storer main shaft 381 is a cam disc 430 (FIGS. 3, 5) which controls a follower 436 shaped as a bell-crank lever and pivoted at 400 (FIG. 5). The follower 436 carries a roller 438 and is biased by a spring 437 counterclockwise so that roller 430 rests against cam disc 430. Another roller 439 is journaled on a pin fastened to cam disc 430. During rotation of cam disc 430, the rollers 438 and 439 impose a constrained motion upon the follower 436 so that the follower is turned first counterclockwise and thereafter clockwise. One end of a linking rod 441 is pivotally joined with an arm 436a of the follower 436, and the other end is connected with a cross-rail 442 slidably guided in slots 443 and 443a of the respective sidewalls 339 and 339a (FIGS. 2, 3, 5). By action of the driving devices just described, the crossbar 442 is first moved in the direction of the arrow 444 (FIGS. 3, 5), thereafter in the reverse direction, and subsequently again in the direction of arrow 444 back into the starting position illustrated in FIG. 5, the motion in opposition to the direction of arrow 444 extending beyond the starting position of the crossbar 422. For securing parallel motion of crossbar 444, a second, identical set of the above-described driving members is mounted on the sidewall 339a (see FIG. 3). The devices just described serve for the actuation of zeroing and totalizing bars 445, 446, one of each being assigned to each of the carrier plates 300a (FIGS. 2, 4) of the computing mechanisms. The bars 445, 446 are longitudinally displaceable beside the rack 332. The bar 445 is located between the rack 332 and the plate 300a, and the bar 446 is disposed on the other side of the rack 332 (see FIG. 4). The zeroing and totalizing bars of all carrier plates 300a are connected with the above-mentioned crossbar 442 so that the described motion of the crossbar is transmitted to the longitudinal bars 445, and 446.

By means of the zeroing bar 445 all spring levers 316 of each carrier plate 300a are re-set to starting position. This is done by projections 448 of the bar 445 which, during motion of the bar in the direction of arrow 444, enter behind the lateral lugs 324 (FIGS. 2, 4) of the spring levers 316 and thus move these levers in opposition to the direction of the arrow 323 (FIG. 2). This places all spring levers back into the starting position so that any switching brackets 320 that may have been turned for the purpose of tens transfer, again assume their starting positions under the action of springs 322.

The totalizer bar 446 (FIGS. 2, 4) becomes effective during motion in opposition to the direction of arrow 444 (FIG. 2, right). During such motion, lateral stop projections 449 of bar 446 enter into the range of the counting gears 328 then in engagement with one of the racks 332, 333, so that the lateral lugs 338 (FIGS. 2, 12, 14) of the arms 336 can abut against the stops 449. For totalizing operation, the desired computing mechanism is coupled, prior to advancing movement of the control head 361 from its starting position, with the group of racks 332. During subsequent motion of control head 361 in the direction of arrow 334a, the racks 332 follow in the same direction and then turn the counting gears 328 of the coupled computing mechanism until the totalizer lugs 338 of the individual counting gears abut against the stop projections 449 of the totalizer bar 446. As a result, each rack 332 travels a certain distance, and thus is loaded with a value, which corresponds to the one previously incorporated in the rotary displacement of the counting gear at this particular digital position of the computing mechanism.

In the computer mechanisms so far described, the tens transfer at the zero passage of the counting gears 328 is effected, as already explained, by the action of the tens-transfer lug 337 (FIG. 12) which, in each computer mechanism for a given digit position, abuts against the switching bracket 320 of the adjacent computer mechanism assigned to the next higher digit position, thus turning the switching bracket 320 with the result of also turning the spring lever 316 of the latter digit position in the manner already explained. These above-described computer mechanisms operate as add-sub devices so that, by means of the racks 332 only positive sums can be totalized. As will be more fully explained below, these computer mechanisms can be used as balance computers, even with an only positive sum totalizing operation, by virtue of a corresponding arrangement and inter-wiring of the storer assembly still to be described. However, it is in some cases desirable to design such computers also as balance computing devices, that is to permit the drawing of a negative sum by operation of the rack 333. Two such totalizing mechanisms are shown in FIG. 2 (right-hand portion of FIG. 2). In these mechanisms, the arms 451 firmly joined with the counting gears 328 respectively are given a design different from the corresponding arms 336 of the previously described add-sub mechanisms. The respective lateral lugs 452 of the arms 451 in the balance computing mechanisms, which serve as tens-transfer members like the lugs 337 of the above-described add-sub mechanisms 301 (FIG. 2), have also the purpose to act as balance computing stops. For drawing the sum total, the totalizer bar 446 is provided with stop wedges 453 (FIG. 2) in the range of the balance totalizing computer mechanisms. The stop wedges 453 are bent out of the plane of the sum totalizer bar 446 into the plane of the tens-transfer lugs 452. When the totalizer bar 446 is being moved in the direction opposed to that of the arrow 444, the stop wedges 453 place themselves into the range of the lug 452 and act as sum totalizing stops. When a balance totalizing computer mechanism is coupled with the group of racks 332, then the counting gears 328, when reaching the position "0", engage the balance totalizer stop. By coupling the balance computer mechanisms with the group of racks 333, a negative sum (minus total) can be totalized, and the counting gears then engage the balance totalizing stop when reaching the position "9".

Figure 16:
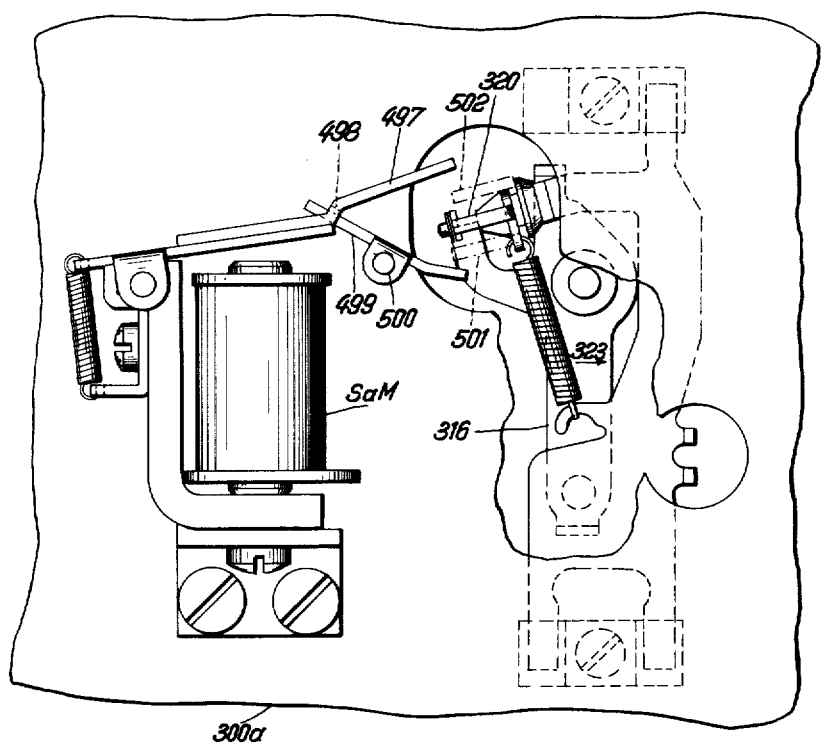
FIG. 16 illustrates a side view of a switching device cooperating with the computing mechanism of FIGS. 12 to 15.

All computer mechanisms that thus serve as balance totalizing computers are equipped with an additional device for the switching of the escaping "1". For this purpose a supplementary computing mechanism is provided adjacent to the highest-digit computer mechanism of each computer group used for balance totalizing. The supplementary computing is not provided with a counting gear 328 and its spring lever 316 when released is capable, by means of its pin 327 (FIGS. 12, 14), to close a set of contact springs SaK (SaK1, SaK2 in FIG. 21, middle) whose circuit includes a control magnet SaM (FIG. 16, and SaM1, SaM2 in FIG. 21). The magnets SaM are mounted on the respective carrier plates 300a that appertain to the lowest digit positions of all groups of computing mechanisms. The armature 497 of each of the SaM magnets is provided with a slot 498 (FIG. 16) traversed by a sheet metal part 499 which is rotatable on a pivot pin 500 mounted on the plate 300a. Excitation of magnet SaM causes closing of the scissor-like lever mechanism formed by the armature 497 and the part 499. The switching bracket 320 in the lowest digit position of the balance totalizing mechanism projects through an opening of plate 300a into the active range of the scissor mechanism, so that the closing of that mechanism imparts to the latter bracket a rotary movement with the effect of releasing the spring lever 316 of the lowest digit position. Movement of spring lever 316 in the direction of the arrow 323 switches the appertaining counting gear 328 one additional tooth position as already explained. Due to the operation described above with reference to tens-transfer operation, such additional movement of the counting gear 328, effected by release of the spring lever, is always in the correct direction, depending upon whether the balance totalizing mechanism is coupled with one or the other group of racks 332 and 333. By virtue of the scissor-like design of the lever mechanism 497, 499, the moving direction of the switching bracket 320 of the lowermost digit in the balance totalizing computer mechanism, in dependence upon coupling of counting gear 328 with rack group 332 or 333, is always correctly chosen because in one case the switching bracket 320 approaches the lever 497 and in the other case the lever 499, dependent upon whether the slider 302 is displaced upwardly or downwardly. In FIG. 16 the dot-and-dash lines 405 show the location of the switching bracket 320 when the balance totalizing mechanism is coupled with the group of racks 333; and the dot-and-dash lines 502 show the location of the bracket when the mechanism is coupled with the group of racks 332.

Assigned to each balance totalizing mechanism is a function switching device or "monitor" of the programming assembly. The switching condition of the monitor indicates the particular condition of the computer mechanism, that is whether the computed magnitude is positive or negative. This monitor serves also for the control of the positive or negative coupling of those computers that are designed as balance totalizing devices; it serves also for controlling the printer assemblies to switch between black and red printing for distinguishing positive and negative amounts on the printed records, for transferring the sums computed by the balance totalizing computing mechanism, separated into positive or negative values, into other computing devices (for instance positive or negative balance storing devices) or for similar special control purposes as may be desired with a particular accounting machine. As regards design, these function-switching monitors are similar to the programming monitors already described, except that they resume their starting position already after their second switching position.

*Storer assembly*

Corrrelated to the above-described computing mechanisms is a storer assembly designed, according to the invention, as a central memory device which, by means of the machine control system, can be selected for cooperation with any one or more of the other sub-assemblies of the machine in any desired sequence. In the illustrated embodiment, the storer assembly is built up of components of the selector-switch type. Each digit position of the set of computer mechanisms, that is each of the carrier plates 300a (FIGS. 2, 3), is provided with a group of storer selectors SEW above and below the control head 361. Each selector group consisting of two selector paths or positions disposed in two different planes one beside the other. Of course, more than two selector paths per group may also be provided. Each selector comprises a spur-gear segment 454 (FIGS. 2, 21) rotatable about a shaft 491, 492 and provided with two contact spoons 456, 457. The contact spoons 456 and 457 are insulated from each other and from the selector frame 455. Each spur-gear segment 454 meshes with one of respective racks 459/1 to 459/4 displaceably mounted on the carrier plate 300a. Each of these racks has an extension also designed as a rack 461 which extends into the range of the above-described groups of racks 332. By means of rotatably mounted pinions 460/1 to 460/4 of coupling sliders 447 (FIG. 2) displaceably mounted on the plates 300a, the racks 459/1 to 459/4 and thus the storer selectors SEW1 to SEW4 can be selectively coupled with the racks 332. When thus coupled, the return movement of the racks 332 into the starting position imparts through segments 454 to the contact spoons 457 an amount of rotation corresponding to the values represented by the amount of previous rack forward travel. As a result, such value is then represented by an electric circuit connection in the coupled storage selector SEW1 to SEW4.

Additionally, each storer selector SEW1 to SEW4 may be equipped with special selector paths or portions whose appertaining contact spoons 456, 457 are firmly connected with one of the spur-gear segments 454, so that by adjustment of a segment 454 the normal selector portion of the selector as well as any additional, special selector portions are controlled simultaneously.

The device for displacing the coupling sliders 447 (FIG. 2) and hence for placing the pinions 460 into meshing engagement with the rack portion 461 of one of the respective racks 459 and with the rack 332, comprises the same mechanism components as are described above with reference to the couplings between the computer mechanisms and the racks 332, 333, except that the links 351 and the levers 347 are not used because the coupling sliders 447 (FIG. 5) carrying the pinions 460, need be displaced in only one direction. The electromagnets for initiating this coupling movement are denoted as storer loading magnet SWM1 to SWM4 (FIGS. 5, 21), for distinction from the computer control magnets RM.

A particular device, described presently, permits selectively clearing any one of the storer selectors SEW1 to SEW4. Two clearing bars 463, 464 are displaceably mounted on the control head 361 by means of a pin-and-slot connection 469, 470 (FIGS. 2, 3, 9). Clearing bar 463 is disposed on the upper side, bar 464 on the lower side of control head 361 so that the upper clearing bar 463 can cooperate with the storer selectors SEW1 and SEW2 and the lower clearing bar 464 with the storer selectors SEW3 and SEW4. The clearing bars have angular lugs 465, one for each of the respective carrier plates 300a. In the starting position of the clearing bars the lugs 465 are located between the racks 459/1 and 459/2 or 459/3 and 459/4 of each plate 300a. In the working positions of lugs 465, the lugs can cooperate with projections 462 of the respective racks 459 (FIG. 2). Therefore, the racks 459 are not affected by the clearing bars 463, 464 when these bars are in the normal position of rest. Displacement of any one clearing bar relative to control head 361 in one or the other direction places the lugs 465 of that clearing bar into the range of a rack group 459/1 or 459/2. As a result, the forward movement of control head 361 away from its starting position causes the lugs 465 to entrain the projections 465 of the racks 459 and to return the racks back to the starting position illustrated in FIG. 2. Simultaneously, the appertaining storer selector SEW is returned to zero position due to spur-gear segment 455 rotating together with the displacement of the rack 459.

For displacing the clearing bars 463, 464, the following device is mounted on the control head 361:

The control head 361 carries on its upper side a pivot pin 466 (FIGS. 3, 9) on which a guide lever 467 is rotatable. Lever 467 has two noses 468a, 468b. The clearing bar 463 carries a pin 471 straddled by a fork 468c of guide lever 467. Two pivot pins 472, 473 are riveted to the inner side of the storer side wall 339a. Each of pins 472, 473 carries two pawls 474, 475 and 476, 477, both of the same design. Let us first consider only the pawls 474 and 475 which cooperate with the guide lever 467. The pawl 474 can be turned by an electromagnet WEM1, and the pawl 475 can be turned by an electromagnet WEM2, to such an extent that the pawl noses 474a and 475a can place themselves in front of the noses 468a and 468b. Only one of the two magnets must be excited at a time so that only one of the pawls 474, 475 is turned, and this must be effected prior to movement of the control head 361 out of its normal position of rest. When the control head starts moving in the direction of the arrow 334a, then the guide lever 467, pivoted on the control head, performs the same movement. One of the noses 468a or 468b of guide lever 467 is kept arrested by the pawl nose 474a or 475a of the turned pawl 474 or 475, so that the guide lever 467 is turned about its pivot. Assuming that the pawl 475 has been turned by the appertaining magnet WEM1, then during movement of the control head 361 away from its normal position of rest, the guide lever 467 will rotate counterclockwise. The fork 467c then acts upon the pin 471 of the clearing bar 463 so that the clearing bar 463 is entrained and displaced in the direction of the arrow 478 (FIG. 3). The rotary displacement of the guide lever 467 causes the pawl nose 475a of the rotated pawl to slide off the nose 468a. Thus, the lugs 465 of the clearing bar are shifted into the range of the projections 462 (FIG. 2) of all racks of the group 459/1 which, during the further movement of the control head, are pulled by lugs 465 into their normal position of rest while placing all contact spoons of all selector portions 455/1 of the storer selector SEW1 into zero position.

During the return motion of the control head 361, the laterally displaced clearing bar 463 is also returned to its normal position. For this purpose, a guide piece 479 (FIGS. 3, 9) is rotatably mounted on a pivot pin 480 riveted to the side wall 339. The guide piece 479 is biased by a rotational spring 481 so that the rear side of piece 479 is urged against a stop pin 482. The pin 471 of clearing bar 463 carries a roller 483. In the laterally displaced position of the clearing bar, the roller 483, during movement of the control head 461 away from its normal position, presses against guide piece 479 and turns it clockwise against the force of spring 481. During return travel of the control head 361, the roller 483 glides into a funnel-shape guide 484 of guide piece 479, whereby the clearing bar 463 is pulled to its mid-position because the stop pin 482 prevents yielding of the guide piece 479. The three positions of the clearance bar—base position, right and left working positions—are fixed by respective ball-type catches 485 (FIG. 3).

Clearing of the storer selectors SEW3 and SEW4 mounted below the control head 361, is effected by the abovementioned clearing bar disposed below the control head 361. The device for displacing the clearing bar 464 into its working and base positions, including the appertaining pawls 476, 477 and their magnets WEM3, WEM4 is designed in exactly the same manner as the clearing device for the storer selectors SEW1 and SEW2 just described. Common to all pawls 474 to 477 is a tubular stop pin 469 which is riveted into the side wall 339a. Two return springs 490 are provided, each urging two pawls 474, 476 and 475, 477 to the normal position.

The storer selectors SEW, SEW2, stacked one behind the other, as well as the corresponding storer selectors SEW3, SEW4, can be swung out of the supporting frame structure of the storer assembly for better supervision and checking of the appertaining electric wiring.

The electric wiring of the storer assembly just described is illustrated in FIG. 21, neglecting the mechanical details of the individual components and representing schematically only the appertaining electric contact members and circuit connections. For fully explaining the operation and purpose of the storer assembly, there are also shown the electric contact connections of the required additional sub-assemblies of the counting machine illustrated in FIG. 1, the mechanical design of these other sub-assemblies being described in a later place.

For the purpose of lucid illustration and explanation, the representation of the electrical components in FIG. 21 has been considerably simplified, mainly by showing only a few of the many identical members of the respective groups of devices. Thus, only the two of the storer selector switches, namely those denoted by SEW1 and SEW4, are illustrated, and only the first five value positions, as well as the last position, of the two illustrated selectors are shown.

As is apparent from the circuit diagram (FIG. 21), the storer selector SEW1 is provided with a special selector portion SEW1a. As mentioned above, the adjustment of the special selector portion is effected, in synchronism with the adjustment of the normal selector portion SEW1, by means of the rack 459/1 (see FIG. 2). In contrast to FIG. 2, some of the movable contact arms 456, 452 of the selectors are shown in working position for the purpose of explaining the operation with reference to a concrete example presented below. The supply leads to the storer selectors SEW1 to SEW4, in accordance with the decimal system, are assigned to the numbers "0" to "9" and are hereinafter designated as "value leads" 520/0 to 520/9 or 521/0 to 521/9 . . . or 524/0 to 524/9. All mentioned value leads, including the value leads of the storer selections SEW2 and SEW3 not illustrated in FIG. 21, are connected with numerically corresponding "value main leads" 526/0 to 526/9 respectively, with the exception of the value leads 521/0 to 521/9 of the special portion 1a of the storer selector SEW1 which are connected with the main value leads in a complementary manner. That is, the "0" lead 521/0 is connected with the "9" lead 526/9, the "1" lead 521/1 with the "8" lead 526/8 and so forth.

Connected to each bank contact (value position) of the storer selectors SEW is an exit lead 527/1 to 527/n, 528/1 to 528/n, 529/1 to 529/n, 530/1 to 530/n, hereinafter collectively designated as selector exits "527" to "531." Further provided in the storer selector SEW1 are bridging leads 532 to 539 which, as will be described, serve for suppressing the cipher at the left of the highest digit position when printing a magnitude stored in the storer assembly. The special portions 1a of the storer selector SEW1 are provided with bridging leads 540 to 547 which are wired in inverse relation to the bridging leads 532 to 539 of the normal selector portion so that in this case, too, a complementary wiring is provided. The wiring of the other storer selectors corresponds exactly to the one described with reference to the storer selector SEW1 and, for that reason, is not further described in detail. Each movable wiper-contact arm 456, 457 of the individual selector portions is connected to a current supply lead 548 or 549.

Connected with the value main leads 526/0 to 526/9 are a number of parallel-connected pulse generators which consist essentially of current distributor switches, namely a storer current distributor SpV (FIG. 21, left), a printer current distributor DSV, and a puncher current distributor LSV. When these distributor switches are being driven, they provide the individual value leads with voltage in a given time sequence. Such operation of the individual current distributors is synchronous with the respective correlated main control shafts of the different machine sub-assemblies, which shafts, as introductorily mentioned, are driven from the machine main drive at the proper time under control by respective single-turn clutches under control by switching magnets. The current distributors and their functioning will be more fully described below.

Figure 19:
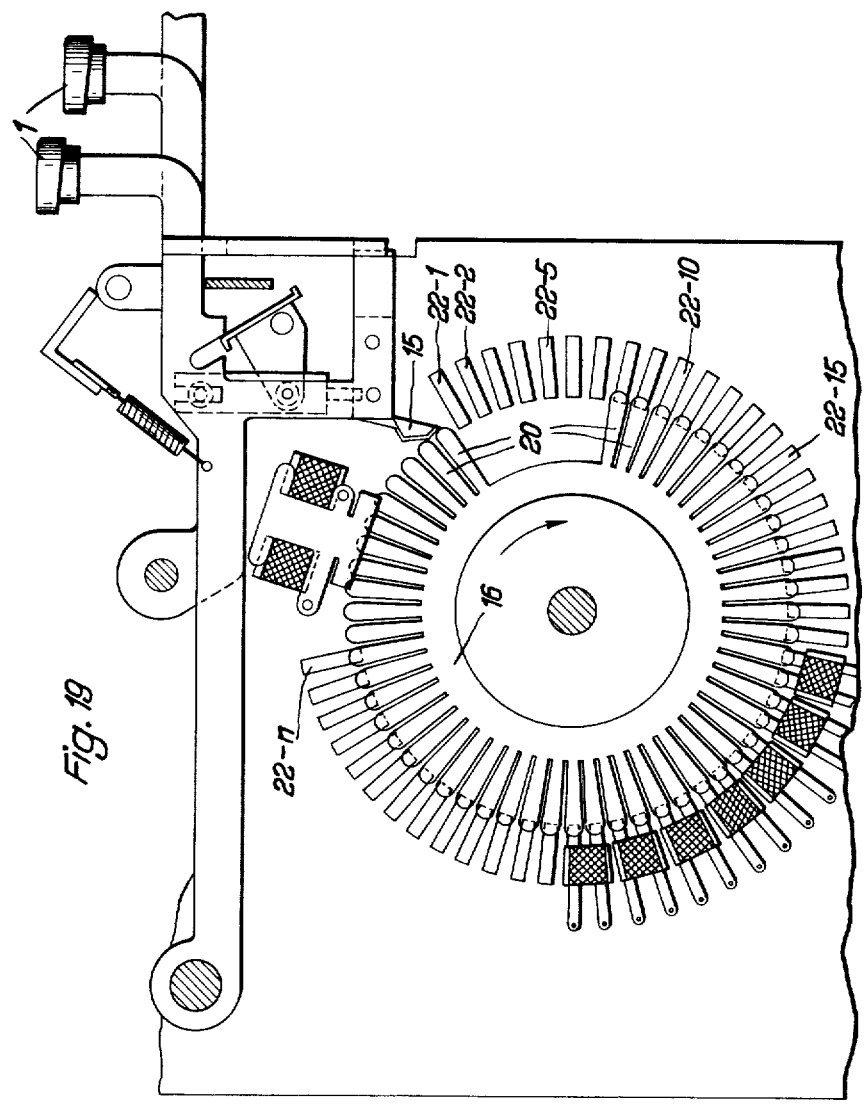
FIG. 19 is a side view of a value posting device cooperating with the keyboard assembly of the machine.

The value main leads 526 are further connected through the contacts of a value relay WR (FIG. 21, lower left) with a value posting designed and operating on the principle of a cross-bar distributor. This posting apparatus is schematically represented by a straight-line diagram in the left lower corner of FIG. 21, and the construction of its individual mechanical components is illustrated in FIG. 19. The cross-bar distributor apparatus is similar to the one described in our Patent 2,765,116, assigned to the assignee of the present invention.

Ten contact stars, shown at 16 in FIG. 19, are arranged coaxially beside one another and are correlated to the respective numbers "9" to "0." These ten contact stars are schematically represented in FIG. 21 as horizontal lines 16–0 to 16–9. The contact stars cooperate electrically with stationary contact bars 22–1 to 22–n (FIG. 19) which are schematically represented in FIG. 21 by correspondingly designed vertical lines. When one of the number keys 1 of the ten-key board (FIG. 19, see also FIGS. 1, 24) is depressed by the operator, a cam member 15 (FIG. 19), connected with the depressed number key, places one of the contact tongues of one of the respective contact stars 16 into electric contact engagement with the contact bars 22 which slides progressively over the contact bars 22 until all numbers are completely posted into the keyboard. A number of such contact connections between a tongue 20 of several respective contact stars 16 are denoted in FIG. 21 by circles about the intersection points of the horizontal lines (stars 16–0, 16–2, 16–6) and the vertical lines (contact bars 22–1, 22–2, 22–3); and it will be understood that when further numbers are posted, the constellation of the three illustrated connections will travel stepwise toward the left in the diagram. The contact star 16–0 assigned to the number "0", when in its starting or zero position, is in conductive connection by its tongues 20 with the bars 22. When a numerical magnitude is posted, these tongues progress along the contact bars and thus release their previously occuped position for a new contact connection to be established by accuration of a number key. This advancing zero connection is hereinafter called "forerunning zero." It prevents loading any "uncalled" value positions of the computer assembly. The digit-value leads 1022/1 to 1022/n connected with the contact bars 22–1 to 22–n can be connected by means of the programming monitor devices with the digit-value leads 550/1 to 550/n of respective storer loading magnets SLM/1 to SLM/n (FIG. 21 middle; corresponding to the storer loading magnet SLM in FIG. 2).

Further connected with the value main lines 526 (FIG. 21) are the value leads 551/0 to 551/9, 552/9 and so forth of the scanner sub-assembly which is schematically represented in FIG. 21 only by its first two and its last digit positions. The connection is again such that all leads assigned to the values "0" to "9" in the scanner are connected with the value main leads corresponding to the same respective values "0" to "9". The exit leads 560/1, 660/2 and so forth of the scanner are connected with the respective digit-position leads 550/1, 550/2 and so forth by means of the function-switching monitor devices already mentioned and more fully described below with reference to the schematic illustrations in FIGS. 22 and 22a. This monitoring control still to be described is such as to selectively correlate either the ten-key board 1 or the punched-hole scanner 600 (FIG. 1) with the storer loading magnets SLM.

Before dealing with the operation of the electric system, it will be necessary to first describe several of the sub-assemblies that are to selectively cooperate with the storer assembly, namely the scanner, the printing assemblies, and the puncher.

Scanner

The mechanical construction and the operation of the scanner 600 (FIG. 1) will be described with reference to FIG. 20.

The main control shaft 601 of the scanner is driven from the continuously rotating main drive under control by a single-turn clutch as described above with reference to the clutch (FIGS. 10, 11) for the main control shaft 381 of the storer assembly. Thus, the main control shaft 601 of the scanner (FIG. 20) performs a single revolution in the clockwise direction during each cycle of operation. During such operation, two cams 602 on shaft 601 turn two drive levers 604 and two drive levers 605 about their common pivot shaft 603. Mounted on drive levers 605 is an angle rail 606 which normally holds the feeler members 607 raised in inactive position. During the above-described movement of levers 605 about pivot pin 603, the rail 606 is lowered and then permits the feeler members 607 to drop onto an account card 609 located within the card guide 608, so that the feeler pins of member 607 may enter into any holes of the account card 609 that may then be located beneath the feeler pins.

The feeler members 607 are engaged at their respective tops by coupling arms 611 which are pivoted by means of pins 610 to respective sliders 616. The respective coupling arms 611, due to their own weight, follow the downward motion of all lowered feeler members 607 so that a recessed shoulder portion 611a of each lowered arm enters into engagement with a cross bar 612 which forms part of a driving frame 613. When the drive levers 604 impart to the driving frame 613 a displacing motion in the direction of the arrow 614, the cross bar 612 displaces only those adjusting sliders 616 that are then coupled with cross bar 612 by the respective arms 611. The other sliders 616 whose coupling arms 611 remain in the inactive position because the feeler pins of appertaining feeler members 607 are not in registry with punched places of the account card and thus remain raised, are not in engagement with the cross bar 612 and therefore remain in the normal position illustrated in FIG. 20. Each of sliders 616 carries a set of movable contacts 615 to cooperate with a set 618 of stationary contact springs.

Figure 20:
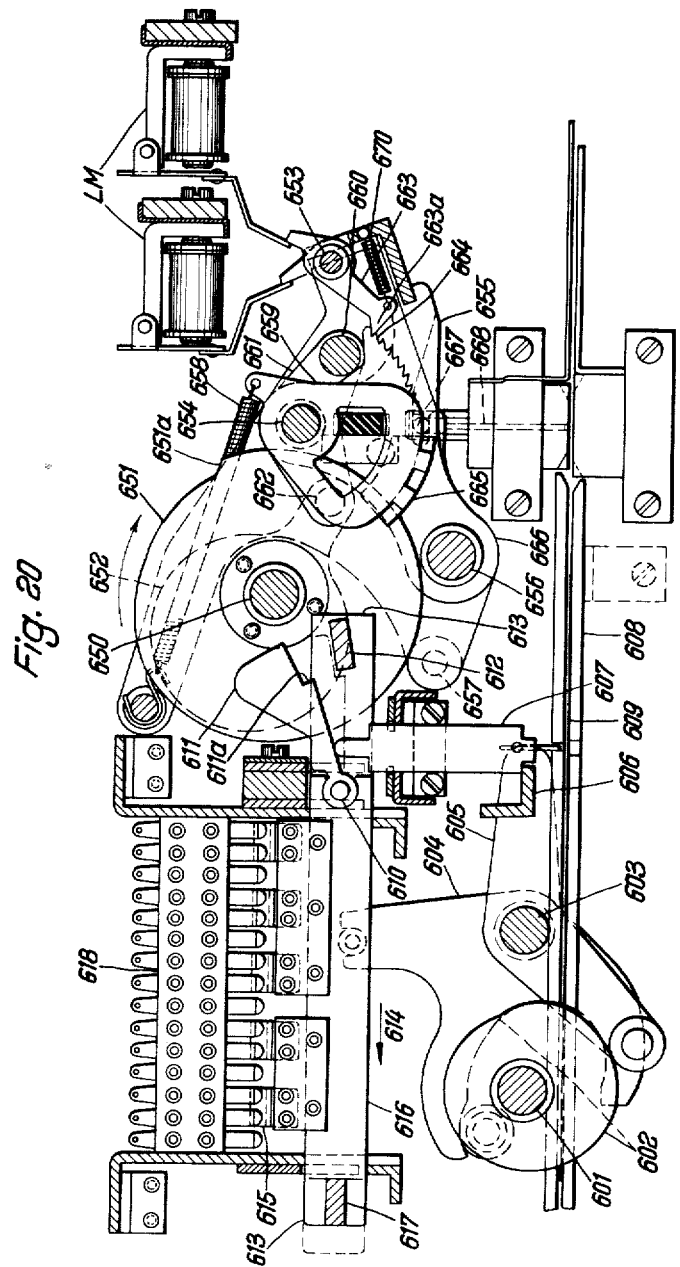
FIG. 20 is a side view, partly in section, of the scanning device for the sensing and punching of code notations that represent magnitudes and symbols on the account cards.

During the further course of rotation of the main control shaft 601, the angle rail 606 on driving levers 605 is active to return the feeler members 607 and thus also the coupling arm 611 into the inactive position shown in FIG. 20. The drive levers 604 also return the driving frame 613 to the position of rest and, through a cross bar 617, also the previously displaced adjusting sliders 617.

By the operation of the devices just described, the values or other symbols represented on the account cards 609 in form of punched-hole combinations are translated into electric circuit connections between the contacts 615 and 618 which are transferred into the storer assembly prior to zeroing of the scanning device in a manner explained in a later place. For simplicity, the contact pieces, arranged according to FIG. 20 in groups of contact strips 615 and 618, are shown in FIG. 21 as selector-type components, the contacts 615 being represented as rotary wiper arms 615, 615/1, 615/n.

The single-turn clutch for connecting the scanner main control shaft 601 with the machine main drive is put into operation by means of a switching magnet AbtM (FIG. 21 middle left) as will also be described below.

Printer assemblies

The above-mentioned storer-selector exits 527, 528, 529, 530, 531 can be selectively connected, by operation of the programming monitor devices illustrated in FIG. 22 (see also FIG. 17) with electromagnets LM, SM, USM (FIG. 21, bottom right) that control the various registering assemblies, such as the puncher assembly, the journal (upper) printing assembly and the card (lower) printing assembly. For simplicity, the current supply leads 562/1, 562/2 . . . 562/n (FIG. 21) of the puncher control magnets LM are hereinafter collectively denoted as puncher leads 562, the supply leads 563/1, 563/2 . . . 563/n of the journal printing magnet SM in the "upper printer" 200 (FIG. 1) are denoted as "upper-printer" lead 564, and the current supply leads 564/1, 564/2 . . . 564/n of the card printing magnets USM for the "lower printer" 800 (FIG. 1) are collectively denoted as lower-printer lead 563.

Before further explaining these selective circuit connections, it will be necessary to first briefly describe the construction and operation of the upper-printer assembly 200 (FIG. 1). This will be done with reference to FIG. 18.

Figure 18:
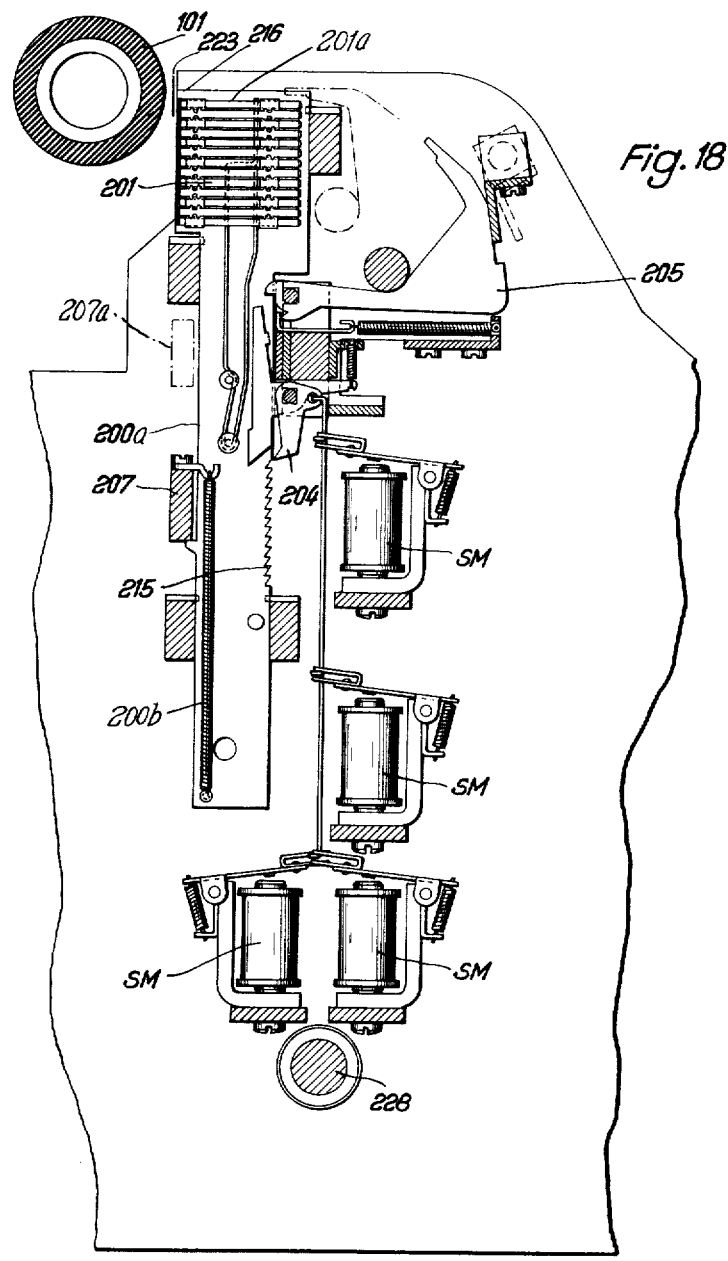
FIG. 18 is a side view of one of the printing mechanisms that form part of the printer assemblies of the machine.

Each individual type carrier 200a, assuming that it is designed for the printing of numbers, carries a set of individually displaceable type bars 201a provided with printing types 201 corresponding to the numbers 0, 1 . . . 9. Type carriers of this design are known as such from U.S. Patent 2,698,573 of A. Krüger, assigned to the assignee of the present invention. Each individual type carrier 200a is provided with a magnet SM which, when excited, moves a pawl 204 into a row of ratchet teeth 215 of the type carrier 200a. All type carriers of the printer assembly are simultaneously displaced by means of a lifting beam 207 driven from the printer control shaft 228 so that the respective selected printing types 201 are placed onto the printing position indicated by a horizontal line 216 in FIG. 18. The types to be imprinted upon the journal sheet, voucher or other record are then located horizontally in front of the platen roller 101 (FIGS. 18, 1, 24). When the magnet SM (FIG. 18) of a type carrier 200a is excited, the pawl 204 enters into the ratchet 215 of the carrier so that the carrier is stopped and an appertaining spring 200b is tensioned while the lifting beam 207 continues its upward travel into a top limit position indicated by a dot-and-dash line 207a. After the lifting beam 207 has reached the top limit position all type carriers 200a are properly adjusted to the printing position. Then a striker 205 is released and produces on the journal sheet resting against the platen roller 101 an imprint by means of an inking ribbon 223. All type carriers 200a that have not been arrested by excitation of their respective magnets SM and hence reach the top limit position do not have a type bar located on the printing line 216. Consequently, only the properly selected types are imprinted upon the sheet.

The printer current distributor DSV (FIG. 21, top left), rotating in synchronism with the displacing motion of the type carriers, controls the stop magnets SM (FIG. 21 bottom, FIG. 18) to respond at the proper moment as will be more fully described below.

The printer control shaft 228 is likewise driven by means of one of the single-turn clutches already described. The control magnet for this clutch is denoted by ODrM in FIG. 21 (top left). Shortly before the printer control shaft 228 (FIG. 18, FIG. 21 left upper portion) completes its single revolution it closes a contact 260. The electric impulse thus produced serves control purposes still to be explained.

The lower printer assembly 800 (FIG. 1) for imprinting the account card 609 has the same construction as the upper printer assembly, both printer assemblies being assigned to one and the same printer current distributor DSV (FIG. 21). The design and functioning of the lower printing assembly therefore need not be further described in detail. Its operation is controlled and initiated by a magnet UDrM (FIG. 21, upper left) and will be explained in connection with an operating example.

Puncher assembly

In the illustrated embodiment the means for producing scannable code marks on the cards is designed as a punching device. According to FIG. 20, the main control shaft 650 of the puncher is coupled at the proper time with the machine main drive by a single-turn clutch of the above-described design (FIGS. 10, 11) and then performs a single revolution. The control magnet which releases this single revolution is denoted by LoM in FIG. 21 middle left. The same magnet LoM also initiates the synchronous drive of the puncher current distributor LSV which controls in a manner still to be described the stop magnets LM (FIGS. 20, 19) through the programming monitor devices (FIG. 22).

Rigidly mounted on the main control shaft 650 (FIG. 20) of the puncher assembly are two cam discs 651 and two eccentric drive members 652. A puncher frame 655, formed of two side parts and two shafts 653, 654, has a pivot shaft 656 journalled in the side walls of the machine frame structure (not illustrated in FIG. 20) and is normally held in inactive position by means of two rollers 657 mounted on the respective side parts of the puncher frame and resting against the respective cam discs 651. A number of puncher segments 659 are rotatably mounted side by side upon the shaft 654 and are individually biased counterclockwise by respective springs 658. A switching frame 661 is formed by two angle pieces rotatably mounted on shaft 654 and a cross bar 660. Frame 661 normally maintains the puncher segments 659 in the inactive position of rest illustrated in FIG. 20, due to the fact that the switching frame 661 is kept in its blocking position by means of the eccentric drive members 652 and are linked with frame 661 by means of pivot pins 662.

Rotatably mounted on shaft 653 are a number of stop pawls 663 which are correlated to the respective puncher segments 659. The stop pawls 663 can enter their respective noses 663a into the stop rack 664 of the respective puncher segments 659 when these racks are turned clockwise about their pivot shaft 653 by means of the stop magnets LM which are excited in a given time sequence. Each rack 664 has ten teeth. The puncher segments 659 carry respective selector pieces 665 which are shaped in accordance with the selected code combination. The selector pieces 665 cooperate, by means of an appertaining frame 666 pinned upon shaft 656, with punch pins 668 guided by a shaft 667.

When the control shaft 650 is being driven in the clockwise direction, the eccentric drive members 652 turn the switching frame 661 counterclockwise, about pivot shaft 654 so that the puncher segments 659 can likewise be turned counterclockwise by means of their respective springs 658. This motion continues until the puncher segments 659 are arrested by the appertaining pawls 663 under control by the stop magnets LM. The puncher segments 659 not so arrested continue to move into an inactive limit position. Near the end of this adjusting motion, the link pins 662 of the eccentric drive 652 have reached an abutment (not illustrated) in the puncher frame 655 and, during further progress of their motion, turn the frame 655 clockwise about the pivot axis while the rollers 667 pass along the stepped contour portion of cam disc 651. This causes the arrested puncher segments 659 and the appertaining respective selector pieces 665 to move the selected punch pins 668 downwardly with respect to the illustration in FIG. 20, so that the account card 609 then located in the range of the punch pins is provided with punched holes corresponding to the desired value-denoting code combination. During further progress of the revolution of main control shaft 650, the eccentric drives 652 and cam discs 651 are effective to return the puncher frame 655 and thus also the frame 666 carrying the punch pins 668, into the normal position, so that the punch pins 668 again assume the starting position shown in FIG. 20. The pins 662 are also active to return the switching frame 661 to the starting position so that the puncher segments 655, in opposition to the force of their respective springs 658, are also re-set to starting position. The stop pawls 663 then follow the pulling force of the appertaining springs 670 and, by virtue of the particular shape of the rack teeth 664, also return to starting position.

The single revolution of the main control shaft 650 is thus terminated; and all previously displaced parts of the puncher assembly are again ready in their respective starting positions.

*Further control components*

As mentioned, the storer current distributor SpV (FIG. 21), driven in synchronism with the storer main shaft 381, supplies control pulses to the above-described storer assembly after the switching magnet SpM has released the appertaining single-turn clutch for an operating cycle of the storer. FIG. 21 (top) further shows simplified the switch contacts 565 to 572 which are controlled from the storer main shaft 381 by means of the contact segments or cams 495/1 to 495/8 mounted on the shaft (FIGS. 2, 21). The contacts 565 to 572 are closed respectively different time intervals during the revolution of the storer shaft 381. The switching pulses thus produced by contacts 565 to 572 are supplied, through the programming monitor devices shown in FIG. 22, to the various releasing magnets such as those denoted in FIG. 21 (left) by LoM, ODrM, SpM, MM (FIG. 22) and so forth of the individual sub-assemblies as well as those described further below.

The current supply leads 580/1 to 580/4 of the magnets SWM1 to SWM4 for loading the storer selectors, and the supply leads 581/1 to 581/4 of the storer-selector clearing magnets SEM1 to SEM4, as well as the calling leads 582/1, 582/2, 582/3 . . . and 582/n of the storer loading magnets RM, are likewise connected through the programming monitor devices, shown in FIG. 22, with various releasing components in a manner still to be explained.

As mentioned above, the account card, placed by the operator upon a card receiving table T1 (FIGS. 1, 24), is conveyed by a card carriage or the like conveying means through the machine to pass from one operating location to the other in the proper sequence before the card, upon completion of the accounting operation, is ejected onto a collecting table T2 (FIG. 1) or T3 (FIG. 24). The card-carriage control, which thus causes conveyance of the account card into its different positions within the machine, is not different from the means known for such purposes and is not essential to the invention proper. For that reason the card-conveyor control means are represented in FIG. 21 in simplified form. All appertaning current supply leads 583/1 to 583/6 and exit leads 584/1, 584/2 or 590, 591 are connected at the proper time with the individual pulse transmitters, for instance the contacts 565 to 572, and with the stepping magnets MM and similar components through the controlling operation of the programming monitor devices illustrated in FIG. 22. The card-carriage magnet KM1 (FIG. 21), when excited, initiates conveying of the account card from the above-mentioned receiving table T1 into the machine, conveying of the inserted account card to the scanning position, and checking of the card by scanning of the account-identifying hole combination punched in the head portion of the card. When the card-carriage has arrived in the scanning position, it closes the contact 585 (FIG. 21, lower right). The pulse thus produced serves as a starting pulse in a manner still to be described. When the comparison of the scanned account-identifying symbols with the identifying symbols posted into the keyboard assembly of the machine is positive, then a contact 585/1 (FIG. 21, lower middle), is closed to serve control purposes also described below. The magnet KM2 causes the inserted account card to be advanced to the next accounting line, that is to the "old balance" scanning position, where again the card-carriage closes a contact 586 (FIG. 21, lower right) which likewise produces a starting pulse.

The switching magnet KM3 causes the account card to be conveyed into the printing position; and the magnet KM4 effects conveyance of the account card into the punching position. In the latter position a contact 587 (FIG. 21, lower right) is closed which also produces a starting pulse. The magnet KM5 ultimately causes the completely processed account card to be ejected at the proper time onto the receiving table T2 (FIG. 1) or or T3 (FIG. 24).

*Operation of programming and storer assemblies*

The operation of the storer assembly in cooperation wtih the programming and other sub-assemblies of the machine according to the invention will now be described with reference to a specific example of accounting performance.

The operational program of the storer assembly and its coaction with the other sub-assemblies is controlled by means of the above-mentioned function-switching or monitoring devices FW, illustrated schematically in FIGS. 22, 22a (see also FIG. 17), in response to actuation of the motor control keys UT−, UT+, ST, MT (FIG. 22a left) of keyboard 1. Each monitor is essentially a selector of the stepping-switch type and comprises two or more contact paths or portions mounted side by side. The monitors are grouped into individual groups each controlled by a separate stepping magnet. In FIG. 22 the individual groups of monitors are designated by legends indicative of their particular controlling function. They comprise a motor-key monitor whose stepping magnet is denoted by MM, a totalizer monitor with stepping magnet SUM, a storer loading monitor with stepping magnet WM, a credit monitor with magnet HM, a debit monitor with magnet HM/1, a card evaluating monitor with magnet KM, a scanner loading monitor with stepping magnet AM, an OB-printer monitor with magnet ASM, a discriminator monitor with magnet BM, a puncher monitor with magnet LSM, and a balance switching monitor driven by a stepping magnet SAM.

These individual monitors, each comprising a group of selector portions simultaneously driven by the same stepping magnet, operate to selectively connect the supply leads and exit leads, shown in FIG. 21, of the different component assemblies with one another in a predetermined manner so that the individual sub-assemblies function in a prescribed sequence to obtain the desired series of memorizing, computing and registering operations.

In the accounting example here chosen, a normal bookkeeping operation will be considered, comprising the posting of a current business transaction, the posting of legends and other data relating to the account, the scanning of the old balance, the computation of the new balance, and the registering of the new balance by printing and punching.

Figure 17:
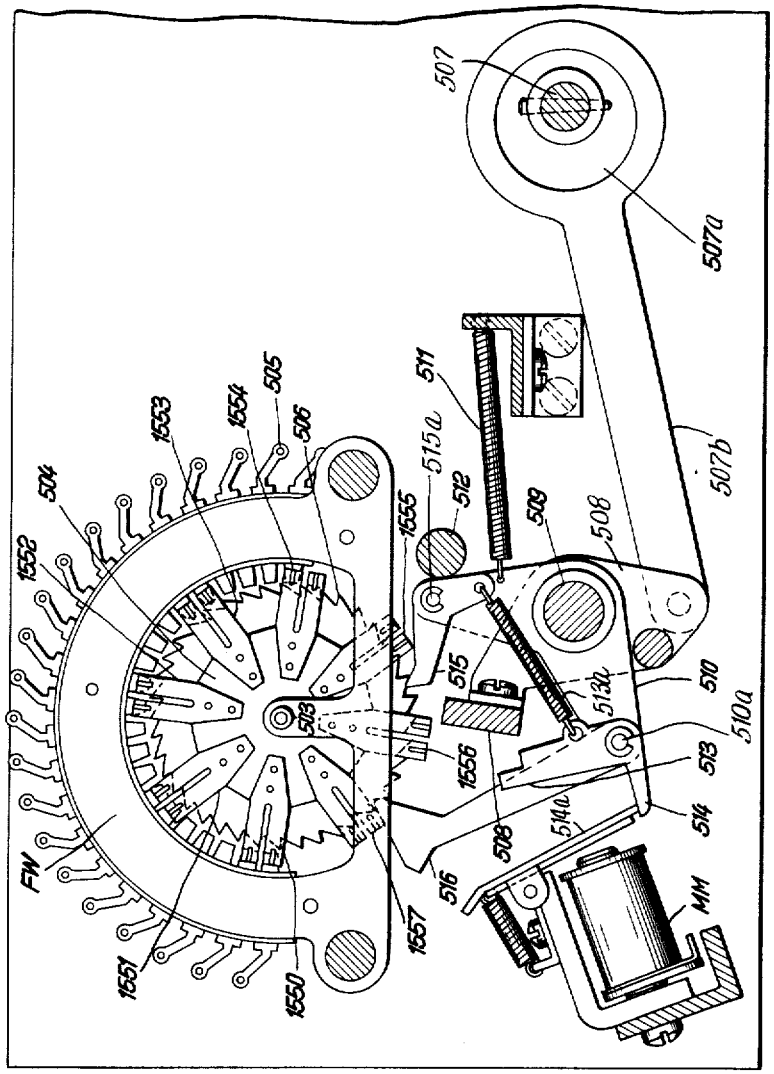
FIG. 17 is a side view of one of the function switching devices for programming the operation of the machine.

In the starting position of the machine the contact spoons 1550 to 1559, 1560 to 1569, 1570 to 1579, 1580 1589, 1590 to 1599, 1600 to 1609, 1610 to 1619, 1620 to 1629, 1630 to 1639, 1650 to 1659, 1660 to 1669,, 1670 to 1679 assume the positions apparent from FIG. 22 (see also FIG. 17). In this position each two adjacent bank contacts are conductively connected with each other. After closing the main switch HS, the machine main shafts are continuously driven by the motor MD (FIG. 21, right upper corner), and the direct-current source G supplies the current required for the control operations.

When the machine is thus placed in operating condition, the transaction is posted into the machine by means of the value keyboard 1 (FIGS. 1, 19). Assume that the posted accounting value has the magnitude "620." This magnitude is represented in FIG. 21 (lower left) by the circles about the intersection points of the crossbar distributor 16/22. (The "forerunning zero" is similarly shown by broken-line circles.) After posting the magnitude "620, the machine operation is started by actuation of the motorized adding-computer key UT+ (FIG. 22a). Due to an interlock (not shown) known as such, only one of the keys UT+, UT− can be depressed at a time, and the depressed key then remains blocked in depressed position until the clearing magnet CLM becomes excited. Actuation of key UT+ has the effect of passing a plus pulse through the motor-key relay M*t*R (FIG. 22a) in the following circuit: plus pole and contact spoon 1564a of the storer loading monitor (FIG. 22a), lead 1001, contact spoon 1554 of the motor-key monitor then in the starting position, lead 1002, closed contacts k5, k6 of the actuated adding-computer key UT+, relay M*t*R, minus pole. Relay M*t*R responds and closes its main contacts k3, k4 and self-holding contacts k1, k2. Thereafter, the motor-key relay M*t*R remains continuously excited by its self-holding circuit extending from the plus pole and the normally closed contacts k8/9 through lead 1003 and the now-closed self-holding contacts k1, k2. The closed main contacts k3, k4 pass a positive starting pulse to the stepping magnet WM of the storer loading monitor in the circuit; plus pole and k4, k5, lead 1005, contact spoon 1572 of the totalizer monitor now in its starting position, lead 1006, contact spoon 1550 of the motor-key monitor now at rest, lead 1007, spoon 1560 of the storer loading monitor, magnet WM, minus pole. The stepping magnet WM now advances the storer loading monitor to its second switching position. This establishes the following four circuits:

(1) Plus pole and contact spoon 1560a of storer loading monitor, lead 1009 (FIG. 22 and FIG. 21 left upper middle), clutch control magnet S*p*M (FIG. 21), minus pole. This circuit applies voltage to the clutch magnet S*p*M (FIG. 21, 10, 11) which, as described, releases the single-turn clutch of the storer assembly so that the storer main shaft 381 and, in synchronism therewith, the storer current distributor S*p*V (FIG. 21, left) are driven from the machine main drive for the duration of a single revolution.

(2) The storer current distributor S*p*V (FIG. 21) is energized through the contact group 571 (FIG. 21, top right) now closed by the control cam 493/7 of the storer main shaft 381, and through lead 1010 (FIG. 21), contact spoon 1562a of the storer loading monitor (FIG. 22) and lead 1011 (FIGS. 22, 21).

(3) A value relay WR (FIG. 21, lower left) is likewise connected to voltage through the lead 1010 (FIG. 22), contact spoon 1561a of the storer loading monitor and a lead 1012 (FIGS. 22, 21). As a result the value posting assembly is now connected to the value main leads 526 (FIG. 21) in proper digit-positional correlation.

(4) Simultaneously, the storer loading monitor, now in its second switching position, connects the groups of leads 1022, 550 of the value posting assembly with the storer loading magnets SLM (SLM1 to SLM*n* in FIG. 21 middle) in proper digit-positional relation through the contact spoons 1560b to 1564b (FIG. 22). For clarity of illustration, only some of the connecting leads are shown, namely those of the first and of the last digital positions.

During rotation of the storer main shaft 381 the control head 361 of the storer assembly together with the racks 332 move in the direction of the arrow 334 (FIG. 2) as explained above. The storer current distributor S*p*V (FIG. 21, upper left), rotating together with the storer main shaft 381, sequentially connects the plus lead 1011 with the respective value main leads 526/0 to 526/9, whereby the previously established contact connections of the cross-bar value-posting assembly, then connected with leads 526/0 to 526/9 through the closed contacts of the value relay WR (FIG. 21, lower left), are sequentially scanned in the sequence of their digital positions. The storer loading magnets SLM are supplied with voltage pulses in time sequence through the leads 550/1 to 550/n connected with the respective ten leads 1022/1 to 1022/n. One of these pulse-supplying connections extends, for instance, through lead 1011 and storer current distributor SpV (FIG. 21, left middle), value main lead 526/0, bar (contact star) 16–0, contact bar 22–1, lead 1022/1, contact spoon 1560b of the storer loading monitor, lead 550/1, and storer loading magnet SLM1 to minus pole, whereby the magnet SLM1 is excited and arrests the appertaining one rack 332 (FIG. 2) so that, in accordance with the posted value "0," the rack 332 for the first digit position is stopped in its zero position. Simultaneously, the fourth to nth racks 332 and kept arrested in their respective zero positions due to the electric contact connections of the "forerunning zero" made by the contact star 16–0, whereas all other racks 332 can continue to follow the advancing movement of the control head 361. In the manner already described, the second and third racks 332 are thereafter arrested when they reach their second and sixth value positions respectively, so that the magnitude "620" previously entered into the value-posting assembly and memorized therein by corresponding electric circuit connections, is now transferred to the properly correlated racks 332 in the form of respectively different amounts of longitudinal rack displacement.

When the posted values are thus being transferred into the racks 332, a starting pulse is supplied to the selector clearing magnet SEM3 (FIG. 21, right middle) of the storer selector SEW3 (FIG. 2) by means of the contact group 566 (FIG. 22, top) now closed by rotation of the storer main shaft 381. The pulse circuit extends from the plus pole and contacts 566 to lead 1019 (FIG. 21, top) and thence through contact spoon 1550a (FIG. 22) of the motor-key monitor, lead 1020, contact spoon 1570a of the totalizer monitor, lead 581/3 (FIGS. 22 and FIG. 21, right middle), magnet SEM3, negative pole. The selector clearing magnet SEM3, now excited, clears the storer selector SEW3 by operation of the clearing bar 464 (FIG. 9) in the manner described above.

During the further course of rotation, the cam 495/6 (FIG. 21, top) of storer shaft 381 closes the contact group 570. This applies a starting pulse to the stepping magnet HM of the credit monitor (FIG. 22). The pulse passes from contacts 570 through lead 1014 (FIGS. 21, 22), contact spoon 1563 of the storer loading monitor now in its second switching position, lead 1015, closed contacts k10, k11 of the depressed motor key UT+, lead 1016 and contact spoon 1516 of the credit monitor. The stepping magnet HM, now excited, switches the credit monitor to its second position. As a result, a loading impulse, produced by means of cam 495/4 on storer main shaft 381 and the appertaining contact group 568 (FIG. 21, top) is transmitted to the computer control magnet RM2 (FIG. 21, middle right) through lead 1018 (FIG. 21, top), contact spoon 1594 (FIG. 22) of the credit monitor now in its second switching position, and lead 582/2 (FIG. 22 and FIG. 21 middle right). The computer control magnet RM2 now effects positive coupling of its correlated computer mechanism serving for the totalizing of all credit transactions. That is the magnet RM2 (see FIG. 7) now couples the proper computer mechanism with one of the racks 332 as already described. Simultaneously, the same loading impulse from lead 1018 is supplied through contact spoon 1593 of the credit monitor and lead 582/22 to a computer control magnet RM22 (not here illustrated) which is correlated to the balance totalizing mechanism, whereby the magnet RM22 likewise effects a positive coupling of the balance totalizing mechanism to the proper rack 332.

During the further course of rotation of the storer main shaft 381, the values now transferred to the racks 332 are introduced into the then coupled computing or balance totalizing mechanisms in the manner described. The further rotation of storer main shaft 381 also causes opening of the contact group 568 (FIG. 21, top) so that the previously excited computer control magnets RM2 (FIG. 1) and RM22 are deenergized. Hence, after return travel of the control head 361 (FIG. 2) into its starting position, that is after the introduction of values into the coupled computing mechanisms is completed, these mechanisms are re-set to the starting position in the manner already described.

During the mentioned coupling-in movement of the selected computer mechanisms, the storer loading magnet SWM3 (FIG. 21, right middle) had responded as the contacts 565 (FIG. 21, top) were being closed by the storer main shaft 381. Such response occurs in a circuit extending from the plus pole through contacts 565 and lead 1023 (FIGS. 21, 22), thence through contact spoon 1551a of the then resting motor-key monitor, lead 1024, contact spoon 1571a of the resting sum-totalizing device, lead 580/3 (FIGS. 22, 21), and magnet SWM3 to the positive pole. The storer loading magnet SWM3 thus caused the rack 459/3 (FIG. 2) to be coupled with the rack 332 in the manner described, so that the values represented by the displacement of the racks 332 were also transferred to the correlated storer selector SEW3 (FIGS. 2, 21).

The debit monitor (FIG. 22) is wired analogously to the wiring of the credit monitor. The debit monitor is "called" by means of the adding-mechanism key UT— through lead 1017 when posting negative transaction items. In its second switching position, therefore, the debit monitor would cause the coupling-in of a computer mechanism that serves for the storing of negative sums and would also cause the corresponding balance totaling mechanism to be loaded negatively instead of positively. This action of the debit monitor would take place when the contacts 567 (FIG. 21, top) are closed by the storer main shaft 381, through a circuit extending from the plus pole through contacts 567 and lead 1025 (FIGS. 21, 22) to the contact spoon 1583a (FIG. 22) of the debit device then occupying its second switching position, and thence through the lead 582/22 to the correlated computer control magnet RM22.

Shortly before termination of the rotation of storer main shaft 381, the cam 495/5 (FIG. 21, top) closes the contacts 569. Now, a starting pulse, hereinafter called "delayed storer pulse," passes from the plus pole and contacts 569 through lead 1026 (FIGS. 21, 22) and contact spoon 1590 (FIG. 22) of the credit monitor, then in the second position, to the stepping magnet HM which then causes the credit monitor to advance its third position. However, if the debit monitor had responded, then the stepping magnet HM1 would instead be energized through lead 1026 and the contact spoon 1580a of the debit device. In the latter case, therefore, the stepping magnet HM1 would advance the debit monitor.

During the operations just described, the delayed storer pulse produced by contacts 569 is simultaneously supplied to the conveyor control magnet KM1 (FIG. 21, lower right) through lead 1026 and contact spoon 1591a (FIG. 22) of the credit monitor then in its second switching position, and through lead 583/1 (FIGS. 22, 21), so that the magnet KM1 causes the account card 609 (FIG. 20), supplied manually or by an automatic feeder device, to be pulled into the machine. The same delayed storer pulse energizes the stepping magnet MM (FIG. 22) of the motor-key monitor through lead 1026, contact spoon 1590a of the credit device, lead 1027 and contact spoon 1550b of the motor-key monitor. Stepping magnet MM advances the motor-key monitor to its second position.

In all other respects the wiring of the debit monitor corresponds to that of the credit monitor so that when the debit monitor is called, the same functioning takes place as described with reference to the credit device.

The above-mentioned delayed storer pulse is further supplied to the clearing magnet CLM (FIG. 22a) likewise through lead 1026, contact spoon 1560 of the storer loading monitor, lead 1029, contact spoon 1574 of the inactive totalizer monitor, and lead 1028. The clearing magnet CLM, in a conventional manner not further described herein, causes clearing of the value-posting assembly from the previously posted values and interrupts the self-holding circuit of the motor-key relay M*t*R by opening the contacts *k*8/9 (FIG. 22*a*) while also releasing the previously actuated adding-mechanism key. The same delayed storer pulse passes through lead 1026 and contact spoon 1560 of the storer loading monitor to the stepping magnet WM, whereby this magnet advances the storer loading monitor to its third position. By excitation through bridging lead 1031 and plus lead 1030, the switching magnet WM is then caused to continue advancing the storer loading monitor to its starting position. This terminates the first cycle of storer operation; and the amount of the transaction posted into the machine is now transferred into the desired computing and/or balance-totalizing mechanisms and simultaneously into the desired storer selector. The motor-key monitor is now in its second switching position, the storer loading monitor in its third position, and the responded credit monitor in its first position.

As described, at the termination of the first storer operating cycle, the conveyor control magnet KM1 (FIG. 21) receives voltage through the credit monitor and lead 583/1 so as to cause conveying of the account card into the machine. When the card reaches the scanning position where the identifying holes in the head portion of the card are to be scanned, then the card carriage closes the contacts 585 (FIG. 21, lower right). Contacts 585 then connect the plus pole through lead 584/1 (FIG. 21) with the clutch control magnet A*bt*M (FIG. 21, middle left) which releases the single-turn clutch of the scanner control shaft 601 (FIG. 20) thus coupling the scanner control shaft for one complete revolution with the continuously revolving machine main drive.

The scanner slide contacts 615 (FIG. 20), shown as rotary contact arms in FIG. 21, are then adjusted, in the manner described above, in accordance with the code combination of holes scanned off the account card. Simultaneously a checking operation is initiated. Since such checking is known and not essential to the invention proper, it is not further described herein in detail; but it may be mentioned that it has the effect of comparing the account-identifying code combination, scanned off the card, with the identification posted into the keyboard of the machine. If the comparison is positive, that is, if the identification checked off the card is identical with the one posted, then the contacts 581/1 (FIG. 21, lower right) are closed, whereas when the checking result is negative, the account card is rejected by the machine so that a new card must be substituted. The checking pulse produced by means of the contacts 581/1 in the event the inserted account card is correct, is applied to the stepping magnet KM (FIG. 22) of the card-evaluating monitor through a circuit extending from the plus pole and contacts 581/1 (FIG. 21) to lead 590 (FIGS. 21, 22*a*), contact spoon 1554*b* of the motor-key monitor then in its second switching position, and through lead 1033 (FIG. 22*a* and FIG. 22*b*) to the contact spoon 1600 of the card-evaluating monitor, and thence through magnet KM to the negative pole. Stepping magnet KM causes the card-evaluating monitor to advance to second position.

The same card-checking pulse is supplied to the stepping magnet AM of the scanner monitor (FIG. 22) through lead 1033 and contact spoon 1610 of the scanner monitor so that magnet AM advances the scanner monitor to the second switching position. Voltage is again applied to the clutch control magnet S*p*M (FIG. 21, left) through contact spoon 1610*a* (FIG. 22) of the scanner loading monitor now in the second position, and through lead 1009 (FIG. 22) so that magnet S*p*M (FIGS. 10, 11) releases a new rotation of the storer control shaft 381 to initiate another cycle of storer operation, while contact spoon 1611*a* (FIG. 22) of the scanner loading monitor connects lead 1011 to the lead 1010 then supplied with voltage by means of the contact group 571 (FIG. 21, top) under control by the storer main shaft 381. As a result, the current distributor S*p*V (FIG. 21, upper left), rotating together with the storer main shaft 381, again places voltage sequentially upon the value main leads 526 in the manner described above.

Simultaneously, the contact spoons 1610*b* . . . 1614*b* of the scanner loading monitor (FIG. 22) connect the exit leads 560 of that monitor with the inlet lead 550 (FIG. 21) of the storer loading magnet SLM (FIG. 21, middle) in digital sequence, so that the storer assembly now cooperates with the scanner assembly of the accounting machine. For clarity, only the first and last digit-position leads of these interconnections are illustrated.

In the meantime, the card-evaluating monitor, now in its second position, has been effective to connect by means of its contact spoon 1600*a* (FIG. 22) the impulse lead 1019, controlled by the storer main shaft 381 through the contacts 566 (FIG. 21, top), with the storer-selector clearing lead 581/2 (FIGS. 22, 21 middle, right) whereby the storer-selector clearing magnet SEM2 receives voltage so that the storer selector SEW2 is cleared by the magnet SEM2 during the now occurring loading of the rack 332 with the values located in the scanner.

This transfer of values from the scanning assembly into the group of racks 332 is effected through the electric circuit connections established by the monitors in the same manner as described with reference to the loading of the racks 332 with values from the value-posting assembly of the machine.

The impulse lead 1023, under control by the storer main shaft 381 by means of the contacts 565 (FIG. 21, top), is connected through contact spoon 1602*a* (FIG. 22) of the card-evaluating monitor with the storer loading lead 580/2 (FIGS. 22, 21 middle, right) thus energizing the storer loading magnet SWM2 with the effect of "calling" (occupying) the correlated storer selector SEW2 (FIG. 2). Since the code combinations now being scanned and transferred into the scanning assembly represent identifying symbols (for instance the account number, the card side, a statistical identifying number, a machine number, type-of-account number, and the like), this cycle of storer operation, in analogy to the transfer of values from the cross-bar distributor, does not involve the coupling of computer mechanisms; only the storer selector SEW2 is loaded by means of the leads 1023 and 580/2.

Shortly before this cycle of storer rotation is terminated, the contacts 569 (FIG. 21, top) again produce a delayed storer pulse. The pulse passes to the conveyor control magnet KM2 through lead 1026 (FIGS. 21, 22), contact spoon 1603 of the card-evaluating monitor now in its second switching position, and the lead 583/2 (FIGS. 22, 21 lower right), so that magnet KM2 now effects a conveying motion of the account card. The exit pulse then produced by means of the contacts 586 (FIG. 21, lower right) passes from the plus pole and contacts 586 through lead 584/2 to the scanner control magnet A*bt*M (FIG. 21, lower left) which releases another revolution of the scanner control shaft 601 and thus a renewed adjustment of the scanner slide contacts 615.

The same delayed storer pulse is also supplied, through lead 1026 and contact spoon 1690 of the card-evaluating monitor (FIG. 22) to the stepping magnet KM so that this magnet advances the card-evaluating monitor to the third switching position.

Since the scanner loading monitor (FIG. 22) is still in second position, another cycle of rotation of the storer main shaft 381 and thus also of the storer current distributor S*p*V is initiated as soon as the previous rotation of the storer shaft is completed. This second cycle of storer rotation comes about by excitation of clutch magnet S*p*M through contact spoon 1610*a* and lead 1009 of the scanner loading monitor. During the second storer rotation, the exit leads 560 (FIG. 22) of the scanner loading monitor are still connected with the supply leads 550 of the storer loading magnet SLM through contact spoons 1610b ... 1614b. Since during the last-preceding operating cycle of the scanner, the old balance was scanned off and transferred into the scanning assembly, a number of corresponding computing mechanisms are now called for operation in addition to the desired storer selector SEW.

The selection of the plus or minus side of the computing mechanisms is controlled by a special scanning slider 616/S (FIG. 21, lower left) which is displaced in dependence upon the plus or minus sign of the old balance in the same manner as described above for the other scanning sliders 616 (FIG. 20). It will be understood that, while the slider 616/S has a shape and arrangement similar to the slider 616 shown in FIG. 20 and is displaced linearly, the circuit diagram of FIG. 21, for simplicity, represents the slider 616/S as a rotary contact member. In contrast to the ten available value positions of the normal scanning sliders 616, the control slider 616/S has only two selective positions, namely a positive and a negative position. It cooperates with three contact bridges or spoons 615/S1 to 615/S3 (FIG. 21, lower left) which are simultaneously displaced by movement of the slider and which connect respectively different impulse leads with each other in a manner still to be described. Since a negative balance is identified on the account card by a special punched hole which is missing when the balance is positive, the control slider 616/S of the scanning assembly is displaced only when a negative balance is being sensed off the card. Hence the slider 616/S remains in the normal position when a positive balance is scanned as is the case with the above-exemplified balance. Consequently, the positive loading impulse produced by the storer main shaft 381 acting upon the contacts 568 (FIG. 21, top) is supplied to the computer control magnet RM4 through lead 1018 (FIG. 21 top, FIG. 22d), contact spoon 1604a of the card-evaluating monitor, lead 1036 (FIG. 22, FIG. 21 lower left), contact bridge 615/S1 and lead 582/4 (FIG. 21, lower left and middle right). The magnet RM4, now excited, causes coupling of the particular computing mechanism that serves for the computation of positive old balances.

The just-mentioned loading pulse from lead 1018 (FIG. 21, top) is simultaneously supplied to the computer magnet RM22 through contact bridge 615/S2, lead 1037 (FIG. 21 lower left, FIG. 22 ), contact spoon 1603a of the card-evaluating monitor now in its third position, and through lead 582/22. Consequently, the magnet RM22 now causes positive coupling of the correlated balance-computing mechanism.

The clearing lead 1019 and the loading lead 1023, supplied with voltage by means of the contacts 566, 565 (FIG. 21) and assigned to the storer-selector clearing and loading operations, are connected by contact spoons 1600a and 1602a with respective leads 581/4 and 580/4 so that the storer selector SEW4 (FIG. 21, middle, and FIG. 2) is likewise loaded with the old balance in the manner already described.

Shortly before the storer rotation is terminated, the contacts 569 (FIG. 21, top) again produces a delayed storer pulse which is supplied to the conveyor control magnet KM3 (FIG. 21, lower right) through lead 1026 (FIG. 21 top, FIG. 22 ), contact spoon 1603 of the card-evaluating monitor now in its third position, and lead 583/4 (FIG. 22, FIG. 21 lower right). Magnet KM3 causes the account card to be advanced to the next line, namely to the printing position. The delayed storer pulse from contacts 569 and lead 1026 (FIG. 21, top) is also supplied through contact 1604 of the card-evaluating monitor (FIG. 22), lead 1038 (FIGS. 21 and 22) and contact spoon 1620 of the OB-printer monitor to stepping magnet ASM, whereby this magnet causes the OB- printer monitor to switch forward to its second position. The delayed storer pulse further passes through lead 1026, contact spoon 1602 of the card-evaluating monitor (FIG. 22) now in the third position, and thence through lead 1040 and contact spoon 1550b (FIG. 22) of the motor-key monitor to its third position. In similar manner, the same delayed storer pulse energizes the stepping magnet AM of the scanner loading monitor (FIG. 22) through lead 1026 and contact spoon 1601 of the card-evaluating monitor (FIG. 22), lead 1041, and contact spoon 1610 of the scanner loading monitor (FIG. 22) now in its second switching position. As a result, the magnet AM advances the scanner loading monitor to third position, whereafter the bridging lead 1032 is effective to again energize the magnet AM until the scanner loading monitor has advanced to its starting position. The delayed storer impulse also acts through lead 1026 and contact spoon 1600 of the card-evaluating monitor upon the stepping magnet KM (FIG. 22b) and thus causes the card-evaluating monitor to advance first into fourth position and thereafter, by the effect of its own plus-pole connection, further forward to its starting position.

The OB-printer monitor (FIG. 22) is equipped with all circuit connections required for printing the old balance. That is, the contact spoon 1622 of the OB-printer monitor and lead 1042 (FIG. 22, FIG. 21 upper left) pass a starting pulse to the magnet ODrM (FIG. 21) which releases the single-turn clutch for driving the control shaft 228 (FIG. 18) of the upper printer assembly which is then driven together with the printer current distributor DSV (FIG. 21, upper left corner) from the machine main drive to perform a single rotation.

Furthermore, the storer-selector exits 531 and 529 (FIG. 21) of the old-balance memorizing storer selector SEW4 and of the account-number memorizing storer selector SEW2 are connected with the upper-printer lead 564 of the switching magnets SM (FIG. 21 lower right; see also FIG. 18) for the upper printer assembly, these connections extending through the contact spoons 1620a . . . 1624a and 1620b . . . 1624b, respectively, of the OB-printer monitor (FIG. 22). In this case again, only the first and the last digit-position leads of the circuit connections for the printer assembly are illustrated.

If the special slider 616/S (FIG. 21, lower left) of the scanning assembly had been displaced in response to the sensing of a negative balance, then a control pulse would have passed from the plus pole of the control slider 616/S through contact bridge 615/S3, lead 1044 (FIG. 21, FIG. 22), contact spoon 1623 of the OB-printer monitor (FIG. 22), and lead 1045 (FIG. 22, FIG. 21 upper left) to the switching magnet RoM which shifts the inking ribbon of the printer assembly to effect printing in red color indicative of a negative balance value.

In the above-described manner, all electric circuits necessary for the printing of the old balance and of the account number are completed; and it will now be explained with reference to FIG. 21 how the storer selectors SEW are wired for suppressing the printing of the forerunning cipher at the left of the highest finite digit value to be printed.

*Suppression of forerunning cipher in the printer*

During rotation of the printer control shaft 220 (FIG. 18), the individual type carriers 200a are moved, one after the other, into the printing position 216 as described, while the printer current distributor DSV (FIG. 21, upper left corner), running in synchronism with the upward displacing motion of the type carriers 200a, places voltage sequentially onto the individual storer-selector leads 524/0 to 524/9 through the valve main leads 526. During this operation, the following individual circuits are established:

(1) For printing the valve "zero" memorized in the lowest digital value portion of the storer selector SEW4 uppermost right in the middle of FIG. 21) the stop magnet SM (FIGS. 21, 18) that corresponds to the lowest-value position in the upper printer assembly (FIG. 18) must be energized. This occurs in the following circuit: plus pole of the printer current distributor DSV (FIG. 21, upper left), valve main leads 526/0, storer selector supply lead 524/0, contact arm 457/2 of the first displaced contact part of storer selector SEW4 (second contact path from the right, lowest row of storer selectors in FIG. 21), bridging lead 548/2, bridging lead 532, contact arm 456/1 of the contact path assigned to the lowest digit position in storer selector SEW4, bridging lead 549/1, storer-selector exit lead 531/1, contact spoon 1620a of the OB-printer monitor (FIG. 22), upper-printer lead 564/1, stop magnet SM (FIG. 21, bottom) correlated to the lowest digit position of the printer assembly. Magnet SM acts upon its stop pawl 204 and arrests the correlated type carrier 200a (FIG. 18). As a result, the printing type 201 corresponding to the cipher "0" is placed into printing position, corresponding to the "0" setting of the first digit position in the storer selector SEW4. All other digit positions of storer selector SEW4 cannot transfer the voltage pulse assigned to the cipher "0" because their respective contact arms 457 and 456 do not establish any connection with the exit leads 531.

(2) Plus pole of the printer current distributor DSV (FIG. 21), value main lead 526/1, storer supply lead 524/1. Since no contact of the storer selectors assigned to the number "1" is connected by the selector contact arms with the exit leads 531, the voltage pulse in the latter circuit connection remains ineffective. Similarly, the subsequent voltage pulses assigned to the numbers "2", "3" and "4" remain without effect upon the stop magnet SM of the printer assembly.

(3) Plus pole of the printer current distributor DSV (FIG. 21), value main lead 526/5, storer selector supply lead 524/5, contact arm 456/2 of the contact path in the second digit position of storer selector SEW4 (second contact path from the right, lowest row of storer selectors in FIG. 21), bridging lead 549/2, exit lead 531/2. This circuit continues through the contact connection, here not illustrated, of the OB-printer monitor to lead 564/2 (FIG. 22, FIG. 21 bottom right) and applies voltage on the stop magnet SM (FIG. 21, bottom) appertaining to the second digit position of the printer assembly, so that this magnet now stops the appertaining type carrier 200a in the proper position. As a result, the printing type 201 that corresponds to the number "5" is placed into the printing position in accordance with the illustrated adjustment of the second digit position of the storer selector SEW4.

The voltage pulses supplied by the printer current distributor DSV to the storer selector SEW4 and assigned to the numbers "6" and "7" remain ineffective because no corresponding circuit connections to the exit leads have been established.

(4) Plus pole of the printer current distributor DSV (FIG. 21), value main lead 526/8, storer selector lead 524/8, contact arm 556/3, bridging lead 549/3, exit lead 531/3. This circuit continues through the circuit connection (here not illustrated) of the OB-printer monitor to the lead 554/3 and thence through the stop magnet SM (FIG. 21, bottom) assigned to the third digit position of the printer assembly so that this magnet arrests the appertaining type carrier. Thus the number type "8" corresponding to the illustrated adjustment of the storer selector SEW4 is placed into printing position. The next following voltage pulse from the printer current distributor DSV, assigned to the number "9", has no effect upon the stop magnets SM of the printer assembly because there are no corresponding circuit connections through the storer selector SEW4. Consequently, the type carriers of the printer assembly that are assigned to the further digit positions are lifted to an inactive limit position as described with reference to FIG. 18.

As is apparent from the foregoing, the printing of the cipher "0" is predicated upon the condition that at the left of such cipher a number different from zero must be adjusted into the corresponding contact path of the storer selector. Only then can the switching pulse for the cipher "0," produced in the printer current distributor DSV by passage of its rotary slide contact over the bank contact "0," become effective to act through the contact arms 456, 457 and the bridging leads 549 of a storer selector path adjusted to a number different from zero. The bank contact of the contact paths of the storer selector located at the left of a finite number and assigned to the cipher "0" are not in connection with the value lead "0" (namely, lead 524/0); such ciphers, therefore, are not printed by the printer assembly.

In the same manner as just described, the account number put into the storer selector SEW2 is printed simultaneously with the old balance, except that it is impressed into the journal column assigned to the account number. To avoid unduly complicating the illustration, the storer selector SEW2 (FIG. 2) is not illustrated in FIG. 21; but exactly the same circuits are being established as have been described for the printing of the old balance.

After the old balance and the account number are printed in the upper printer assembly (200 in FIG. 1) by means of the properly selected printing types 201 (FIG. 18), the printer control shaft 228 closes the contacts 260 (FIG. 21, upper left). The switching impulse thus produced is supplied to stepping magnet ASM (FIG. 22c) through lead 1046 (FIG. 21, FIG. 22) and contact spoon 1620 of the OB-printer monitor, so that magnet ASM causes this monitor to advance first to its third position and thereafter, by excitation through bridging lead 1047, into the starting position. The account number and the old balance are now imprinted upon the journal sheet in the upper printer assembly 200 (FIG. 1).

*Posting of current transactions and registering of new balance*

While the above-described operations are being automatically performed by the machine, the operating person, after clearing the value-posting device 1 (FIGS. 1, 19), may enter on keyboard 1a (FIGS. 1, 22) symbols or legends required for explaining or identifying the counting operation, and may then prepare the machine for reception of the entry by actuating the motor key MT (FIG. 22a) which causes the motor-key relay M*t*R to pick up in the following circuit; plus pole and contact spoon 1564a of the storer loading monitor (FIG. 22), lead 1001, contact spoon 1554 of the motor-key monitor then in its third position, lead 1047, contacts k13, k14 now closed by the depressed motor key MT, motor-key relay M*t*R, negative pole.

After relay M*t*R responds, it remains picked up through its above-described self-holding circuit through relay contacts k1, k2 and the normally closed contact k8/9 of the clearing relay CLM. The voltage applied through contacts k3 and k4, lead 1005, contact spoon 1572 of the now inactive totalizer monitor and lead 1006 to the motor-key monitor remains ineffective until the motor-key monitor is switched into third position by the delayed storer impulse passing through lead 1026 after the third cycle of storer rotation (entering of the old balance). Then the delayed storer pulse passes from the motor-key monitor through lead 1050 (FIG. 22) to contact spoon 1630 of the discriminating monitor and thence to the stepping magnet BM which then causes the discriminating monitor to advance to second position. This has the effect of exciting the stepping magnet HM of the credit monitor (FIG. 22) from the plus pole of the discriminating monitor and its contact spoon 1632 through lead 1051, and through contact spoon 1591 of the credit monitor then in third position.

Now, the stepping magnet HM advances the credit monitor to fourth position. This has the effect of supplying excitation to the control magnet ODrM of the upper (journal) printer and also to the control magnet UDrM of the lower (card) printer (FIG. 21, upper left). The excitation voltage is supplied from the plus pole of the credit monitor (FIG. 22), through the respective contact spoons 1593a, 1594a and the respective leads 342 and 1052 (FIG. 22, FIG. 21 upper left). At the same time, the contact spoons 1591b to 1593b of the credit monitor (FIG. 22) connect the storer exit leads 530 of storer selector SEW3, which memorizes the posted transaction, with the upper-printer leads 564 and the lower-printer leads 563 of the particular switching magnets SM and USM (FIG. 21, bottom) that are assigned in the upper and lower printing assemblies to the type carriers for the credit columns on the journal sheet and account card respectively. Simultaneously, the exit leads 1022 correlated to the value posting assembly are connected to through contact spoon 1594b of the credit monitor with the control leads 564 and 563 for the type carriers that, in the two respective printing assemblies, are assigned to the particular column for receiving the legends or symbols explanatory of the accounting operation being recorded, only the first value-position leads of the three printer-current circuits being illustrated. Furthermore, contact spoon 1590b of the credit monitor and lead 1012 (FIG. 22, FIG. 21 lower left) apply voltage to the value relay WR, so that the value-posting assembly is connected with the value main leads 526.

The upper and lower printer assemblies are now digit-wise connected with the transaction-memorizing storer selector SEW3 and with the value-posting assembly which memorizes the explanatory legends or symbols. During rotation of the control shaft 228 (FIG. 18) of the upper printer assembly and of the corresponding control shaft (not illustrated) of the lower printer assembly, the synchronously driven printer current distributor DSV (FIG. 21) again places voltage in time sequence upon the value main leads 526. This has the effect of sensing the values or symbols memorized in the storer selector SEW3 and in the value-posting device and transferring the memorized data in the manner already described to the type carriers assigned to the proper printing columns. During such transfer, the printing of the forerunning zeroes at the left of the highest finite value position is again suppressed by virtue of the interwiring of the storer selector components already described in detail.

The explanatory legends and symbols entered into the value-posting device, of course, may also be transferred under control by a storer rotation into the storer assembly in a manner similar to that described with reference to the memorizing of the account number, and may be derived subsequently from the storer assembly to effect printing at any desired moment in the cycle of machine operation.

The stop pulse produced at the end of the printer operation by means of the contacts 260 (FIG. 21, upper left) is supplied through lead 1046 and contact spoon 1591 (FIG. 22) of the credit monitor now in its fourth switching position, to the stepping magnet HM which now causes the credit monitor to advance to its starting position. The debit monitor is wired in an analogous manner so that, in the event of posting a negative transaction, that is, when the debit monitor responds, the type carriers assigned to the credit column are "called," while the red-print control magnet RoM (FIG. 21, upper left) is also energized through lead 1045 and contact spoon 1582 (FIG. 22) of the debit monitor.

While the current transaction is being printed as described above, the storer control magnet SpM (FIGS. 10, 11, 21 middle left) is energized through lead 1009 (FIG. 21, FIG. 22) through contact spoon 1630a of the discriminating monitor now in its second switching position. Magnet SpM now releases another rotation of the storer main shaft 381. The positive totalizer pulse now produced by the contacts 572 (FIG. 21, top) is supplied to the computer control magnet RM22 through lead 1054 (FIG. 21, FIG. 22), contact spoon 1631a of the discriminating monitor and lead 582/22; whereby the magnet RM22, prior to starting movement of the control head 361 (FIG. 2), effects a positive coupling of the corresponding balance computer mechanism. Consequently, the racks 332 are loaded in the manner already described with the magnitude represented by the setting of the called balance computer mechanism. The rack 332 assigned to the highest digit position actuates a group of contacts SSK (SSK1, SSK2 in FIG. 21 lower middle portion) as soon as this rack has moved into its value position "9." In the known manner, such a setting of this rack during totalizing is indicative of the fact that the balance-totalizing mechanism was in the negative range. The actuation of contact group SSK serves for adjusting the balance switching devices that select the storer exit leads 527, 528 (FIG. 21, upper portion).

Since in the case of the particular accounting example here exemplified, a positive amount is taken from the balance-computing mechanism, the contact group SSK remains inactive. Consequently, the switching pulse produced by means of the contacts 568 (FIG. 21, top) passes through lead 1018, contact spoon 1632a of the discriminating monitor (FIG. 22), lead 1056, contact SSK2 (FIG. 21 middle, lower half), lead 1057, thence through contact spoon 1671a of the balance-switching monitor (FIG. 22) which possesses only two switching positions. Since this monitor has not been displaced from its original position, the circuit is incomplete and the switching pulse remains ineffective. If the balance-switching monitor has been displaced, then its contact spoon 1671a would pass the pulse to the stepping magnet SAM with the effect of advancing the balance-switching monitor to its "negative" position.

In its illustrated "positive" position, the balance-switching monitor connects the storer selector exit 527 with the exit leads 1058/1 to 1058/n, whereas in the "negative" position of the balance-switching monitor the selector exits 527 are connected with the complementary wired exit leads 528. Only the first and last value leads of the just-mentioned selector exits are illustrated.

While a total is being drawn from the coupled balance computer mechanism, the clearing pulse produced by means of the contacts 566 (FIG. 21, top) is supplied to the clearing magnet SEM1 (FIG. 21, upper right) of the storer selector SEW through lead 1019, contact spoon 1633a of the discriminator monitor (FIG. 22a) and lead 581/1. As a result, the storer selector SEW is now cleared. In the further course of storer rotation (see FIG. 23), the loading pulse produced by the contacts 565 (FIG. 21, top) is supplied to the loading magnet SWM1 through lead 1023, contact spoon 1634a of the discriminating monitor (FIG. 22) and lead 580/1 so that, during the return movement of the rack 332 coupled with the called balance totalizing computer mechanism, the storer selector SEW1 is loaded in the manner already described.

The delayed storer pulse issuing shortly before the storer main shaft completes its rotation, is supplied through lead 1026 and contact spoon 1630 of the discriminating monitor (FIG. 22) to the stepping magnet BM which then causes the discriminating monitor to advance to its third switching position. The delayed storer pulse is simultaneously supplied to the stepping magnet NM through lead 1026, contact spoon 1633 of the discriminating monitor, lead 1059 and contact spoon 1650a of the NB-printer monitor (FIG. 22). The stepping magnet NM, therefore, causes the NB-printer monitor to advance to its second position. By means of its contact spoons 1652a, 1653a, the NB-printer monitor connects the respective leads 1042 and 1052 with the plus pole of the voltage source, thus applying voltage to the magnets ODrM and UDrM (FIG. 21, top left)

of the upper and lower printing assemblies respectively, whereby these magnets release the correlated printer control shafts for one rotation. At the same time, the contact spoons 1650 . . . 1654 and 1650b to 1654b connect the exit leads 1058 of the balance-switching monitor (FIG. 22) with the supply leads 564 and 563 of the respective switching magnets SM and USM (FIG. 21, bottom) of the upper and lower printing assembly respectively.

The new balance is now imprinted upon the journal sheet in the upper printer assembly and upon the account card in the lower printer assembly in the manner described, and the printing of ciphers at the left of the highest finite digit value is again suppressed. When the printing of the new balance is completed, the printer control shaft 228, acting upon the contacts 260 (FIG. 21, top), issues a stop pulse which passes to the stepping magnet NM through lead 1046 and contact spoon 1650a of the NB-printer monitor (FIG. 22) now in second position. The stepping magnet NM now advances the NB-printer monitor first to the third position and thereafter, due to excitation from the plus lead, to the starting position.

The stop pulse from contacts 260 and lead 1046 (FIG. 21, upper left) is also supplied to the card-carriage control magnet KM4 (FIG. 21, lower right) through contact spoon 1634 of the discriminating monitor (FIG. 22) and the lead 583/5 (FIGS. 22 and 21) whereby the magnet KM4 causes the account card to be moved to the punching position. The switching pulse then produced by means of the contact 587 (FIG. 21, lower right) passes through lead 591 (FIGS. 21 and 22) to contact spoon 631 of the discriminating monitor now in third position, and thence to the stepping magnet BM, so that this magnet causes the discriminating monitor to advance first into fourth position and then, by excitation of magnet BM from the plus pole of the discriminating monitor, into the starting position.

The last-mentioned voltage pulse from contact 587 and lead 591 is simultaneously passed through the contact spoon 1630b of the discriminating monitor, lead 1062 and contact spoon 1660 of the puncher monitor to the stepping magnet LSM (FIG. 21a), whereby this magnet causes the puncher monitor to advance into its second position. In this position, the contact spoons 1660 to 1664a of the puncher monitor connect the exit leads 1058 of the storer selectors, selected by means of the balance switching monitor, with the puncher leads 562 connected to the puncher magnets LM (FIGS. 20, 21 bottom), while by means of the contact spoon 1662 and lead 1063 of the puncher monitor a voltage pulse is applied to the switching magnet LoM in the single-turn clutch of the puncher control shaft 650 (FIG. 20); and the switching magnet LoM (FIG. 21, left), causes the puncher control shaft 650 together with the puncher current distributor LSV to be coupled with the machine main drive for a single revolution.

In addition thereto, when the puncher monitor has assumed its second switching position, a lead 1065 coming from the balance switching monitor is connected by contact spoon 1664 with a supply lead 562/S (FIG. 22d) of a magnet in the puncher assembly, which magnet serves for punching a special hole into the card. The lead 562/S receives voltage only when the balance switching monitor, in the event of a negative balance, is placed into its second switching position and thus establishes a connection with a value main lead 526/1 through contact spoon 1670b and the lead 1064. As a result, an identifying special hole is punched in the account card only when a negative balance is encountered.

As described, when the puncher control shaft performs a single rotation, the individual value main leads are sequentially connected to voltage by the puncher current LSV (FIG. 21, middle left); and this voltage is supplied to the puncher magnets LM (FIG. 20, 21 bottom) through the storer supply leads 520 (FIG. 21, upper row), the adjusted storer components SEW1 and the exit 1058 selected by the balance switching monitor, so that the puncher magnets LM effect a selection of the corresponding punching pins 668 (FIG. 20).

Shortly before the puncher mechanism completes its rotation, that is after the card has been punched, the puncher control shaft 650 closes the contacts 680 (FIG. 21, left) so that a stop pulse is passed through lead 1066 and contact spoon 1660 of the puncher monitor (FIG. 22) to the stepping magnet LSM, which causes the puncher monitor to advance third position and thereafter, by excitation from its own plus lead, to the starting position.

The stop pulse from contact 680 and lead 1066 is also supplied to the conveyor control magnet KM5 through contact spoon 1552b of the motor-key monitor (FIG. 22) now in third position, and through lead 583/6. Magnet KM5 now causes ejection of the completely processed account card (onto the receiving table T2 or T3 in FIGS. 1 and 24) in a manner here not further described.

Finally, the stop pulse issued by operation of the puncher assembly passes through lead 1066 and contact spoon 1551b of the motor-key monitor (FIG. 22) to the stepping magnet MM which causes the motor-key monitor to advance to fourth position and thereafter, by excitation through its own plus lead, to the starting position.

All sub-assemblies and individual mechanisms of the machine are now again in starting positions. The accounting run is completed, and the machine is ready for another run.

*Example of modified operation*

As mentioned, by a corresponding wiring of the storer selectors, particularly their special contact paths or portions, a machine according to the invention is also capable of performing an internal control operation issuing from the central storer assembly. This internally initiated control operation may be such that the above-mentioned special contact paths of the storer assembly are used for the purpose of selecting a desired combination of computing mechanisms. This particular modification of the storer operation will be described presently with reference to the example of a balance totalizing operation.

Figure 21A:
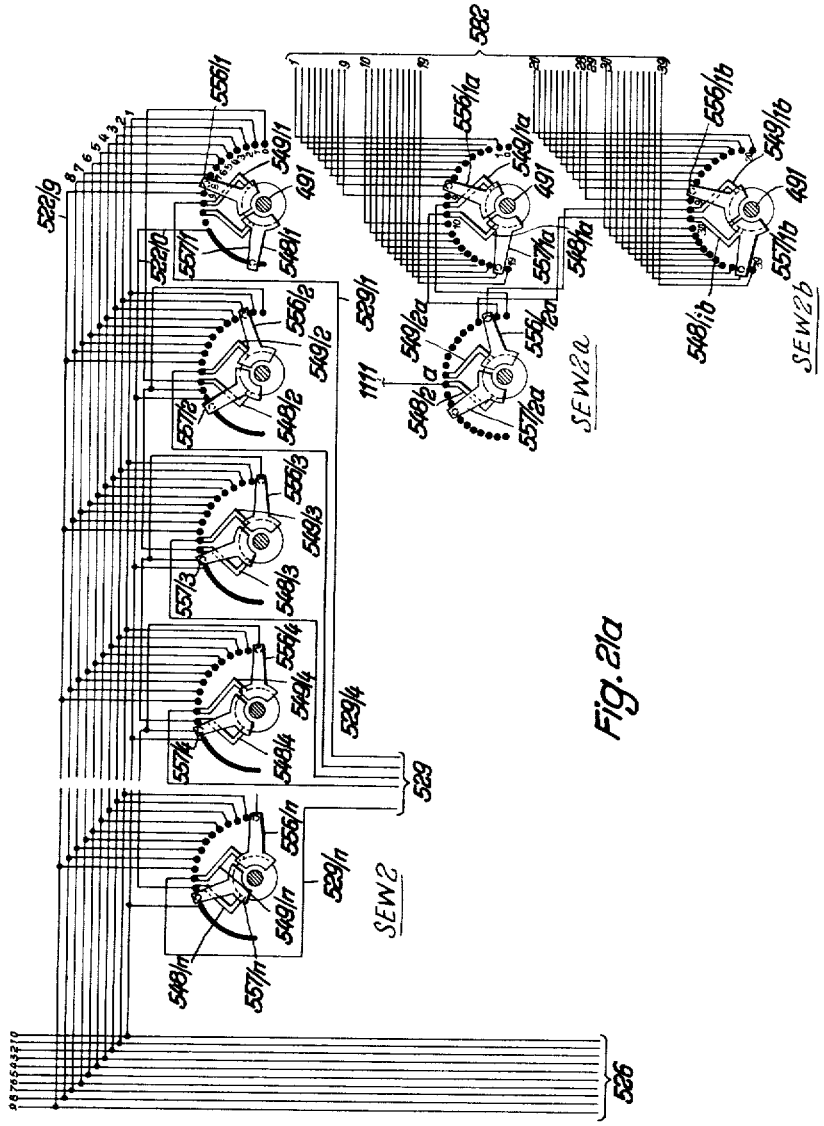
FIG. 21a is a schematic circuit diagram of one of the storer selectors that may form part of the electric system represented in FIG. 21.

The storer selector SEW2, indicated in FIG. 2 but not specifically shown in the circuit diagram of FIG. 21, is separately illustrated in FIG. 21a. In its lowest digit position this selector is equipped with two special contact paths SEW2a and SEW2b, whereas only one special contact path SEW2a is provided in the second lowest digit position and none in the remaining higher digit positions of the same selector. It should be remembered that the normal digit paths, for the purpose of suppressing the forerunning cipher, are interwired in the manner already described, and that the contact arms 556/1, 557/1, 556/1a, 557/1a, 556/1b, 557/1b or 556/2, 556/2a of the individual digit positions are mechanically connected with one another so that all contact arms appertaining to one and the same digit positions are adjusted in synchronism. In contrast to the normal paths, the special contact paths of the illustrated selector are provided with mutually insulated bank contacts along the entire peripheral contact paths. The bank contacts of the special selector portions SEW2a and SEW2b are connected with the calling leads (581/1 to 582/39) for occupying the computer mechanisms (see also FIG. 21), whereas the first four bank contacts of the special selector portion assigned to the second digit position are conductively connected through bridging conductors 548/1a, 548/1b, or 549/1a, 549/1b with the contact arms 557/1a, 557/1b or 556/1a, 556/1b. (FIG. 21a.)

A lead 1111, connected through the bridging contact 549/2 with the contact arm 556/2a, serves to supply voltage pulses to the individual computer-mechanism calling leads 582 in a manner still to be described.

This system, therefore, is designed and operative on the line-switch principle customary in the technique of automatic telephone exchanges and can be supplemented analogously in accordance with the number of the available computing mechanisms.

In order to draw a total from a computing mechanism, the attending person posts the identifying number of the desired computing mechanism, for instance the number "28," by means of the value posting device 1 (FIG. 1) which serves also for calling the computer-mechanism number. The posted number is introduced into the crossbar distributor (FIG. 21, lower left) where it appears as a corresponding contact connection in the manner explained above. The operator then releases a machine run by actuating a totalizer key ST (FIG. 22a) which is interlocked with the other keys as described above with reference to keys UT+, UT—. Actuation of motor key ST applies an energizing pulse to a motor-key relay M/R (FIG. 22a) from the plus pole of the storer loading monitor through lead 1001, contact spoon 1554 of the motor-key monitor now in starting position, lead 1002, and closed contacts k20, k21 of depressed key ST. The motor-key relay M/R picks up and closes its self-holding contacts k1, k2 and its main contacts k3, k4. Thereafter, the motor-key relay M/R remains picked up through its self-holding circuit. The closed main contacts k3, k4 supply a positive starting pulse to the stepping magnet WM through lead 1005, contact spoon 1572 of the totalizer monitor now in starting position, lead 1006, the inactive motor-key monitor, lead 1007, and contact spoon 1560 of the storer loading monitor. Stepping magnet WM now causes the storer loading monitor to advance to its second switching position. At the same time, a starting pulse is passed through the stepping magnet SUM of the totalizer monitor (FIG. 22) through lead 1007, closed contacts k22 and k23 of totalizer key ST, lead 1110, and contact spoon 1570 of the totalizer monitor. Stepping magnet SUM now causes the totalizer monitor to advance to second position in the manner described. The advancing movement of the totalizer monitor to the second position has the effect of opening the contact connections that are closed during the normal accounting run of the machine. Starting pulses for occupying the debit monitor and the credit monitor can likewise not become effective because neither the key UT+ nor the key UT— has been actuated.

The storer loading monitor establishes the circuits previously described which cause the storer assembly to perform a cycle of operation so that the values posted into the value posting assembly are transferred through racks 332 into the special portions (paths) of the particular storer selectors selected for operation by the totalizer monitor then in its second monitoring position.

More in detail, the following circuits are formed:

Contact spoon 1570b (FIG. 22) of the totalizer monitor now in its second position, connects the clearing lead 1019 with the selector clearing lead 581/2. Contact spoon 1574/b connects the loading lead 1023 with the selector loading lead 580/2. Contact spoon 1573/a connects the clearing lead 1019 with the selector clearing lead 581/4. The stepping magnet SpM (FIG. 21, left) receives voltage from the plus pole of the storer loading monitor through contact spoon 1560a and lead 1009, so that magnet SpM releases the storer assembly for one cycle of rotation as described. Simultaneously, the value relay WR (FIG. 21, lower left) is energized, namely through lead 1010 (FIG. 22) and contact spoon 1561a of the storer loading monitor, and through lead 1012, so that the value posting assembly is now digitwise connected with the value main leads. Furthermore, the storer loading monitor, now in its second position, connects the groups of leads 1022, 550 of the value posting assembly digitwise with the storer loading magnets SLM through contact spoons 1560b to 1564/b. Now, the simultaneously rotating storer-current distributor SpV sequentially applies voltage to the value main lead 526 so that during this cycle of storer operation, the numbers posted into the value posting assembly are transferred into the called storer selector SEW2 in the manner already described. That is, the selector portion of the storage selector SEW2 assigned to the lowest digit position is loaded with the number "8," and the selector portion assigned to the second lowest digit position is loaded with the number "2." The clearing pulse produced during rotation of the storer main shaft 381 by means of the contacts 566 is then effective through the connection of leads 1019/581/4 to clear the called storer elector SEW4 in the manner described.

The delayed storer pulse, produced by the rotating storer control shaft 381 acting upon cam 495/5 and contacts 569, passes through lead 1026 and contact spoon 1570 (FIG. 22) of the totalizer monitor, now in its second position, to the stepping magnet SUM. This magnet causes the totalizer monitor to advance to third position. The same delayed storer pulse passes through lead 1026 (FIG. 22) and contact spoon 1560 of the storer loading monitor, now in second position, to the stepping magnet WM which causes the storer loading monitor to advance to second position. The bridging lead 1031 and the plus lead 1030 are then effective to cause further advance of the storer loading monitor to its starting position.

The first cycle of storer rotation is now completed. The totalizer device is in its third position, the storer loading device in starting position. The storer selector SEW2 has its two lowermost digit positions loaded with the posted computer-mechanism number "28," whereas all other digit positions, due to the "forerunning zero" explained above, have remained in their respective zero positions. All further switching pulses have remained ineffective, including the delayed storer pulse through lead 1026 and contact spoon 1562 of the storer loading monitor in its second switching position, the pulse applied to lead 1025 of the totalizer monitor in position "1" for clearing of the storer assembly, and the pulse applied to the connection 1020, 581/3 effected by the totalizer monitor in its first switching position for clearing the storer selector SEW3, and so forth.

In the third switching position of the totalizer monitor, the contact spoon 1574 (FIG. 22) connects a plus pole with the lead 1009 whereby another cycle of storer rotation is released. Simultaneously, the contact spoon 1570b connects the clearing lead 1019 with the storer-selector clearing lead 581/3; contact spoon 1574/b connects the loading lead 1023 with the storer-selector loading lead 580/3; and contact spoon 1571b connects lead 1054 with lead 1111. During storer rotation, the totalizer starting pulse produced by the storer control shaft 381 acting upon cam 495/8 and contacts 572 (FIG. 21, top) is supplied to the computing-mechanism calling magnet RM28 (not shown in FIG. 21) in a circuit which extends from the plus pole through contacts 572 and lead 1054 (FIGS. 21, 22) to contact spoon 1571b of the totalizer monitor, thence through lead 1111 (FIGS. 22, 21a) bridging contact 549/2 (FIG. 21a) of the special portion SEW2a of storer selector SEW2 (FIG. 21a), displaced contact arm 556/2a, lead 1113, bridging contact 549/1b, displaced contact arm 556/1b and the computer-mechanism calling lead 582/28. During the totalizing operation described, the excitation of magnet RM28 has the effect that the amount memorized in the coupled computer mechanism "28" is transferred into the particular storer selector SEW3 called by means of the totalizer monitor.

The delayed storer pulse again produced by the storer control shaft 328 is supplied through lead 1026 and the contact spoon 1570 of the totalizer monitor now in third position, to stepping magnet SUM (FIG. 22), whereby this magnet causes the totalizer monitor to advance to its forth position. The delayed storer pulse arriving through lead 1026 is simultaneously supplied through contact spoon 1574a of the totalizing monitor to lead 1048 which passes the pulse through contact spoon 1620 of the OB-printer monitor (FIG. 22), now in its first switching position, to the stepping magnet ASM so that this magnet advances the OB-printer monitor to second position.

In the fourth position of the totalizer monitor, its contact spoon 1574c connects the storer-selector exits 530 with the supply leads 560 of the upper printer assembly (FIG. 21); and contact spoon 1572b connects lead 1046 with a lead 1112. The described switching of the OB-printer monitor to second position completes all circuit connections needed for initiating a printing operation. That is, the contact spoon 1622 of the OB-printer monitor and lead 1042 supply a starting pulse to the magnet ODrM (FIG. 21, upper left) which releases the single-turn clutch of the printer control shaft 228 (FIG. 18), so that the printer control shaft 228 together with the printer-current distributor DSV (FIG. 21) are driven from the machine main shaft for the duration of a single revolution. Furthermore, the storer-selector exits 531 and 529 of the storer selectors SEW4 and SEW2 are connected with the upper-printer leads 564 through contact spoons 1620a . . . 1624a and 1620b . . . 1624b so that the upper-printer magnets SM will respond.

Since the storer selector SEW4 was zeroed during the first rotating cycle of the storer, the just-mentioned single revolution of the printer control shaft 228 has the effect of simultaneously printing in the respective columns of the journal only the computer-mechanism number "28"; and, by virtue of the connections 530/564 (FIG. 22) established by the totalizing monitor, the totalized sum of the computing mechanism "28" is memorized in the storer selector SEW3. The stop pulse produced during rotation of the printer assembly by means of contacts 260 (FIG. 21, upper left) passes through the lead 1046 and contact spoon 570 of the totalizer monitor (FIG. 22) now in its fourth switching position, to the stepping magnet SUM which advances the totalizer monitor to its starting position. The stop pulse produced by the printer assembly is simultaneously supplied through lead 1046 (FIG. 22), contact spoon 1572 and lead 1028 to the clearing magnet CLM which, in the manner already described, interrupts the self-holding circuit of the motor-key relay MtR (FIG. 22) and thus clears the values or numbers previously posted into the value posting assembly. The same stop pulse also passes through lead 1046, contact spoon 1572b and lead 1112 to a switching magnet (here not illustrated) which causes the journal in the upper printing assembly to be advanced one step preparatory to printing of the next line. The OB-printer assembly is advanced to its third switching position by a pulse arriving through lead 1046, and thereafter advances to its starting position due to excitation through its own contact bridge 1047.

The selection of computing mechanisms just described with reference to manual posting can also be made subject to control by code marks or punched holes of an account card. For this purpose, and as is apparent from the foregoing, the individual digit-position leads 560 of the scanning assembly (see FIG. 21) can be connected by corresponding switching devices with the supply lead 550 of the storer loading magnets SLM so that the corresponding storer selector SEW can now be loaded from the scanning assembly. The performance of the totalizing operation then occurs in the same manner as described above with reference to manual posting of the desired computer-mechanism numbers.

*Brief summary*

As has been explained in detail, the storer assembly can be correlated in any desired sequence to the various other sub-assemblies of the counting machine under control by the function-switching monitor devices of the programming assembly illustrated in FIG. 22. Consequently, by correspondingly wiring the supply and exit leads of the individual machine sub-assemblies relative to the exit leads of the storer selectors, a virtually infinite multiplicity of connecting combinations and thus any desired performance of the storer assembly is available. By a corresponding arrangement of monitoring selector switches in the programming assembly, the storer selector exit leads 527 and 531 therefore can be connected also with the supply lead 570 of the storer loading magnets SLM, so that the values memorized in the storer selectors may also be feedback-loaded into any chosen computing mechanisms. The just-mentioned connections, in combination with the wiring of the special selector portions of some of the storer selectors described above with reference to the totalizing of a balance, a completely automatic performance of any desired accounting jobs can be carried out. By providing exchangeable or additional stepping switches in cooperation with special portions of the storer selectors SEW, further special jobs, such as the computation of limit trend values, can be performed.

It is further apparent from the foregoing decription that by a corresponding wiring of the storer selectors SEW, one and the same value posting device, such as the ten-key board 1 (FIGS. 1, 24) may serve for the posting of a multiplicity of diversified information, for instance numerical values, explanatory or identifying accounting legends including calendar dates, names or other data that are to appear on ledgers, bills, vouchers, or other records, as well as account-identifying numbers and monitoring symbols. As a result, a machine automatically performs a number of activities otherwise subject to attention by personnel, so that the use of the machine is greatly simplified and the occurrence of errors minimized to the largest possible extent.

Due to the available versatility of interconnections within the storer assembly and between this assembly and the other sub-assemblies selectively controlling the storer or selectively controlled thereby, machines according to the invention afford an unusual flexibility of application which makes them applicable for such diversified jobs as accounting sales transactions by registering the current sale on account cards and journals, ledgers and bills, or for payroll work, inventory work, tax accounting and any other desired types of accounting.

It will be obvious to those skilled in the art, upon a study of this disclosure, that the invention permits of a great variety of modifications with respect to the design and operation of the individual components as well as their interconnection to form a machine system, and that therefore our invention can be embodied in equipment other than specifically shown and described herein, without departing from the essential features of the invention and within the scope of the claims annexed hereto.

We claim:

1. Accounting machine, comprising digital data posting means, digital record scanning means, a plurality of digital record producing means and a plurality of digital computer mechanisms; programming apparatus connected with said respective means for sequencing their respective operations in accordance with a desired accounting sequence; a central storer assembly comprising digital groups of mechanical storer selectors each having a selector member operable in synchronism with a selected one of said respective computer mechanisms, each of said selectors in each of said storer selector groups having a number of value input leads and having an exit lead selectively connected with one of said value input leads in a given condition of said selector member; each of said individual record producing means having a group of control magnets for controlling its respective digit portions, said programming apparatus comprising a number of individually operable plural-position monitor switches of the rotary type, and control circuits connecting said respective means and said storer assembly with said monitor switches for positionally controlling said monitor switches in dependence upon the sequential operation of said respective means and assembly; said monitor switches, when in given positions, connecting said exit leads of said respective storer selector groups with said control magnets of one of said respective magnet groups; and electric energizing means connected with said value input leads for energizing said control magnets through said exit leads and monitor switches.

2. In an accounting machine according to claim 1, said electric energizing means comprising a number of value main leads to which said respective value input leads of each of said storer selectors are connected; each of said means and storer assembly having a control shaft and having an operating cycle determined by the revolution of said shaft, and each of said shafts having a single-revolution releasing member comprising a release control magnet connected with said programming apparatus to be controlled in accordance with said desired sequence; a plurality of electric current distributors connected with said respective shafts for operation in synchronism therewith, each of said distributors having a voltage supply lead and having sequentially operative outlet leads connected with said respective value main leads for sequentially applying voltage thereto, whereby said control magnets of each magnet group receive a sequence of voltage pulses from the one distributor correlated to the same magnet group during the interval of time in which said magnet group is connected with said exit leads of the correlated storer selector through one of said monitor switches.

3. In an accounting machine according to claim 1, said central storer assembly having said storer selectors correlated to respectively different sets of said computer mechanisms and having respective storer loading magnets each controlling one of said storer selectors as well as the one correlated set of said computer mechanisms; and said programming assembly when in a given condition having at least one of said monitor switches connect said exit leads of a selected storer selector with said storer loading magnets of selected computing mechanisms whereby feed-back loading of said latter mechanisms occurs while said control magnets are being energized under control by said programming assembly.

4. In an accounting machine according to claim 1, said record producing means comprising an upper printer and a card printer and a card puncher, said upper printer and said card printer having each a set of type carriers and a set of printer control magnets for controlling the setting of said respective type carriers, and said puncher having movable puncher pins and puncher control magnets for controlling said pins; said sets of printer control magnets and said puncher control magnets being simultaneously connected through said monitor switches with said exit leads in a selected condition of said programming assembly.

5. Accounting machine, comprising data posting keyboard means, record scanning means, computer means, a plurality of specially separate record printer means, and a plurality of selectively operable control apparatus connected with all of said means for sequencing their respective operations in accordance with a desired accounting sequence, a central data storer device comprising a number of mechanically actuable selector switches selectively controllable from at least one of said keyboard means and scanning means and computer means, said selector switches having respective exit leads; each of said printer means having a set of number-type carriers each displaceable into a selected printing position for printing a selected one of a series of numbers from cipher to digit maximum, and each of said printer means having a set of printer control magnets for positionally controlling said respective type carriers; said control apparatus comprising plural-position monitor switches connecting when in a given switching position said exit leads with said printer control magnets whereby said type carriers are controlled to assume respective printing positions corresponding to the data stored in respective selector switches of said storer device; said selector switches being interwired in said storer device so as to prevent printing of a cipher at the left of a finite number.

6. In an accounting machine according to claim 5, said selector switches of said storer device comprising each a multiplicity of switch portions, one for each of the respective digit positions of a numerical amount to be stored, said portions of each individual selector switch having synchronous progression, and each of said portions having one of said exit leads and having a multiplicity of value input leads selectively connectable with said exit lead of the same selector-switch portion, said value input leads being permanently connected in parallel relation to the respective value input leads of the other selector-switch portions of said storer device; an electric pulse distributor connected with said input value leads to sequentially apply voltage pulses to said respective value leads of each selector-switch portion of said storer device; bridging leads forming respective interconnections between the respective value positions of said digital portions of each selector switch that are assigned to the zero positions of said respective portions, and each of said selector switch portions having contact elements controlled in response to displacement of said switch portion from the zero position, said interconnections extending through said respective contact elements, whereby a voltage pulse issuing from said pulse distributor, when said distributor is connected to the value leads assigned to the zero value, can pass through said storer device to said printer control magnets and can effect printing of a cipher only when in the then active storer selector switch at least one portion is set to a number different from zero and at least one other lower-digit portion of said same selector switch remains in zero position.

7. In an accounting machine according to claim 5, said selector switches of said storer device comprising each a multiplicity of switch portions, one for each of the respective digit positions of a numerical amount to be stored, said portions of each individual selector switch having synchronous progression, and each of said porcions having one of said exit leads and having a multiplicity of value input leads selectively connectable with said exit lead of the same selector-switch portion, said value input leads being permanently connected in parallel relation to the respective value input leads of the other selector-switch portions of said storer device; an electric pulse distributor connected with said input value leads to sequentially apply voltage pulses to said respective value leads of each selector-switch portion of said storer device; at least one of said selector switches having special switch portions in addition to the normal portions aforementioned and adjustable in synchronism therewith, said special portions having respective exit leads connectable with said printer control magnets and having each a multiplicity of further value input leads connected with the aforesaid respective value input leads of said normal switch portions but in complementary number relation thereto, so as to prevent printing of a cipher at the left of a finite number in any printer means connected to said special selector switch portions.

8. Accounting machine, comprising data posting means, record scanning means, record producing means and control apparatus connected with said individual means for sequencing their respective operations in accordance with a desired accounting sequence, a central data storer assembly having main storer means and special storer means and a multiplicity of computer groups, said control apparatus comprising selectively operable monitor switches having a plurality of positions and connecting, when in one of said positions, said main storer means together with selected ones of said computer groups to at least one of said posting and scanning means and connecting, when in another one of said positions, said main storer means with at least one of said record producing means for controlling said connected record producing means in dependence upon values stored in said main storer means, said main storer means and said selected computer group having a loading device in common, said loading device being responsive to said respective posting and scanning means for simultaneously controlling said main storer means and said selected computer groups, said special storer means being inputwise connected with said same loading device so as to be loaded together with said main storer means, and said special storer means forming part of said control apparatus, whereby said special storer means, when in operation, impose a control effect upon said accounting sequence in dependence upon values stored in said special storer means.

9. In an accounting machine according to claim 8, said special storer means having a plurality of input leads and exit leads, said input leads being selectively connected with said exit leads depending upon the loading of said special storer means, control magnets controlling the machine operation, said control magnets being connectable with said exit leads, and pulse generator devices selectively connected through said input leads and said special storer means with said exit leads for actuating said control magnets.

10. In an accounting machine according to claim 9, said loading device of one of said main storer means being selectively connectable under control by said monitor switches with at least one of said posting and scanning means, and said main storer means having exit leads connected under control by said monitor switches with at least one of said record producing means while said exit leads of said special storer means are simultaneously connected with said control magnets for energizing said latter magnets as said storer assembly is being loaded with data from said respective posting and scanning means.

11. In accounting apparatus according to claim 8, said computer groups comprising a digital set of balance totalizing mechanisms having tens-transfer means for switching each higher-digit mechanism under control by the digitally next lower mechanism, control contact means operatively connected with the highest digit mechanism of said set to be actuated thereby, said control contact means being selectively connected with said special storer means for activating said special storer means when said set of balance totalizing mechanisms registers a negative balance, said main storer means and said special storer means having impulse input leads wired together in complementary relation to each other, and said special storer means having exit leads connected with said record producing means for causing them to register a negative balance when said special storer means is selected by said control contact means.

12. In an accounting machine according to claim 11, said control apparatus having selectively operable means for correlating the same set of balance totalizing mechanisms sequentially with all of a number of said computer groups and connecting said totalizing set with a selected main storer means and an appertaining, complementary wired special storer means, whereby said control contact means is effective to selectively connect said record producing means with the respective exits of one of said main storer means and said special storer means at a time.

13. Accounting machine, comprising data posting means, record scanning means, record producing means and computer means, in combination with a number of mechanical monitor devices of the rotary selector-switch type forming together a central data storer assembly, and selective control apparatus connected with each of the aforesaid means for sequencing their respective operations in accordance with a desired accounting performance, said control apparatus having selectively operable connector devices connecting monitor devices of said storer assembly with selected ones of the aforesaid means in a selected time relation to said performance, said central data storer assembly having a first selective storer group and second selective storer group, said connector devices of said control apparatus, when in a selected connecting condition, forming a connection of at least one of said posting and scanning means with said first storer group and with selected ones of said computer means, and said connector devices forming also a connection between said computer means and said second storer group for entering the computed results into said second storer group, and said control apparatus being subsequently operative to connect said first and second storer groups with said record producing means in a selected time relation for registering all values previously entered into said storer assembly.

14. An accounting machine according to claim 13, comprising control means for keeping data, entered into said storer groups, stored during any desired number of machine runs, said respective record producing means having individual groups of control magnets, and said control apparatus connecting said storer groups during each individual machine run with said control magnets for operating said record producing devices during each machine run in accordance with said data.

15. An accounting machine according to claim 13, comprising storer clearing means for zeroing the storers of said storer groups, and said control apparatus having control means connected with said clearing means for zeroing the previously loaded storers during the same machine run in which new data are loaded into said storer assembly.

16. Accounting machine, comprising data posting means, record scanning means, record producing means and computer means, in combination with a number of mechanical monitor devices of the rotary selector-switch type forming together a central data storer assembly, and selective control apparatus connected with each of the aforesaid means for sequencing their respective operations in accordance with a desired accounting performance, said control apparatus having selectively operable connector devices connecting monitor devices of said storer assembly with selected ones of the aforesaid means in a selected time relation to said performance, said data storer assembly comprising computer mechanisms and circuit selectors having selective value denoting circuit connections, and storer loading means drivingly connectable with said computer mechanisms as well as with said circuit selectors, whereby actuation of said loading means causes simultaneous and synchronous adjustment of said computer mechanisms and said circuit selectors; said storer assembly comprising respective groups of storers assigned to different digital positions of the values to be stored, each of said groups of storers having one of said storer loading means in common with all of said computer mechanisms that are selectively connectable with said storer group to be loaded together therewith, said storer loading means of each of said storer groups comprising a displaceable loading member; and displaceable clearing bars for zeroing said storer group and said mechanisms coupled with said storer group; said loading member and said clearing bars having respective control magnets for respectively coupling said loading member and said bars with said storer group.

17. In an accounting machine according to claim 16, said loading control magnets and said clearing control magnets having respective energizing leads; said central data storer assembly having a control shaft for causing said assembly to perform one cycle of operation during a single revolution of said shaft, pulse contact means responsive to revolution of said shaft, and pulse-circuit leads connecting said pulse contact means with said respective loading and clearing control magnets for operating them in a given time relation to said accounting sequence.

18. In an accounting machine according to claim 16, said storer loading means of each of said groups of storers comprising a positive loading member and a negative loading member for operating the coupled computer mechanisms in additive or subtractive sense respectively; a control mechanism for selectively coupling each computer mechanism with one of said respective loading members, said control mechanism comprising an angularly displaceable rail engageable with all computer mechanisms of a single digital computer group, a reciprocable slider having pivotally mounted pawls assigned to said respective rails, respective linking levers connected with said respective rails and selectively engageable by said respective pawls for switching said rails between positive and negative coupling positions, and switching magnets in connection with said respective pawls for selectively controlling said pawls.

19. Accounting machine, comprising data posting means, record scanning means, record producing means and computer means, in combination with a number of mechanical monitor devices of the rotary selector-switch type forming together a central data storer assembly, and selective control apparatus connected with each of the aforesaid means for sequencing their respective operations in accordance with a desired accounting performance, said control apparatus having selectively operable connector devices connecting monitor devices of said storer assembly with selected ones of the aforesaid means in a selected time relation to said performance, said data storer assembly comprising computer mechanisms and circuit selectors having selective value-denoting circuit connections, and storer loading means drivingly connectable with said computer mechanisms as well as with said circuit selectors, whereby actuation of said loading means causes simultaneous and synchronous adjustment of said computer mechanisms and said circuit selectors, said storer assembly comprising respective groups of storers assigned to different digital positions of the values to be stored, each of said groups of storers having one of said storer loading means in common with all of said computer mechanisms that are selectively connectable with said storer group to be loaded together therewith, said storer loading means of each of said storer groups comprising a displaceable loading member, and control magnets for selectively connecting said computer mechanisms with said loading member; a common carrier for all of said computer mechanisms connectable with one of said respective storer groups, a slider structure for each of said computer mechanisms, said slider structure being displaceable on said carrier in a direction transverse to the displacement direction of said loading member, a spring lever pivotally mounted on said slider structure and carrying a counting gear of one of said computer mechanisms, and tens-transfer means forming part of a digitally adjacent computer mechanism and adapted to impart pivotal movement to said spring lever whereby said counting gear can engage said loading member to perform a single step rotation.

20. In an accounting machine according to claim 16, wherein said computer mechanisms that are selectively connectable with one of said storer groups and have a storer loading member and clearing bars in common with said storer group comprise a special group of digitally interrelated balance-totalizing mechanisms having tens-transfer means for switching each higher-digit mechanism under control by the digitally next lower mechanism, a switching magnet engageable when excited with the digitally lowest mechanism of said totalizer group for then effecting tens transfer in said latter mechanism, and an energizing circuit connected with said switching magnet and having an excitation control contact, a counting mechanism adjacent to the digitally highest computer mechanism of said totalizer group to be tens-transferred by said latter computer mechanism, said excitation control contact being engageable by said counting mechanism for exciting said switching magnet.

21. An accounting machine having a key assembly with data posting-key means, and having record scanning means, record producing means and computer mechanism means, in combination with a programming apparatus comprising a multiplicity of data storing monitors each formed of a mechanically adjustable selector switch of the rotary type; said monitors being interwired and connected with each of said scanning means and record producing means and computer means for sequencing their respective operations in accordance with a desired accounting performance; said key assembly comprising selectively actuable control keys connected with said monitors for determining said accounting performance whereby said monitors are selectively adjustable individually and in selected combinations respectively for storing given operational data from said posting key means and scanning means, and control means connecting said monitors with said record scanning means and record producing means and computer means for controlling them in accordance with data stored in said monitors.

22. An accounting machine according to claim 21, comprising storer loading means drivingly connectable with said computer mechanism means as well as with said selector switches, said loading means being connected with and controlled by said data posting-key means and record scanning means, whereby said storer loading means causes simultaneous and synchronous adjustment of said computer mechanism means and said selector switches.

23. In an accounting machine comprising data posting means, record scanning means, record punching means, record printing means and computer mechanism means, the combination of a programming apparatus comprising a multiplicity of data-storing monitors each formed of a mechanical rotary selector switch, said monitors being interwired and having connections with each of the afore-said means for sequencing their respective operations in accordance with a desired accounting performance; said connections of said monitors with said posting and scanning means being subject to selective control for entering value-denoting data into one and more respectively of said monitors from one of said respective posting and scanning means, said connections of said monitors with said computer mechanism means being subject to selective control for also entering said same value-denoting data into one and more respectively of said computer mechanism means; and control means comprising control key means selectively operable for initiating said respective controls, said control means also comprising distributor switch means selectively connecting said monitors with said punching and printing means for supplying stored data from said monitors to said punching and printing means.

References Cited in the file of this patent

UNITED STATES PATENTS

| | | |
|---|---|---|
| 2,147,626 | Bryce et al. | Feb. 21, 1939 |
| 2,239,524 | Johnstone et al. | Apr. 22, 1941 |
| 2,240,549 | Carroll | May 6, 1941 |
| 2,346,250 | Bryce | Apr. 11, 1944 |
| 2,357,455 | Bryce | Sept. 5, 1944 |
| 2,403,005 | Lake et al. | July 2, 1946 |
| 2,501,444 | Gollwitzer | Mar. 21, 1950 |
| 2,566,952 | Mills et al. | Sept. 4, 1951 |
| 2,636,672 | Hamilton et al. | Apr. 28, 1953 |
| 2,637,399 | Doty | May 5, 1953 |
| 2,647,581 | Gardinor et al. | Aug. 4, 1953 |
| 2,652,196 | Sterling | Sept. 15, 1953 |
| 2,709,041 | Gallup | May 24, 1955 |
| 2,812,902 | Runde et al. | Nov. 12, 1957 |
| 2,822,752 | Bradshaw et al. | Feb. 11, 1958 |